US011875926B2

(12) United States Patent
Hanson et al.

(10) Patent No.: US 11,875,926 B2
(45) Date of Patent: Jan. 16, 2024

(54) INDUCTOR HAVING HIGH CURRENT COIL WITH LOW DIRECT CURRENT RESISTANCE

(71) Applicant: VISHAY DALE ELECTRONICS, LLC, Columbus, NE (US)

(72) Inventors: Benjamin M. Hanson, Lennox, SD (US); Darek Blow, Yankton, SD (US); Chris Gubbels, Hartington, NE (US)

(73) Assignee: Vishay Dale Electronics, LLC, Columbus, NE (US)

( * ) Notice: Subject to any disclaimer, the term of this patent is extended or adjusted under 35 U.S.C. 154(b) by 54 days.

(21) Appl. No.: 17/106,718

(22) Filed: Nov. 30, 2020

(65) Prior Publication Data

US 2021/0193360 A1 Jun. 24, 2021

Related U.S. Application Data

(63) Continuation of application No. 15/692,134, filed on Aug. 31, 2017, now Pat. No. 10,854,367.

(Continued)

(51) Int. Cl.

| | |
|---|---|
| ***H01F 27/28*** | (2006.01) |
| ***H01F 17/04*** | (2006.01) |
| ***H01F 27/30*** | (2006.01) |
| ***H01F 27/255*** | (2006.01) |
| ***H01F 41/02*** | (2006.01) |
| ***H01F 41/04*** | (2006.01) |
| ***H01F 27/24*** | (2006.01) |
| ***H01F 27/29*** | (2006.01) |

(52) U.S. Cl.

CPC ............. *H01F 17/04* (2013.01); *H01F 27/24* (2013.01); *H01F 27/255* (2013.01); *H01F 27/28* (2013.01); *H01F 27/2804* (2013.01); *H01F 27/2852* (2013.01); *H01F 27/292* (2013.01); *H01F 27/306* (2013.01); *H01F 41/0246* (2013.01); *H01F 41/04* (2013.01); *H01F 41/041* (2013.01)

(58) Field of Classification Search

CPC ............................ H01F 27/292; H01F 27/306

USPC ......................................................... 336/225

See application file for complete search history.

(56) References Cited

U.S. PATENT DOCUMENTS

| | | | |
|---|---|---|---|
| 2,497,516 | A | 2/1950 | Phelps |
| 2,889,525 | A | 6/1959 | Smith |

(Continued)

FOREIGN PATENT DOCUMENTS

| | | | |
|---|---|---|---|
| CN | 1059231 | A | 3/1992 |
| CN | 1677581 | A | 10/2005 |

(Continued)

OTHER PUBLICATIONS

SMD Shielded Power Inductors—BPMV Series. Chilisin Electronics Corp. Mar. 2, 2020. 11 pp.

(Continued)

*Primary Examiner* — Ronald Hinson

(74) *Attorney, Agent, or Firm* — Volpe Koenig

(57) ABSTRACT

An inductor and method for making the same are provided. The inductor includes a coil formed from a conductor and having a serpentine shape. The coil may have an "S"-shape. The coil has two leads extending from opposite ends of the coil. An inductor body surrounds the coil and portions of the leads. The leads may be wrapped around the body to create contact points on the exterior of the inductor.

14 Claims, 40 Drawing Sheets

Related U.S. Application Data

(60) Provisional application No. 62/382,182, filed on Aug. 31, 2016.

(56) References Cited

U.S. PATENT DOCUMENTS 3,169,234 A 2/1965 Renskers
3,958,328 A 5/1976 Lee
4,180,450 A 12/1979 Morrison
4,223,360 A 9/1980 Sansom et al.
4,413,161 A 11/1983 Matsumoto et al.
4,901,048 A 2/1990 Williamson
5,010,314 A 4/1991 Estrov
5,126,715 A 6/1992 Yerman et al.
5,245,307 A 9/1993 Klaus et al.
5,451,914 A 9/1995 Stengel
5,481,238 A 1/1996 Carsten et al.
5,773,886 A 6/1998 Rostoker et al.
5,801,432 A 9/1998 Rostoker et al.
5,821,624 A 10/1998 Pasch
5,844,451 A 12/1998 Murphy
5,875,541 A 3/1999 Kumeji
5,888,848 A 3/1999 Cozar et al.
5,912,609 A 6/1999 Usui et al.
5,913,551 A 6/1999 Tsutsumi et al.
5,917,396 A 6/1999 Halser, III
5,949,321 A 9/1999 Grandmont et al.
6,026,311 A 2/2000 Willemsen Cortes
6,060,976 A 5/2000 Yamaguchi et al.
6,078,502 A 6/2000 Rostoker et al.
6,081,416 A 6/2000 Trinh et al.
6,087,922 A 7/2000 Smith
6,204,744 B1 3/2001 Shafer et al.
6,222,437 B1 4/2001 Soto et al.
6,236,297 B1 5/2001 Chou et al.
6,255,725 B1 7/2001 Akagawa et al.
6,317,965 B1 11/2001 Okamoto et al.
6,326,739 B1 12/2001 MacLennan
6,351,033 B1 2/2002 Lotfi et al.
6,392,525 B1 5/2002 Kato et al.
6,409,859 B1 6/2002 Chung
6,438,000 B1 8/2002 Okamoto et al.
6,456,184 B1 9/2002 Vu et al.
6,460,244 B1 10/2002 Shafer et al.
6,476,689 B1 11/2002 Uchida et al.
6,546,184 B2 4/2003 Kamiya
6,713,162 B2 3/2004 Takaya et al.
6,723,775 B2 5/2004 Chung
6,734,074 B2 5/2004 Chen et al.
6,765,284 B2 7/2004 Gibson et al.
6,774,757 B2 8/2004 Fujiyoshi et al.
6,869,238 B2 3/2005 Ishiguro
6,879,235 B2 4/2005 Ichikawa
6,879,238 B2 4/2005 Liu et al.
6,882,261 B2 4/2005 Moro et al.
6,888,435 B2 5/2005 Inoue et al.
6,933,895 B2 8/2005 Mendolia et al.
6,940,154 B2 9/2005 Pedron et al.
6,965,517 B2 11/2005 Wanes et al.
6,998,952 B2 2/2006 Zhou et al.
7,023,313 B2 4/2006 Sutardja
7,034,645 B2 4/2006 Shafer et al.
7,046,492 B2 5/2006 Fromm et al.
7,126,443 B2 10/2006 De Bhailis et al.
7,176,506 B2 2/2007 Beroz et al.
7,192,809 B2 3/2007 Abbott
7,218,197 B2 5/2007 Sutardja
7,221,251 B2 5/2007 Menegoli et al.
7,289,013 B2 10/2007 Decristofaro et al.
7,289,329 B2 10/2007 Chen et al.
7,292,128 B2 11/2007 Hanley
7,294,587 B2 11/2007 Asahi et al.
7,295,448 B2 11/2007 Zhu
7,307,502 B2 12/2007 Sutardja
7,317,373 B2 1/2008 Hsu et al.
7,339,451 B2 3/2008 Liu et al.
7,345,562 B2 3/2008 Shafer
7,392,581 B2 7/2008 Sano et al.
7,456,722 B1 11/2008 Eaton et al.
7,460,002 B2 12/2008 Estrov
7,469,469 B2 12/2008 Nakata et al.
7,489,219 B2 2/2009 Satardja
7,540,747 B2 6/2009 Ice et al.
7,541,908 B2 6/2009 Kitahara et al.
7,545,026 B2 6/2009 Six
7,567,163 B2 7/2009 Dadafshar et al.
7,629,860 B2 12/2009 Liu et al.
7,667,565 B2 2/2010 Liu
7,675,396 B2 3/2010 Liu et al.
7,705,418 B2 4/2010 Kono et al.
7,705,508 B2 4/2010 Dooley
7,736,951 B2 6/2010 Prajuckamol et al.
7,786,834 B2 8/2010 Yagasaki et al.
7,791,445 B2 9/2010 Manoukian et al.
7,825,502 B2 11/2010 Irving et al.
7,849,586 B2 12/2010 Sutardja
7,868,725 B2 1/2011 Sutardja
7,872,350 B2 1/2011 Otremba et al.
7,882,614 B2 2/2011 Sutardja
7,915,993 B2 3/2011 Liu et al.
7,920,043 B2 4/2011 Nakagawa et al.
7,987,580 B2 8/2011 Sutardja
7,999,650 B2 8/2011 Mori
8,028,401 B2 10/2011 Sutardja
8,035,471 B2 10/2011 Sutardja
8,049,588 B2 11/2011 Shibuya et al.
8,080,865 B2 12/2011 Harvey
8,097,934 B1 1/2012 Li et al.
8,098,123 B2 1/2012 Sutardja
8,164,408 B2 4/2012 Kim
8,279,037 B2 10/2012 Yan et al.
8,310,332 B2 11/2012 Yan et al.
8,350,659 B2 1/2013 Dziubek et al.
8,378,777 B2 2/2013 Yan et al.
8,466,764 B2 6/2013 Bogert et al.
8,484,829 B2 7/2013 Manoukian et al.
8,659,379 B2 2/2014 Yan et al.
8,695,209 B2 4/2014 Saito et al.
8,698,587 B2 4/2014 Park et al.
8,707,547 B2 4/2014 Lee
8,910,369 B2 12/2014 Herbsommer et al.
8,910,373 B2 12/2014 Yan et al.
8,916,408 B2 12/2014 Huckabee et al.
8,916,421 B2 12/2014 Gong et al.
8,927,342 B2 1/2015 Goesele et al.
8,941,457 B2 1/2015 Yan et al.
8,998,454 B2 4/2015 Wang et al.
9,001,524 B1 4/2015 Akre
9,029,741 B2 5/2015 Montoya et al.
9,141,157 B2 9/2015 Mohd Arshad et al.
9,142,345 B2 9/2015 Chen et al.
9,177,945 B2 11/2015 Saye
9,190,389 B2 11/2015 Meyer-Berg et al.
9,276,339 B2 3/2016 Rathburn
9,318,251 B2 4/2016 Klesyk et al.
9,368,423 B2 6/2016 Do et al.
9,373,567 B2 6/2016 Tan
9,614,423 B2 4/2017 Weller et al.
9,679,694 B2 6/2017 Kitami et al.
9,978,506 B2 5/2018 Ohtsubo et al.
10,002,706 B2 6/2018 Dien
10,109,409 B2 10/2018 Lee et al.
10,332,667 B2 6/2019 Jeong et al.
10,796,842 B2 10/2020 Huang et al.
10,854,367 B2 12/2020 Hanson et al.
11,049,638 B2 6/2021 Hanson
2002/0011914 A1 1/2002 Ikeura et al.
2002/0040077 A1 4/2002 Hanejko et al.
2002/0130752 A1 9/2002 Kuroshima
2002/0158739 A1 10/2002 Shibata et al.
2003/0016112 A1 1/2003 Brocchi
2003/0141952 A1 7/2003 Moro et al.
2003/0178694 A1 9/2003 Lemaire
2004/0017276 A1 1/2004 Chen et al.
2004/0061584 A1 4/2004 Darmann

(56) References Cited

U.S. PATENT DOCUMENTS

| | | | |
|---|---|---|---|
| 2004/0100347 | A1 | 5/2004 | Okamoto |
| 2004/0232982 | A1 | 11/2004 | Ichitsubo et al. |
| 2004/0245232 | A1 | 12/2004 | Ihde et al. |
| 2005/0012581 | A1 | 1/2005 | Ono et al. |
| 2005/0030141 | A1 | 2/2005 | Barber et al. |
| 2005/0273938 | A1 | 12/2005 | Metzger et al. |
| 2006/0001517 | A1 | 1/2006 | Cheng |
| 2006/0038653 | A1 | 2/2006 | Cheng |
| 2006/0113645 | A1 | 6/2006 | Warner et al. |
| 2006/0132272 | A1 | 6/2006 | Kitahara et al. |
| 2007/0052510 | A1 | 3/2007 | Saegusa et al. |
| 2007/0166554 | A1 | 7/2007 | Ruchert et al. |
| 2007/0186407 | A1 | 8/2007 | Shafer et al. |
| 2007/0247268 | A1 | 10/2007 | Oya et al. |
| 2007/0252669 | A1 | 11/2007 | Hansen et al. |
| 2007/0257759 | A1 | 11/2007 | Lee et al. |
| 2008/0029879 | A1 | 2/2008 | Tuckerman et al. |
| 2008/0110014 | A1* | 5/2008 | Shafer ..................... B29C 43/18 29/608 |
| 2008/0150670 | A1 | 6/2008 | Chung et al. |
| 2008/0303606 | A1 | 12/2008 | Liu et al. |
| 2009/0057822 | A1 | 3/2009 | Wen et al. |
| 2009/0115562 | A1 | 5/2009 | Lee et al. |
| 2010/0007452 | A1 | 1/2010 | Forsberg et al. |
| 2010/0007453 | A1 | 1/2010 | Yan et al. |
| 2010/0060401 | A1 | 3/2010 | Tai et al. |
| 2010/0171579 | A1 | 3/2010 | Yan et al. |
| 2010/0097171 | A1* | 4/2010 | Urata ...................... C22C 45/02 420/83 |
| 2010/0123541 | A1 | 5/2010 | Saka et al. |
| 2010/0271161 | A1 | 10/2010 | Yan et al. |
| 2010/0314728 | A1 | 12/2010 | Li |
| 2010/0328003 | A1 | 12/2010 | Shibuya et al. |
| 2011/0227690 | A1 | 9/2011 | Watanabe et al. |
| 2011/0260825 | A1 | 10/2011 | Doljack et al. |
| 2011/0273257 | A1 | 11/2011 | Ishizawa |
| 2012/0049334 | A1 | 3/2012 | Pagaila et al. |
| 2012/0176214 | A1 | 7/2012 | Hsiao |
| 2012/0216392 | A1 | 8/2012 | Fan |
| 2012/0273932 | A1 | 11/2012 | Mao et al. |
| 2013/0015939 | A1 | 1/2013 | Inagaki et al. |
| 2013/0181803 | A1 | 7/2013 | Wyville |
| 2013/0249546 | A1 | 9/2013 | David et al. |
| 2013/0273692 | A1 | 10/2013 | McMillan et al. |
| 2013/0278571 | A1 | 10/2013 | Ahn |
| 2013/0307117 | A1 | 11/2013 | Koduri |
| 2014/0008974 | A1 | 1/2014 | Miyamoto |
| 2014/0125441 | A1 | 5/2014 | Hongping et al. |
| 2014/0210062 | A1 | 7/2014 | Miyazaki |
| 2014/0210584 | A1 | 7/2014 | Blow |
| 2014/0302718 | A1 | 10/2014 | Gailus |
| 2014/0313003 | A1 | 10/2014 | Liu |
| 2014/0320124 | A1 | 10/2014 | David et al. |
| 2014/0340186 | A1 | 11/2014 | Xianfeng et al. |
| 2014/0361423 | A1 | 12/2014 | Chi et al. |
| 2015/0214198 | A1 | 7/2015 | Lee et al. |
| 2015/0263576 | A1 | 9/2015 | Kato |
| 2015/0270860 | A1 | 9/2015 | McCain |
| 2016/0069545 | A1 | 3/2016 | Chien et al. |
| 2016/0073509 | A1 | 3/2016 | Zhang et al. |
| 2016/0099189 | A1 | 4/2016 | Khai Yen et al. |
| 2016/0133373 | A1 | 5/2016 | Orr et al. |
| 2016/0181001 | A1 | 6/2016 | Doljack et al. |
| 2016/0190918 | A1 | 6/2016 | Ho et al. |
| 2016/0217914 | A1 | 7/2016 | Kim et al. |
| 2016/0217922 | A1 | 7/2016 | Sherrer |
| 2017/0309394 | A1 | 10/2017 | Blow |
| 2018/0061547 | A1 | 3/2018 | Hanson |
| 2018/0137969 | A1 | 5/2018 | Hamamura et al. |
| 2019/0244745 | A1 | 8/2019 | Kojima et al. |
| 2019/0311831 | A1 | 10/2019 | Yeo et al. |

FOREIGN PATENT DOCUMENTS

| | | | |
|---|---|---|---|
| CN | 101578671 | A | 11/2009 |
| CN | 102044327 | A | 5/2011 |
| CN | 102376438 | A | 3/2012 |
| CN | 102822913 | A | 12/2012 |
| CN | 103680861 | A | 3/2014 |
| CN | 104247220 | B | 3/2017 |
| CN | 104685587 | B | 3/2017 |
| CN | 207558566 | U | 6/2018 |
| CN | 208596597 | U | 3/2019 |
| CN | 208706396 | U | 4/2019 |
| CN | 109754986 | A | 5/2019 |
| CN | 209388809 | U | 9/2019 |
| EP | 0 606 973 | A1 | 7/1994 |
| EP | 0606973 | A | 7/1994 |
| EP | 0662699 | B1 | 5/1998 |
| EP | 1 933 340 | A1 | 6/2008 |
| EP | 1 091 369 | A2 | 11/2011 |
| EP | 2 518 740 | A1 | 10/2012 |
| EP | 2518740 | A1 | 10/2012 |
| GB | 1 071 469 | | 6/1967 |
| JP | 02-036013 | U | 3/1990 |
| JP | 03-171793 | A | 7/1991 |
| JP | H03-171703 | A | 7/1991 |
| JP | 04059396 | A | 2/1992 |
| JP | H04-129206 | A | 4/1992 |
| JP | H05 258959 | A | 10/1993 |
| JP | H06 55211 | U | 7/1994 |
| JP | H06 283338 | A | 10/1994 |
| JP | H07-245217 | A | 9/1995 |
| JP | 07-273292 | A | 10/1995 |
| JP | H09-306757 | A | 11/1997 |
| JP | H11340060 | A | 12/1999 |
| JP | 2000021656 | A | 1/2000 |
| JP | 2000091133 | A | 3/2000 |
| JP | 2000323336 | A | 11/2000 |
| JP | 2003309024 | A | 10/2003 |
| JP | 2004022814 | A | 1/2004 |
| JP | 2004-087607 | A | 3/2004 |
| JP | 2004266120 | A | 9/2004 |
| JP | 2005-109290 | A | 4/2005 |
| JP | 2005-310865 | A | 11/2005 |
| JP | 2006505142 | A | 2/2006 |
| JP | 2009224815 | A | 10/2009 |
| JP | 2011054811 | A | 3/2011 |
| JP | 4768383 | B2 | 9/2011 |
| JP | 2012-104724 | A | 5/2012 |
| JP | 2012-195399 | A | 10/2012 |
| JP | 2017220573 | A | 12/2017 |
| JP | 2018098312 | A | 6/2018 |
| JP | 6681544 | B2 | 4/2020 |
| KR | 20180071644 | A | 6/2018 |
| TW | I299504 | B | 3/2003 |
| TW | 201616529 | A | 5/2016 |
| WO | 2010/129352 | A1 | 11/2010 |

OTHER PUBLICATIONS

Chilisin Electronics Corp. BPMV00070795R20K2F Inductor. 2018. 2 pp.

SMD Power Inductors—BPSG/BPSW Series. Chilisin Electronics Corp. Mar. 2, 2020. 4 pp.

Cutress, Ian. Gigabyte Server GA-7PESH3 Motherboard Review. Anandtech. Sep. 4, 2014.

FP1108R, High frequency, high current power inductors. Technical Data 10227. Sep. 2017. 4 pp.

* cited by examiner

INDUCTOR HAVING HIGH CURRENT COIL WITH LOW DIRECT CURRENT RESISTANCE

CROSS REFERENCE TO RELATED APPLICATION

This application is a continuation of U.S. patent application Ser. No. 15/692,134, filed Aug. 31, 2017, which claims the benefit of U.S. Provisional Patent Application No. 62/382,182, filed Aug. 31, 2016, the entire contents of which are incorporated by reference as if fully set forth herein.

FIELD OF INVENTION

This application relates to the field of electronic components, and more specifically, inductors and methods for making inductors.

BACKGROUND

Inductors are, generally, passive two-terminal electrical components which resist changes in electric current passing through them. An inductor includes a conductor, such as a wire, wound into a coil. When a current flows through the coil, energy is stored temporarily in a magnetic field in the coil. When the current flowing through an inductor changes, the time-varying magnetic field induces a voltage in the conductor, according to Faraday's law of electromagnetic induction. As a result of operating based on magnetic fields, inductors are capable of producing electric and magnetic fields which may interfere with, disturb and/or decrease the performance of other electronic components. In addition, other electric fields, magnetic fields or electrostatic charges from electrical components on a circuit board can interfere with, disturb and/or decrease the performance of the inductor.

Some known inductors are generally formed having a core body of magnetic material, with a conductor positioned internally, at times with the conductor formed as a wound coil. Examples of known inductors include U.S. Pat. No. 6,198,375 ("Inductor coil structure") and U.S. Pat. No. 6,204,744 ("High current, low profile inductor"), the entire contents of which are incorporated by reference herein. Attempts to improve designs and improve the economy of building inductors are commonplace. Thus, a need exists for a simple and cost effective way to produce consistent inductors, including those with inductance lower than lull, while improving direct current resistance.

SUMMARY

An inductor and method for making the same is disclosed herein. An inductor may comprise a coil formed from a conductor. The coil may have two leads extending from opposite ends of the coil. A body surrounds the coil and portions of the first lead and the second lead. The leads may be wrapped around the body to create contact points, such as surface mount terminals, on an exterior surface of the inductor.

A method for making the inductor is also provided. A conductor, such as a metal plate or strip or wire, may be formed in the shape of a coil and two leads coming from opposite ends of the coil. The coil may be formed into a specific shape, such as a serpentine or meandering shape, and may preferably be formed having an "S" shape. The conductor may be folded, bent, and/or stamped to form the shape of the coil and two leads. A body of the inductor surrounds the coil, and may be pressed around the coil, leaving the leads sticking out from the body. The leads may then be bent to wrap around the body to form contact points at one external surface of the body.

In one aspect, the present invention provides for a flat inductor coil having a shape with leads formed as a unitary piece by stamping a sheet of metal, such as copper. It is appreciated that other conductive materials as are known in the art, such as other materials used for coils in inductors, may also be used without departing from the teachings of the present invention. Insulation may also be used around or between parts of the coil and/or leads if needed for particular applications. The lead portions are aligned along a generally straight path and may have a certain width. The coil may include portions that extend outside of the width of the leads, preferably curved or positioned away from a center of the coil, with the portions connected by a connection portion that runs at an angle across the center of the coil. The coil and leads may initially lie in a plane during manufacturing, such as when formed from a flat piece of metal. The leads may ultimately be bent around and under an inductor body that surrounds the coil. All parts of the coil preferably may lie in a plane in an embodiment of a finished inductor. An inductor body is pressed around and houses the coil.

The coil extending between and connecting the leads has a shape. In a preferred embodiment, the coil joins the opposite leads (or lead portions), and generally comprises a first curved portion and a second curved portion. The curved portions preferably curve away from and/or around the center of the coil, and thus may be considered "outwardly" curving. Each curved portion of the coil may extend along a part of the circumference of a circular path curving around the center of the central portion. Each curved portion has a first end extending from one of the leads, and a second end opposite the first end. A central portion, or connection portion, extends at an angle between each second end of the first and second curved portions, traversing the center of the central portion. This creates a serpentine coil which may have an "S" shape when viewed from above or below.

Multiple coil layers may be provided. Insulation may be positioned between the multiple coil layers. A coil according to the invention may be formed as a flat, rounded, or oblong shaped piece of metal.

In one aspect of the present invention, the coil and leads of the present invention are preferably formed, such as by stamping, as a flat, complete unitary piece. That is, no interruptions or breaks are formed in the coil from one lead to the opposite lead. The leads and coil are formed at the same time during the manufacturing process by stamping. The coil does not have to be joined, such as by welding, to the leads. In other embodiments, the leads are formed separately and joined to the coil.

DETAILED DESCRIPTION

Figure 1:
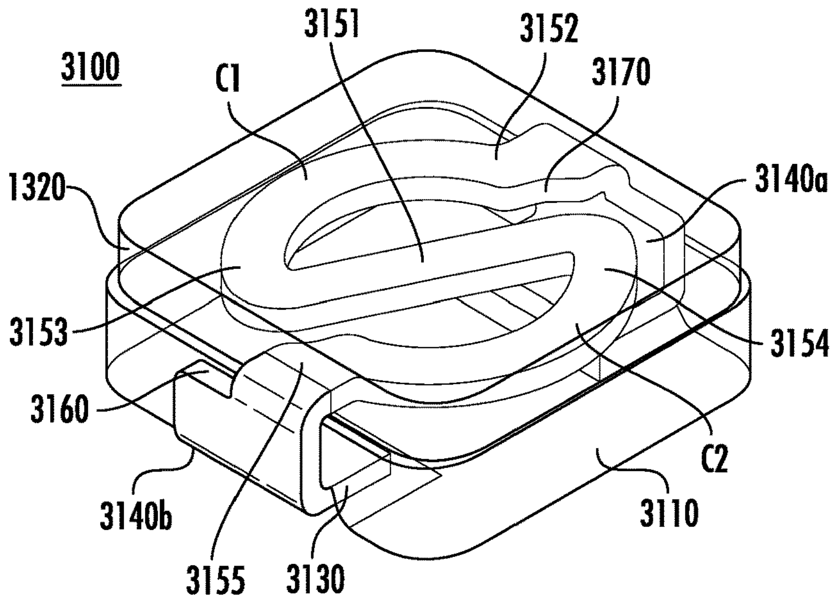
FIG. 1 illustrates an isometric view of an inductor in partial transparency according to the invention.

Certain terminology is used in the following description for convenience only and is not limiting. The words “right,” “left,” “top,” and “bottom” designate directions in the drawings to which reference is made. The words “a” and “one,” as used in the claims and in the corresponding portions of the specification, are defined as including one or more of the referenced item unless specifically stated otherwise. This terminology includes the words above specifically mentioned, derivatives thereof, and words of similar import. The phrase “at least one” followed by a list of two or more items, such as “A, B, or C,” means any individual one of A, B or C as well as any combination thereof. It may be noted that some Figures are shown with partial transparency for the purpose of explanation, illustration and demonstration purposes only, and is not intended to indicate that an element itself would be transparent in its final manufactured form.

FIG. 1 shows an example of an inductor 3100 according to an embodiment described herein, including a shaped coil 3150 formed from a conductor, such as a metal plate, sheet or strip. A shaped coil 3150 may be shaped in a unique configuration that provides for increased efficiency and performance in a small volume and that is simple to manufacture. The coil 3150 and leads 3140*a* and 3140*b* are preferably initially formed by stamping a conductive sheet, such as a copper sheet, which may be flat and will produce a flat coil, as shown for example in FIG. 6. It is appreciated that the surfaces of the coil 3150 may be somewhat or slightly rounded, bowed or curved based on the process used to form the coil 3150, and the side edges may be rounded or curved. Acceptable metals used for forming the coil and leads may be copper, aluminum, platinum, or other metals for use as inductor coils as are known in the art. As used herein, "flat" means "generally flat," i.e., within normal manufacturing tolerances. It is appreciated that the flat surfaces of the coil 3150 may be somewhat or slightly rounded, bowed, curved or wavy based on the process used to form the coil 3150, and the side edges may be somewhat or slightly rounded, bowed, curved or wavy, while still being considered to be "flat."

After stamping, leftover copper strips referred to as carrier strips or frame portions remain, with at least one of the strips having progressive holes at the opposite ends of the leads. The holes may be used for alignment in connection with manufacturing equipment. The stamped copper coil, leads and frame portions may be referred to collectively as a "leadframe." Examples are shown in FIGS. 6-11. Initially, such as during manufacturing, the shaped coil and leads may lie in the same plane. Each lead 3140*a* and 3140*b* will ultimately be bent around the inductor body, with a lead contact portion 3130 bent underneath the bottom of the inductor body. The leads 3140*a* and 3140*b* and coil 3150 are preferably formed as a unitary piece, without a weld.

In an embodiment shown in FIGS. 1, 4A, 5 and 6, the coil 3150 comprises a serpentine or meandering coil provided as an "S" shaped coil or "S-coil," when viewed from the top as oriented in the relevant Figures. The coil 3150 has a central portion 3151 crossing diagonally through the middle of the coil. A first curved portion C1 has a first end 3152 extending from one of the leads 3140*b*, and a second end 3153 curving around the center of the coil 3150. A second curved portion C2 has a first end 3155 extending from the other of the leads 3140*a*, and a second end 3154 curving around the center of the coil 3150 in an opposite direction from the first curved portion C1. Each curved portion forms an arc encircling part of the center of the coil 3150. The curved portions may each run along a circumferential path about the center.

The coil 3150 may have a central portion 3151 that may be formed as a flat, straight strip, running from the second end 3153 of the first curved portion C1 and across the center of the coil 3150 to the second end 3154 of the second curved portion C2. This central portion 3151 completes the "S" shape.

This S-coil or "S" shape is illustrative of a preferred embodiment. Other configurations are also contemplated, as will be discussed in part below, including arc, Z-coil or N-coil configurations. A coil configuration that extends along a meandering path between leads, with a portion of the coil crossing the mid-line or central portion of the coil or an inductor body, would be considered to be a "serpentine" coil. For example, and without limitation, an S-coil, Z-coil, N-coil, and other shaped coils having meandering paths traced from one lead to the other lead are considered to be "serpentine" coils. A serpentine coil may be distinguished from a "winding" coil formed from a wire that encircles a central portion of an inductor core, but does not have a portion crossing or traversing the central portion or a central line of an inductor core.

Figure 4A:
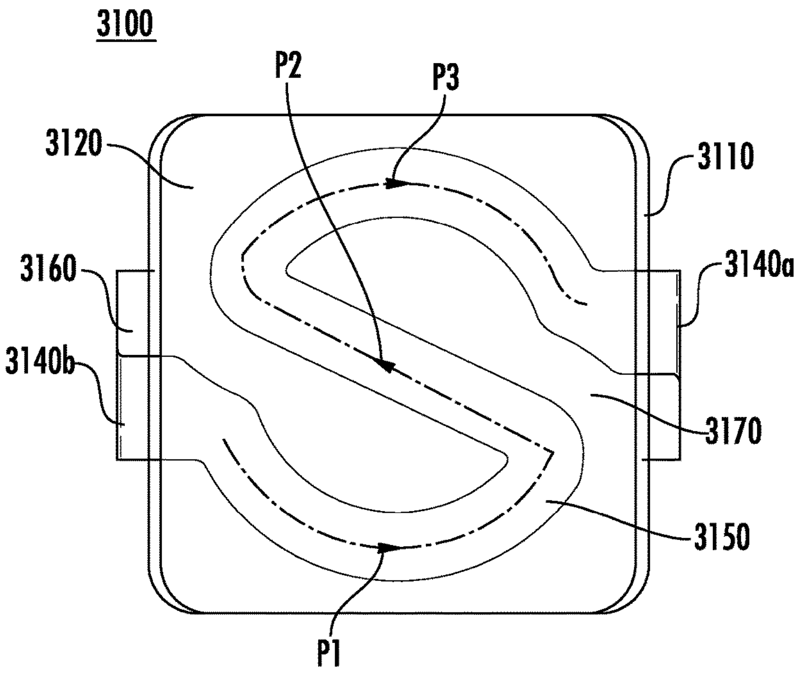
FIG. 4A illustrates a view of the inductor of FIG. 1 shown from the top in partial transparency.
Figure 7:
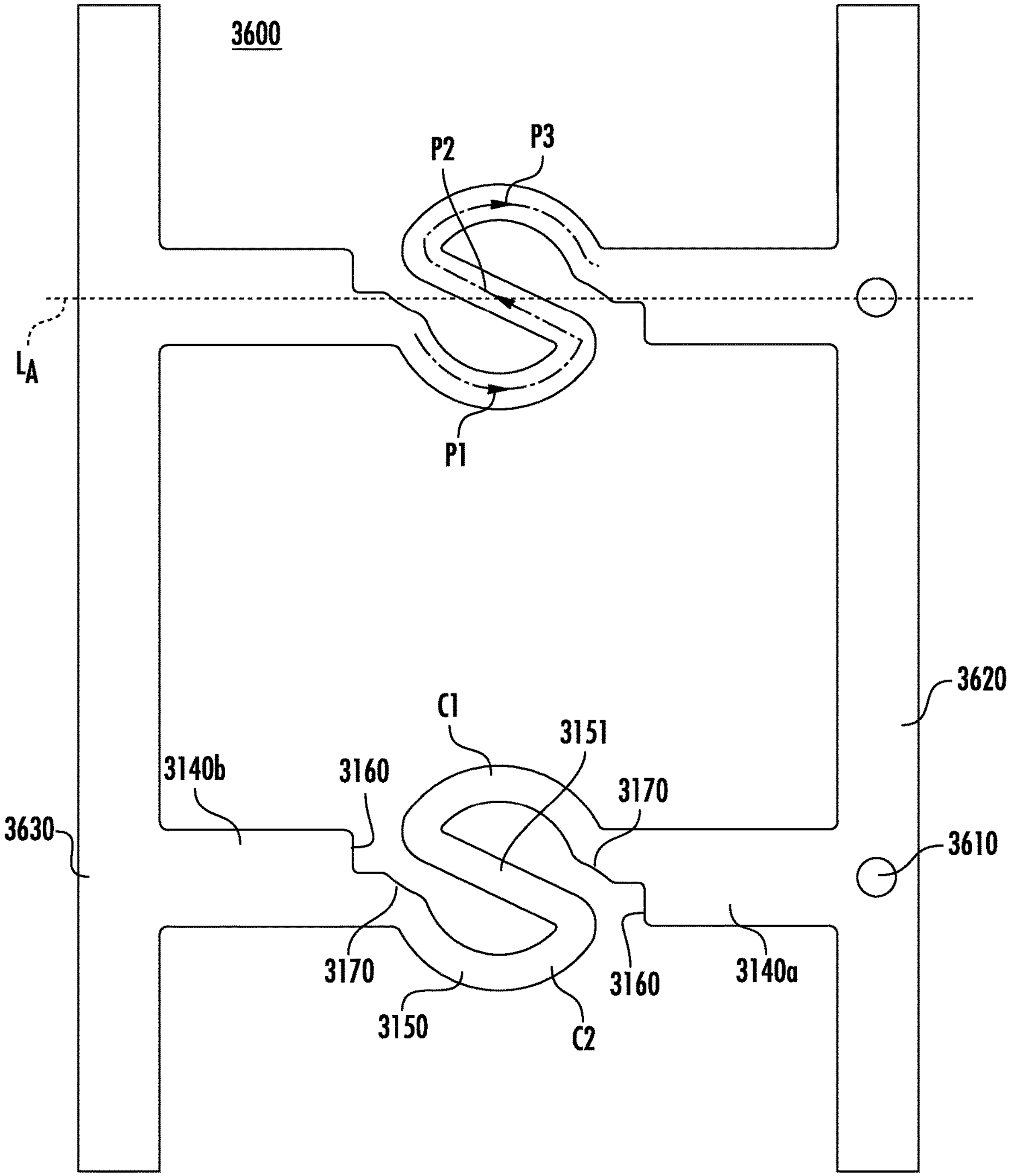
FIG. 7 illustrates a top down perspective leadframe formed at the stamping step in the method of FIG. 5

As shown in FIGS. 4A and 7, a serpentine coil 3150 of the invention may have a first path P1 extending toward a first direction from one side of the inductor toward the opposite side, such as extending from a side of the inductor including the lead 3140*b* toward an opposite side of the inductor including the lead 3140*a*. In a preferred embodiment, the first path P1 is a curved or arced path curving away from a central portion of the coil.

A second path P2 continues from the first path P1 and extends toward a second direction, crossing a central line $L_A$ of the coil. In a preferred embodiment, the second path P2 slopes diagonally across the center and central line $L_A$ of the coil from the side where the first path P1 ends back toward the side where the first path P1 began, such as extending from a side of the inductor including the lead 3140*a* back toward an opposite side of the inductor including the lead 3140*b*. The second path P2 may be a generally straight path along most of its length.

A third path P3 continues from the second path P2 and extends in a third direction from one side of the inductor toward the opposite side, such as extending from a side of the inductor including the lead 3140*b* toward an opposite side of the inductor including the lead 3140*a*. In a preferred embodiment, the third path P3 is a curved or arced path curving away from a central portion of the coil. In a preferred embodiment, the first and third directions are generally the same, while curving in opposite directions, and also both differ from the second direction. The combination of path P1, P2 and P3 is a preferably contiguous serpentine path, uninterrupted and formed from the same conductor.

The first and third path P1 and P3 may trace curved paths, straight paths or combinations of curved and straight paths. For example, as shown in an alternate embodiment in FIG. 16, an "N"-shaped coil may trace a first path P1 that is generally straight from a first side of the inductor to an opposite side, a second path P2 running diagonally across a center line $L_A$ back toward the first side, and a third path P3 that is generally straight from a first side of the inductor to an opposite side along most of the lengths of those paths.

Figure 16:
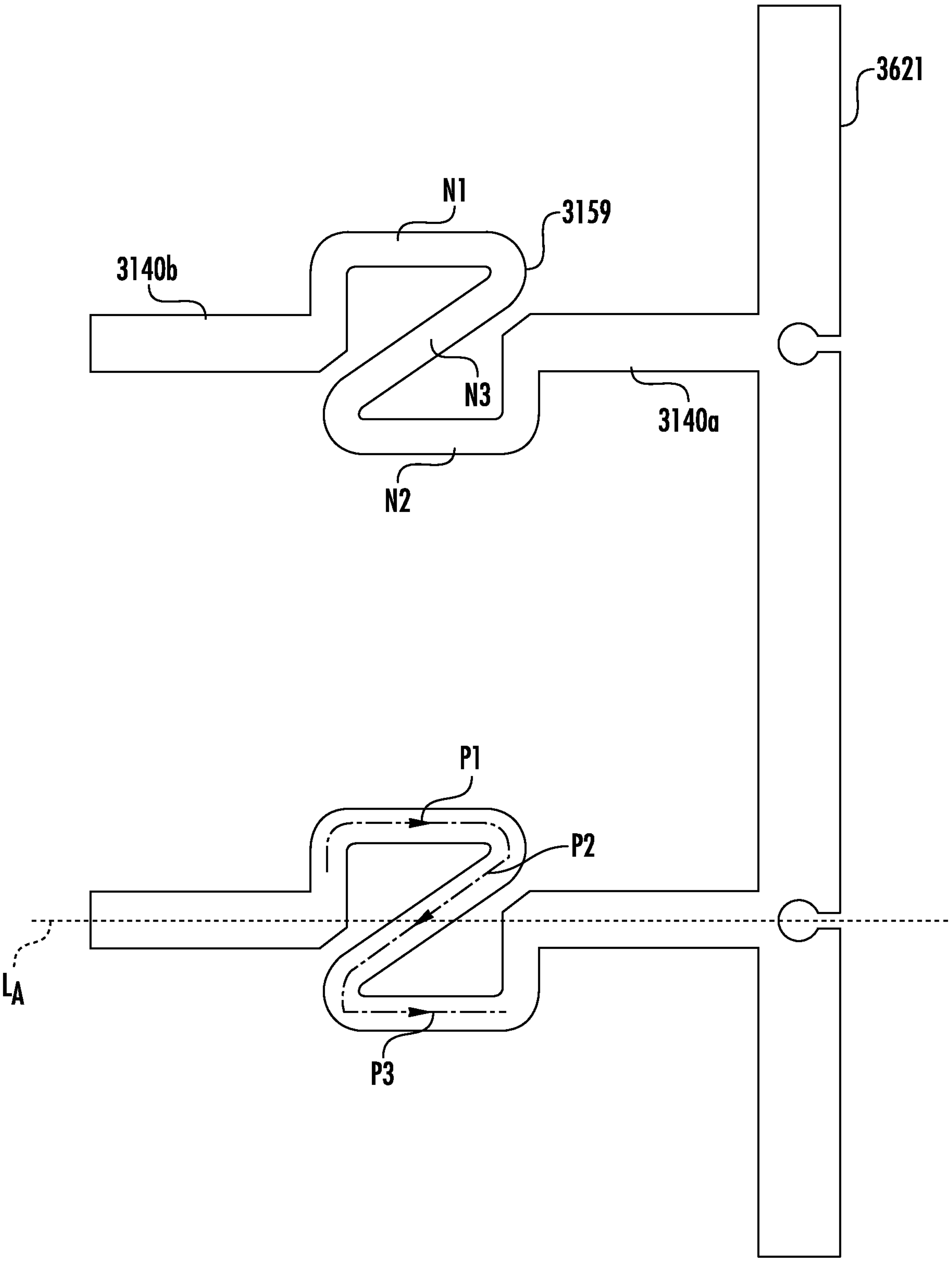
FIG. 16 illustrates another embodiment of a leadframe and coil according to the present invention.

In the arrangements of the coil having an "S", "N" or "Z"-shape, spaces or gaps are provided between the various portions of the coil, such as between the curved portion C1 and the central portion 3151, and between the curved portion C2 and central portion 3151. In the embodiments having an "S"-shape, the spaces or gaps have a generally semi-circular shape, as shown in FIGS. 4A, 7 and 25 and 39. In the "N"-shaped embodiment as shown in FIG. 16, the spaces or gaps have a generally triangular shape. In a "Z"-shaped coil, the spaces or gaps would also have a generally triangular shape.

The shape of the coil 3150 is designed to optimize the path length to fit the space available within the inductor while minimizing resistance and maximizing inductance. The shape may be designed to increase the ratio of the space used compared to the space available in the inductor body. In an embodiment of the invention, coil 3150 is preferably flat and oriented essentially in a plane.

The "S" shape optimizes the inductance and resistance values compared to other non-coil conductor configurations. A 1212 package size (approximately 0.12"×0.12"×0.04") with the S-coil may produce inductance values in the range of 0.05 uH at 2.2 mΩ. A 4040 package size (approximately 0.4"×0.4"×0.158") with the S-coil may produce inductance values in the range of 0.15 uH at 0.55 mΩ. The 1616 package size with the S-coil may produce inductance values of 0.075 uH and the 6767 package size with the S-coil may produce inductance values of 0.22 uH.

Figure 2:
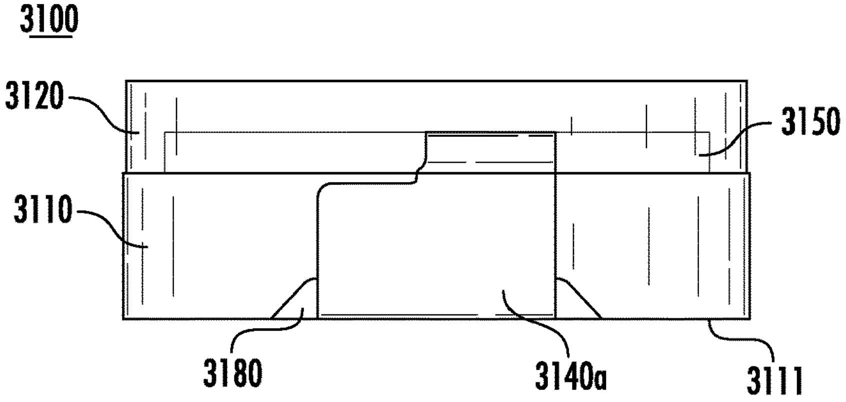
FIG. 2 illustrates an end view of the inductor of FIG. 1 shown from a lead end.
Figure 3:
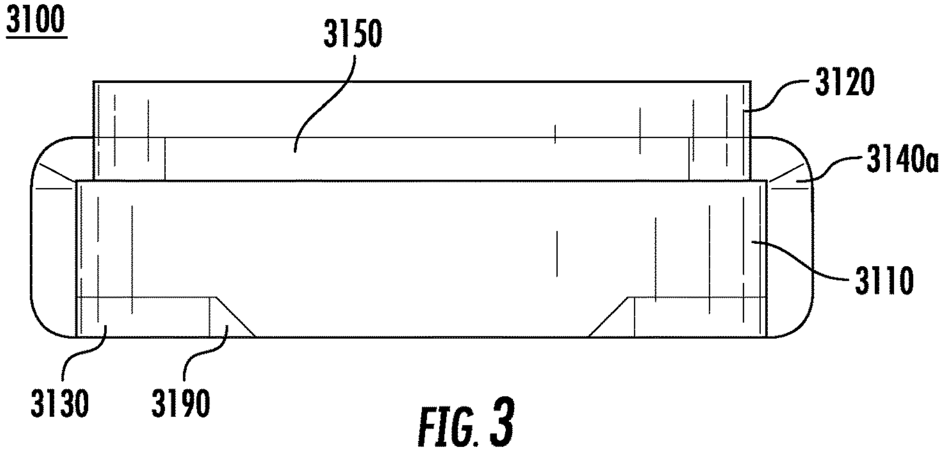
FIG. 3 illustrates an end view of the inductor of FIG. 1 shown from a non-lead end.

According to the illustrative embodiment shown in FIGS. 1-4, showing the inductor body in partial transparency so as to view the interior, a finished inductor 3100 according to the invention includes an inductor body shown in partial transparency formed about, pressed over or otherwise housing the coils and at least parts of the leads, including a first body portion 3110 and a second body portion 3120. As illustrated in FIGS. 1-4C, a first body portion 3110 and a second body portion 3120 sandwich, are pressed around or otherwise house the shaped coil 3150 and parts of the leads 3140*a* and 3140*b* to form the finished inductor 3100. From the sides as shown in FIG. 2 and FIG. 3, inductor 3100 may be seen with the first body portion 3110 on the bottom and the second body portion 3120 on the top.

In the illustrated embodiment of FIG. 2 and FIG. 3, which are shown as partially transparent, first body portion 3110 and second body portion 3120 are shown as separate or discrete portions used to form the finished inductor 3100, although a single, unitary overall body may be used. In alternative implementations, any number of body portions may be used. The body may be formed of a ferrous material. The body may comprise, for example, iron, metal alloys, or ferrite, combinations of those, or other materials known in the art of inductors and used to form such bodies. First body 3110 and second body portion 3120 may comprise a powdered iron or similar materials, as will be further discussed. Other acceptable materials as are known in the art of inductors may be used to form the body or body portions, such as known magnetic materials. For example, a magnetic molding material may be used for the body, comprised of a powdered iron, a filler, a resin, and a lubricant, such as described in U.S. Pat. No. 6,198,375 ("Inductor coil structure") and U.S. Pat. No. 6,204,744 ("High current, low profile inductor"). While it is contemplated that first body portion 3110 and second body portion 3120 are formed in similar fashion and of the same materials, first body portion 3110 and second body portion 3120 may be formed using different processes and from distinct materials, as are known in the art.

Figure 4B:
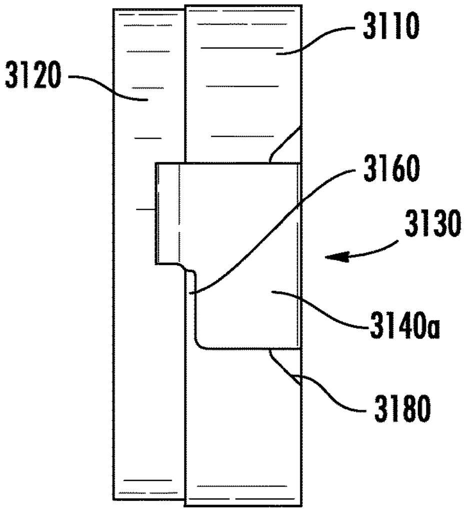
FIG. 4B illustrates a side view of inductor of FIG. 1 viewed from the lead edge.
Figure 4C:
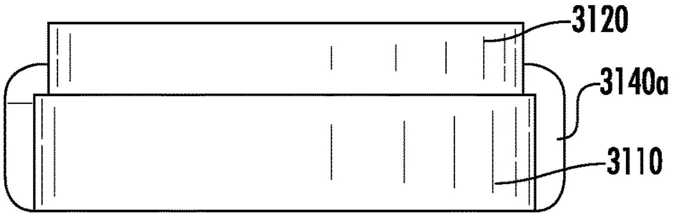
FIG. 4C illustrates a side view of inductor of FIG. 1 viewed from the non-lead edge.

The first body portion 3110 and second body portion 3120 surround the coil and parts of the leads, and may be pressed or over-molded around the coil 3150, initially leaving exposed parts of the leads 3140*a* and 3140*b* until they are folded underneath first body portion 3110 as shown in their final state in the partially transparent examples of FIG. 4A-C. In a finished inductor or "part," each lead 3140*a* and 3140*b* may run along sides of the first body portion 3110 as shown in FIG. 4B. Each lead 3140*a* and 3140*b* terminates with a contact portion 3130 bent underneath the first body portion 3110 as visible in FIG. 1.

As seen in FIG. 1, a shelf 3160, step or indentation may be formed by the portion of lead 3140*a* that bends along an outer side of the inductor body 3110. The shelf 3160 is formed adjacent where the lead meets the coil 3150, which can also be seen in FIG. 3. The shelf 3160 may transition to a diameter less than the other portions of the lead 3140. This shelf 3160 allows for the lead thickness exiting the body to be smaller to improve the ability to form the part. This shelf 3160 allows additional room for the coil inside the body. It is appreciated that this shelf 3160 is not required in all circumstances, and an inductor or coil or leads according to the invention could be formed without such a shelf.

As seen in FIG. 1, the configuration of coil 3150 may include a coil cutout 3170 adjacent an inner side of the coil where the shelf 3160 transitions to the curved portions C1, C2. Coil cutout 3170 allows separation (space) between the lead and coil.

FIG. 2 shows that the body of the inductor may include a first cutout 3180 or groove in the first body portion 3110 to provide access for placing the lead contact portion 3130 under and against the bottom 3111 of the outer surface of the first body portion 3110. FIG. 3 shows that a second cutout 3190 or groove may also be provided in the first body portion 3110 to provide further access for placing the lead contact portion 3130 under and against the bottom 3111 of the outer surface of the first body portion 3110.

FIGS. 4A-C illustrate additional views of inductor 3100. FIG. 4A illustrates a partially transparent view of the inductor 3100, with the coil 3150 visible through the transparency. FIG. 4B illustrates a side view of inductor 3100 viewed from the lead 3140*a* edge. FIG. 4C illustrates a side view of inductor 3100 viewed from the non-lead edge. As illustrated coil 3150 may be shaped as an "S" or "Z," depending on orientation. As used herein, the "S" or "Z" shaped may also comprise the mirror-image of such shapes when viewed from the top as shown in the Figures. For example, it is appreciated that the orientation of coil 3150 may be rotated 180 degrees to form the other of an "S" or "Z" configuration.

Figure 5:
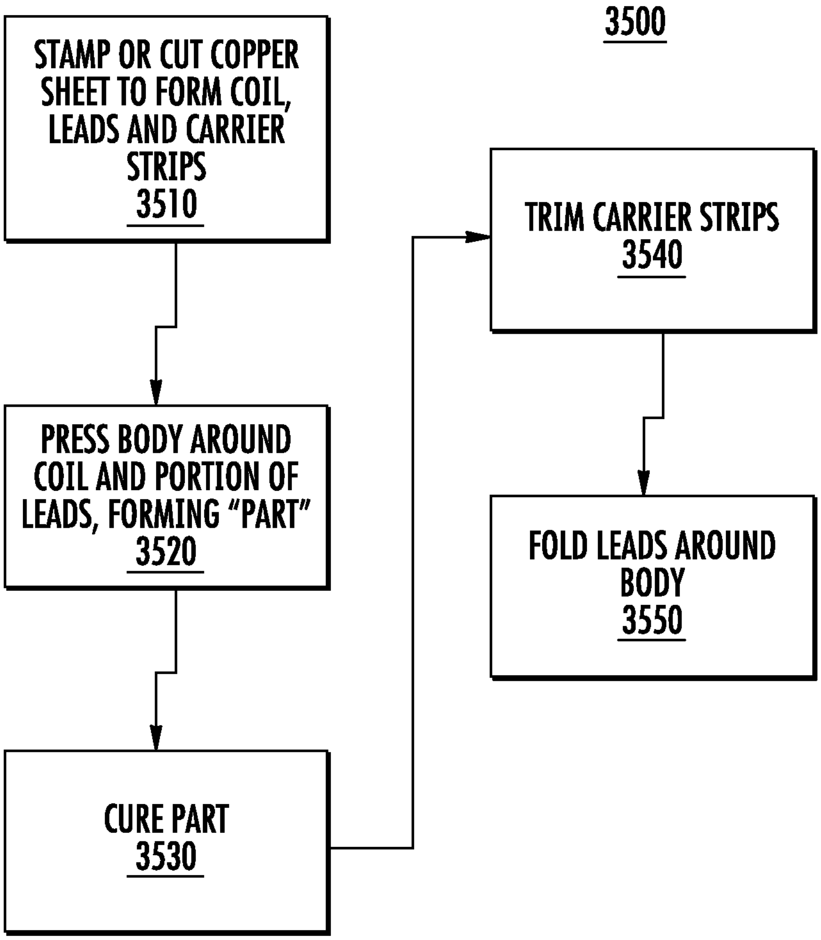
FIG. 5 illustrates schematically a method of making an inductor according to an embodiment of the present invention.

FIG. 5 depicts a method 3500 for making inductor 3100. At step 3510, the inductor is produced by stamping to produce features that become leads and a coil between the leads in a desired shape. The stamping may be performed on flat sheets of copper to produce features which make up electrical leads, one on one side of the part and one on the other side of the part, and a coil joining the two leads formed in an "S" shape. The stamped S-coil inductor is a simple and cost effective way to produce consistent inductors with inductance lower than lull. The stamped S-coil inductor is a simple and cost effective way to produce consistent inductors with a direct current resistance up to 80% lower than current high current, lower profile production methods in some instances.

Figure 6:
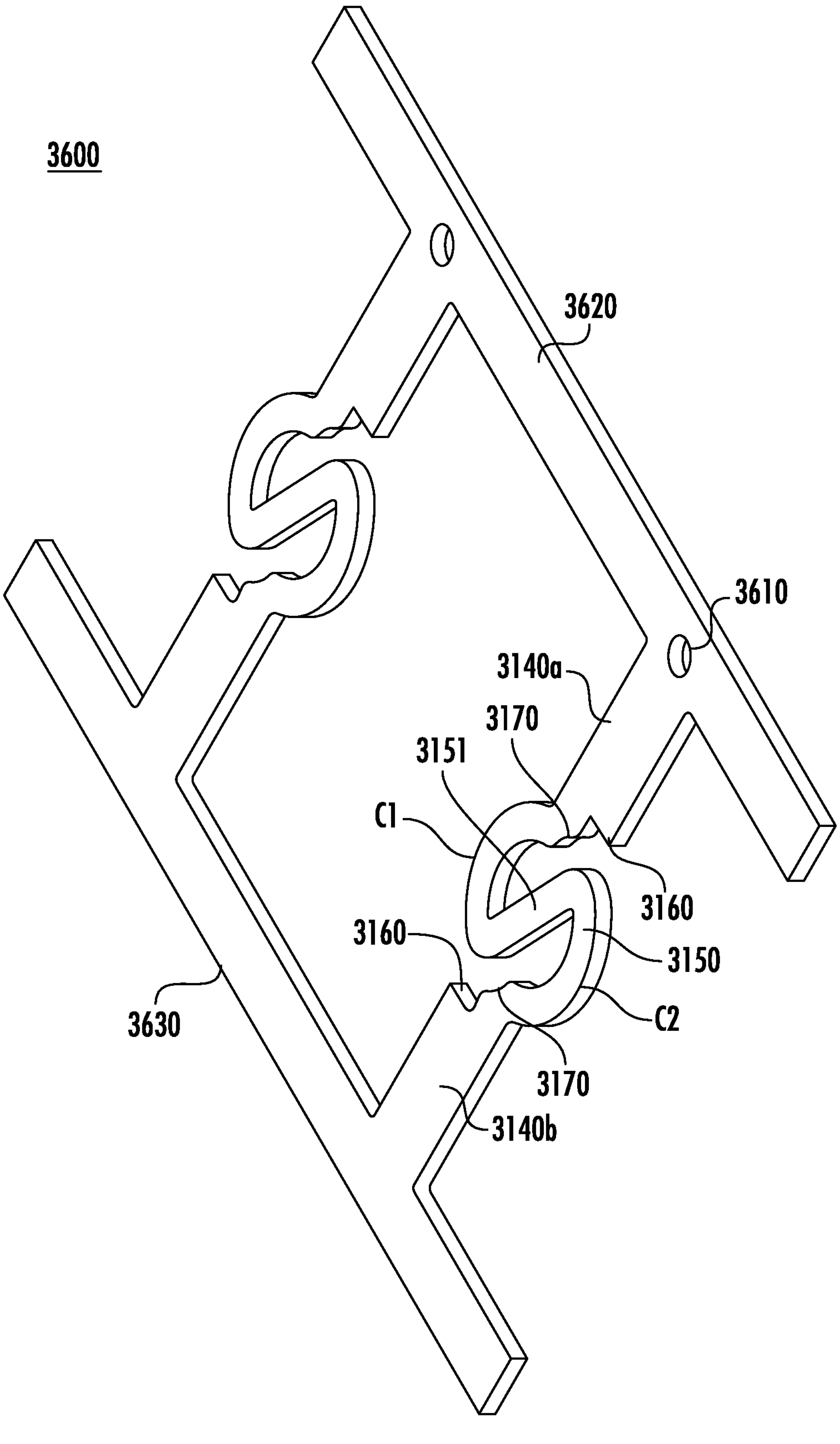
FIG. 6 illustrates a leadframe formed at the stamping step in the method of FIG. 5.

As seen in FIG. 6, the sheets of copper may have leftover copper strips with progressive holes for alignment into manufacturing equipment, which are referred to as carrier strips or frame portions. The stamped copper sheets may be referred to as "leadframe."

Continuing with the method shown in FIG. 5, at step 3520, pressed powder, such as powdered iron, is poured into a die and pressed into a body about the coil with the leads extending therefrom. For example the body may be pressed to form a desired shape with a body similar to an IHLP inductor. The iron core and leadframe may now be referred to as a "part."

At step 3530, the part is cured in an oven. This curing process binds the core together.

After curing at step 3540, the carrier strip is trimmed away from the leads on the leadframe.

The leads are folded around the body of the inductor to form the lead contact portions at step 3550.

The stamped coil and leads could also be assembled using other known core materials known to the art.

FIGS. 6-7 collectively illustrate a leadframe 3600 formed at the stamping step (step 510) in method 3500. FIG. 6 illustrates an isometric view of leadframe 3600 and FIG. 7 illustrates an overview of leadframe 3600. FIGS. 6-7 illustrate leadframe 3600 including a two coil 3150 structure as part of the leadframe. It is appreciated that any number of coils may be formed in the manufacturing process along a leadframe, and two coils are shown for ease of illustration and understanding only.

Leadframe 3600 includes a first frame portion 3620 and a second frame portion 3630 (also referred to as "carrier strips") at the ends of the leads, and with the coil positioned centrally between the first frame portion 3620 and a second frame portion 3630. The inductor assembly includes leads 3140, and coil 3150. Adjacent to lead 3140*a* is a shelf 3160. The coil 3150 includes a coil cutout 3170. First frame portion 3620 includes an alignment hole pattern 3610. This pattern 3610 enables alignment as part of the manufacturing process. For example, during pressing.

Figure 8:
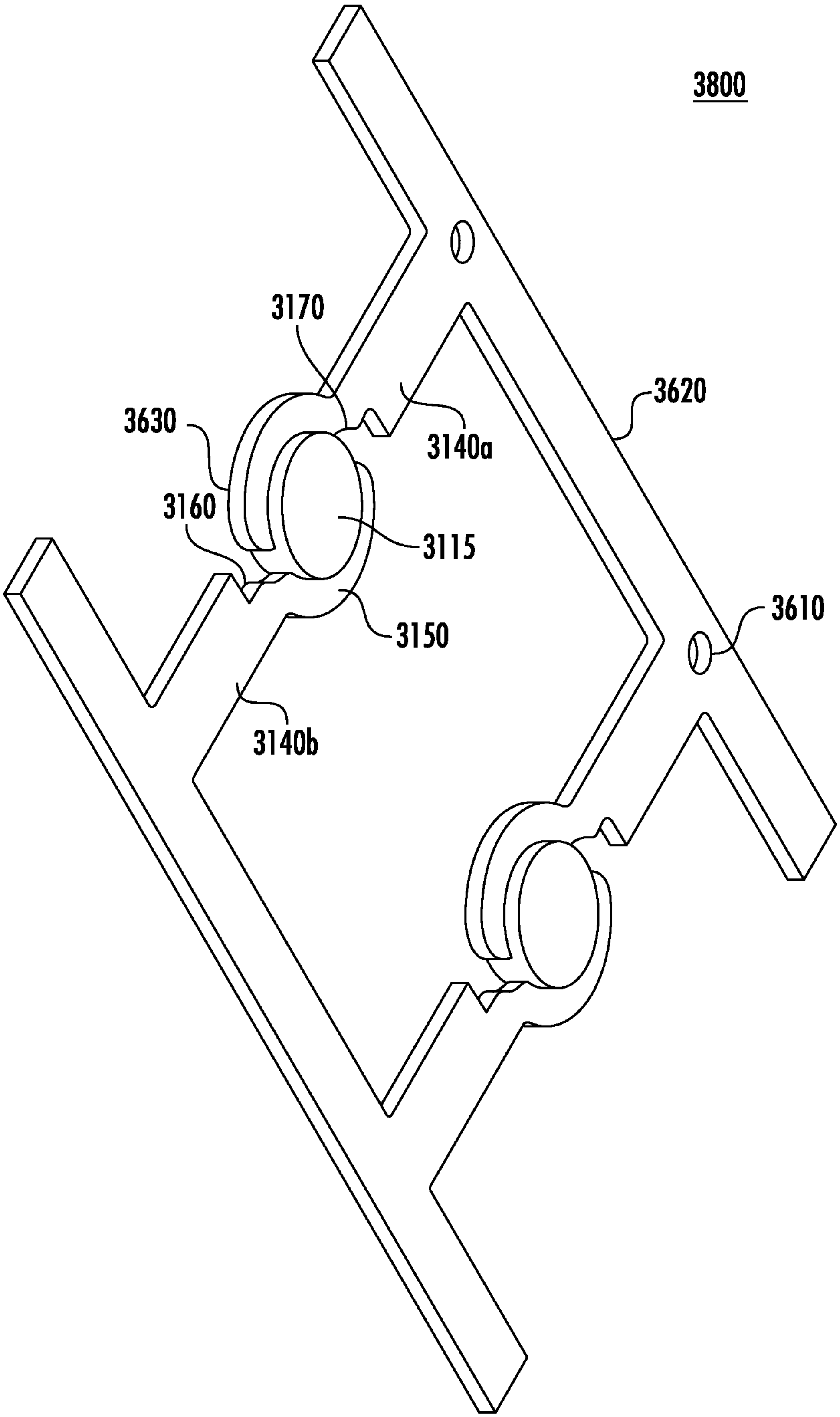
FIG. 8 illustrates a part formed at the pressing step in the method of FIG. 5.
Figure 9:
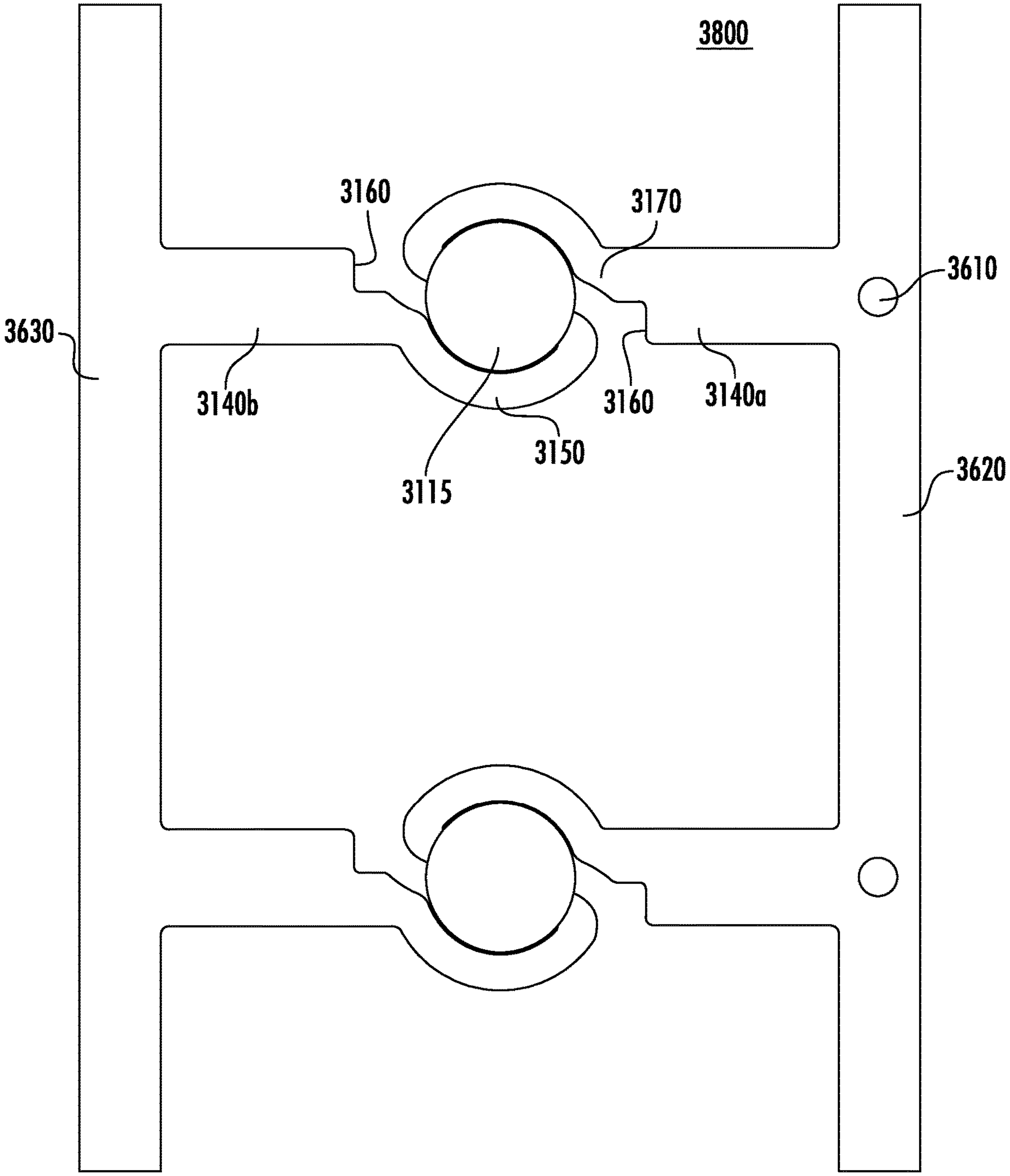
FIG. 9 illustrates a top down perspective of a part formed at the pressing step in the method of FIG. 5.
Figure 10:
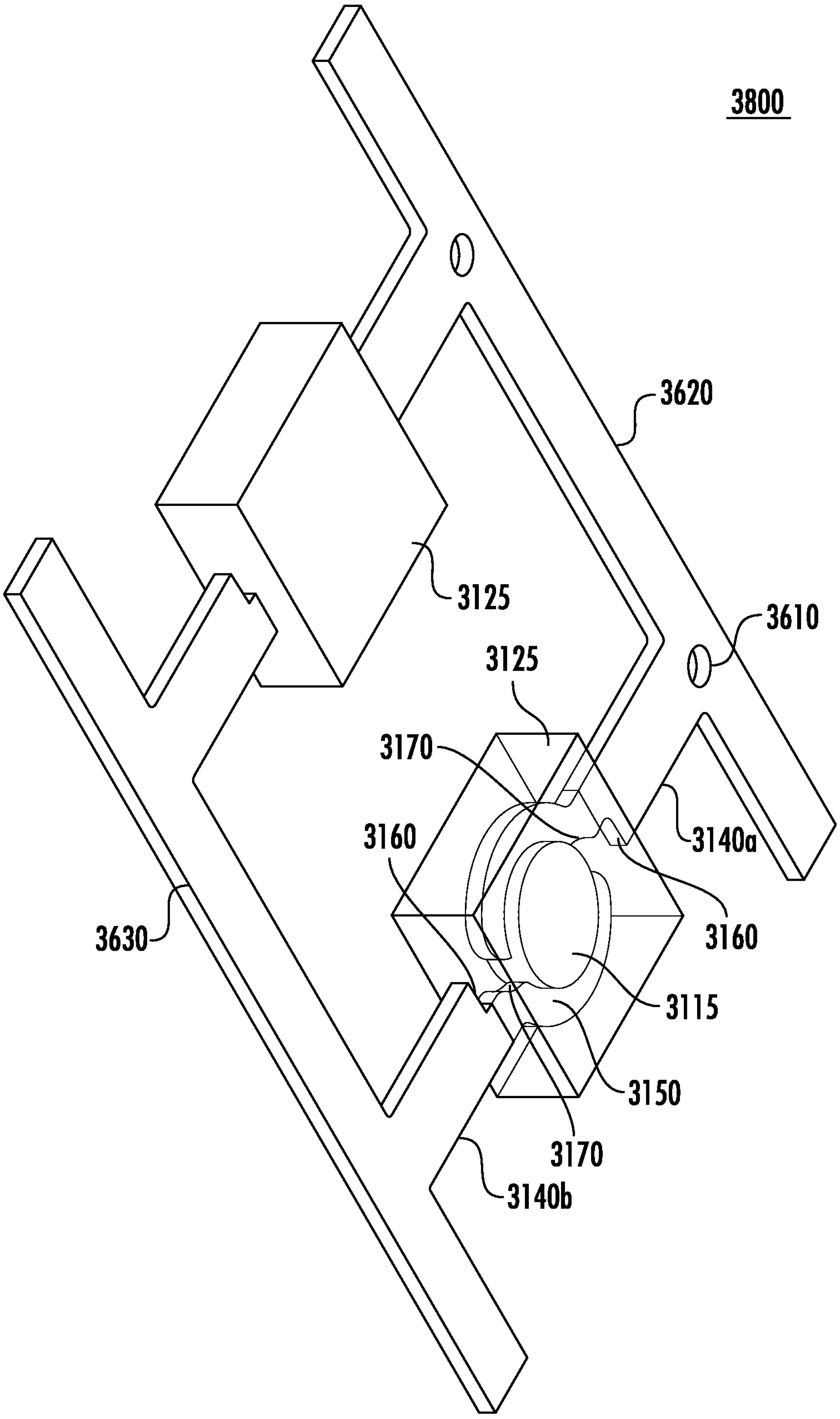
FIG. 10 illustrates a part formed at the pressing step in the method of FIG. 5.

FIGS. 8-11 illustrate a part 3800 of an inductor formed at the pressing step (step 3520) in the method discussed in FIG. 5. FIG. 8 illustrates an isometric view of part 3800 formed at the pressing step depicting only the inner core 3115 surrounding the coil. FIG. 9 illustrates an overview of part 3800 shown in FIG. 8. FIG. 10 illustrates an isometric view of part 3800 formed at the pressing step depicting one of the inductors with body 3110, 3120 included and another where the body 3110, 3120 is shown in partially transparent visual allowing the inner core 3115 and coil 3150 to be viewed. FIG. 11A illustrates part 3800 in an overview of part 3800 with the outer body 3125 in partial transparency to show positioning of inner core 3115 and coil 3150. FIG. 11B illustrates provides a partially transparent side view of part 3800 from FIG. 10.

Part 3800 includes leadframe 3600, which includes first frame portion 3620 and second frame portion 3630 on opposite ends of the leads 3140*a* and 3140*b* and coil 3150. Adjacent to lead 3140*a* is a shelf 3160, indentation or step. On coil 3150 is a coil cutout 3170. First frame portion 3620 includes an alignment hole pattern 3610. This pattern 3610 enables alignment within the manufacturing process.

In an embodiment of the invention, part 3800 includes body 3125 pressed over the coil 3150 and a portion of leads 3140, leaving exposed portions of the leads 3140*a* and 3140*b* and the first frame portion 3620 and second frame portion 3630. Body 3125 may include first body portion 3110 and second body portion 3120 as described. Body 3125 may be formed from pressing a ferrite material around the coil 3150. Body 3125 may be separate from an inner core 3115 or they may be formed together, such as a unitary part. The inner core can be formed in different ways: the material can be formed separately, typically from ferrite, and then laid on top of the coil and then the body can be pressed around it, or the inner core can be pressed around the coil separately, typically using some type of iron, and then the outer core can be pressed around the inner core using the same or different materials. The inner core could be used as the sole source of permeable material, or as the sole body of the device, without the outer core. When an inner core is used, the body 3125 may encase the inner core 3115. In addition, a body 3125 could be formed as a unitary piece or combination with an inner core 3115. In addition, the body may only be an inner core.

Figure 11A:
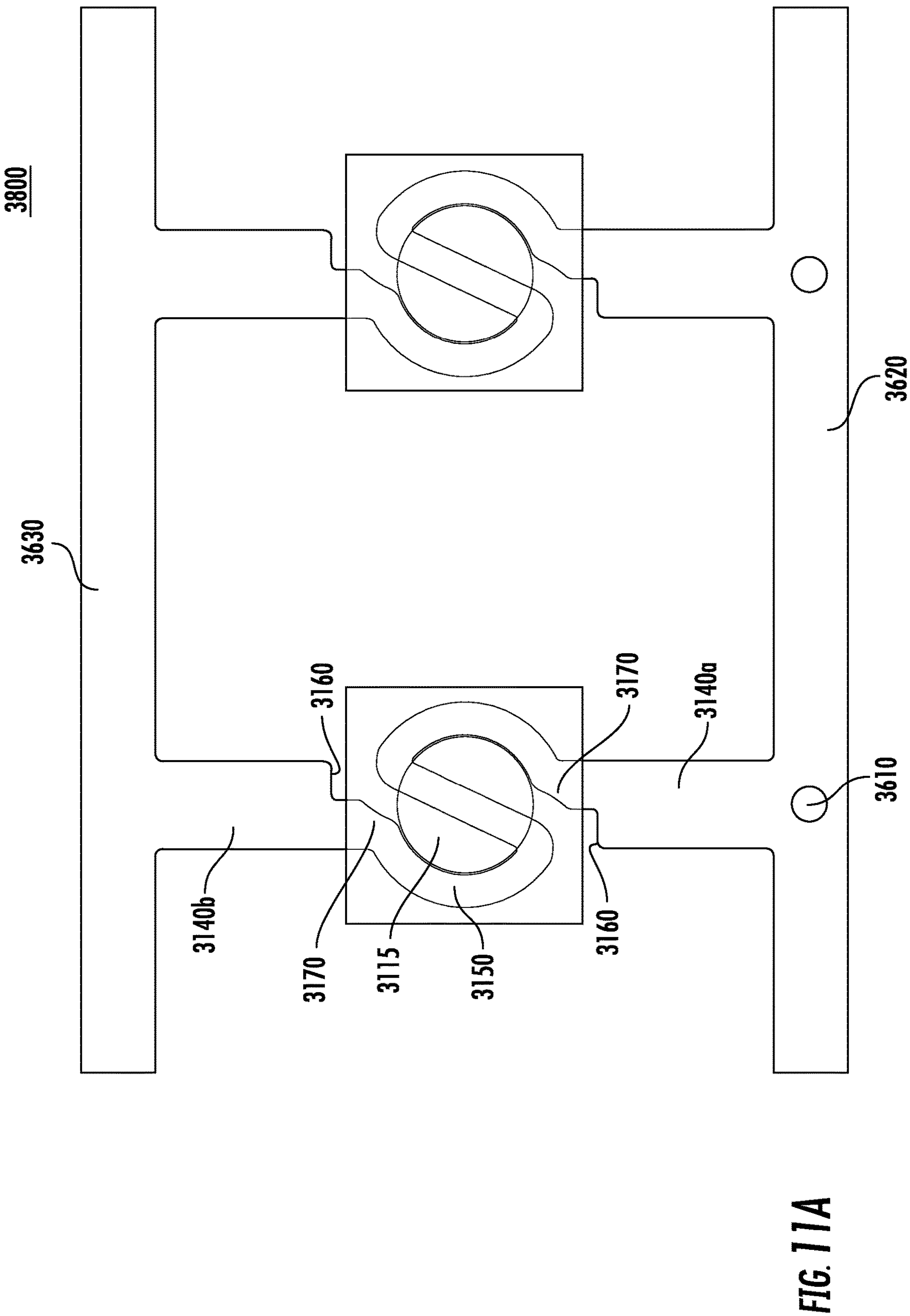
FIG. 11A illustrates a top down perspective of a part formed at the pressing step in the method of FIG. 5.
Figure 11B:
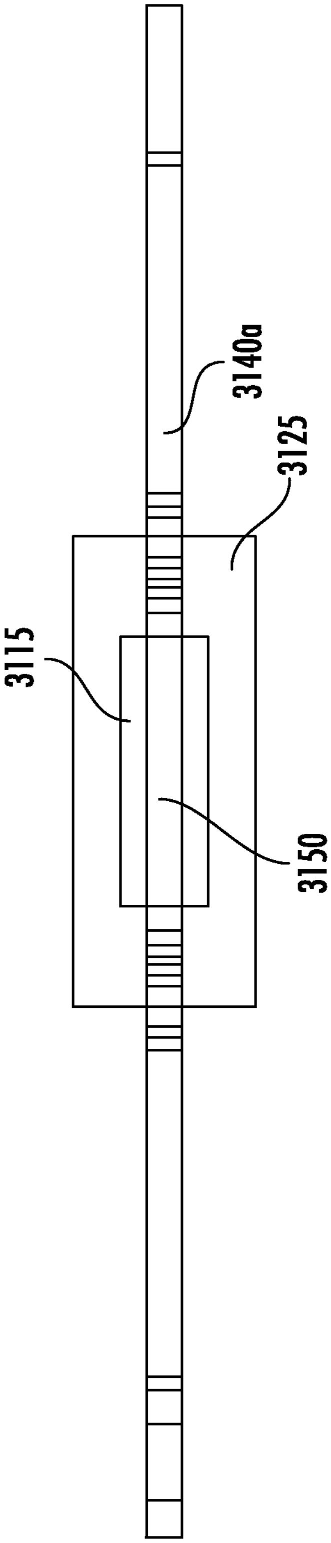
FIG. 11B illustrates a side perspective of a part formed at the pressing step in the method of FIG. 5.

FIGS. 10 and 11A and B show the inductor body 3125, illustrating the body 3125 and inner core 3115, with the body 3125 shown in transparency. The inner core 3115 may or may not be a separate part of the body 3125, and is shown isolated for illustrative purposes in FIGS. 8 and 9. The inner core 3115 is generally cylindrical, and includes a channel shaped to receive the central portion 3151 of the coil 3150. The curved portions C1, C2 of the coil 3150 surround the inner core 3115, as shown ion FIG. 10. When the first body portion 3110 and second body portion 3120 are brought together, they may form or otherwise contain the inner core 3115.

Figure 12:
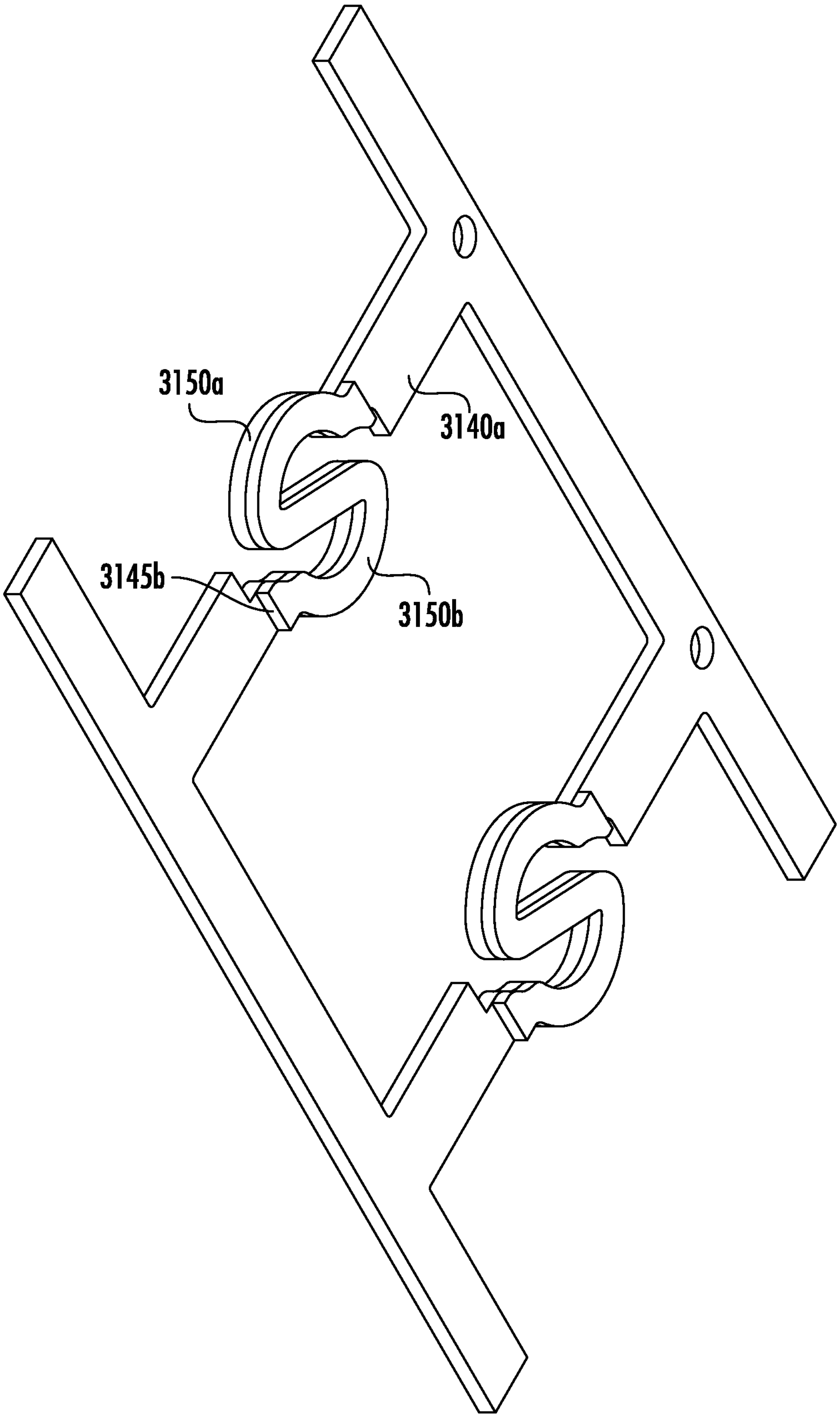
FIG. 12 illustrates a leadframe with embodiments of an inductor coil according to the invention.
Figure 13:
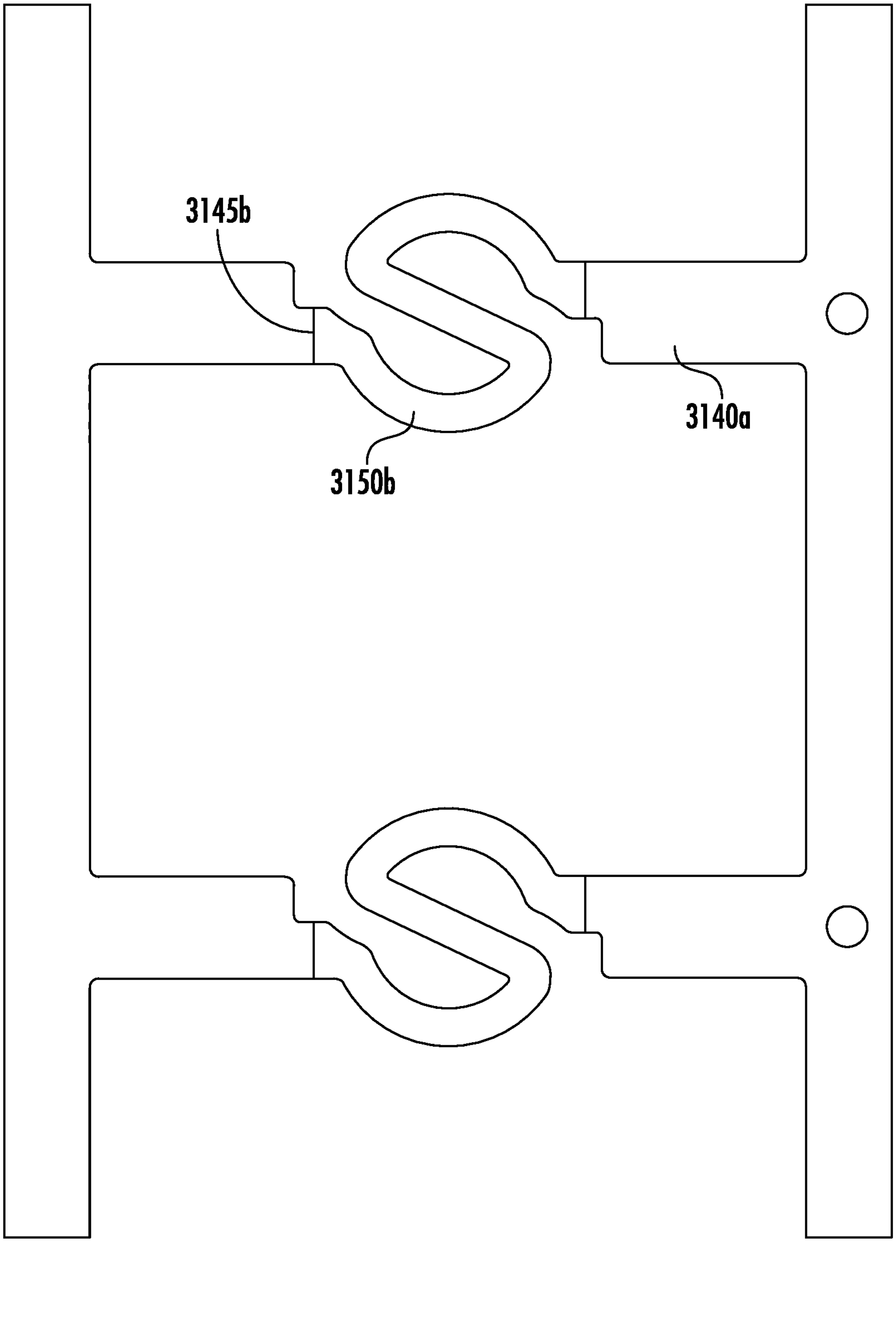
FIG. 13 illustrates a top view of the leadframe and inductor coils of FIG. 12.
Figure 14:
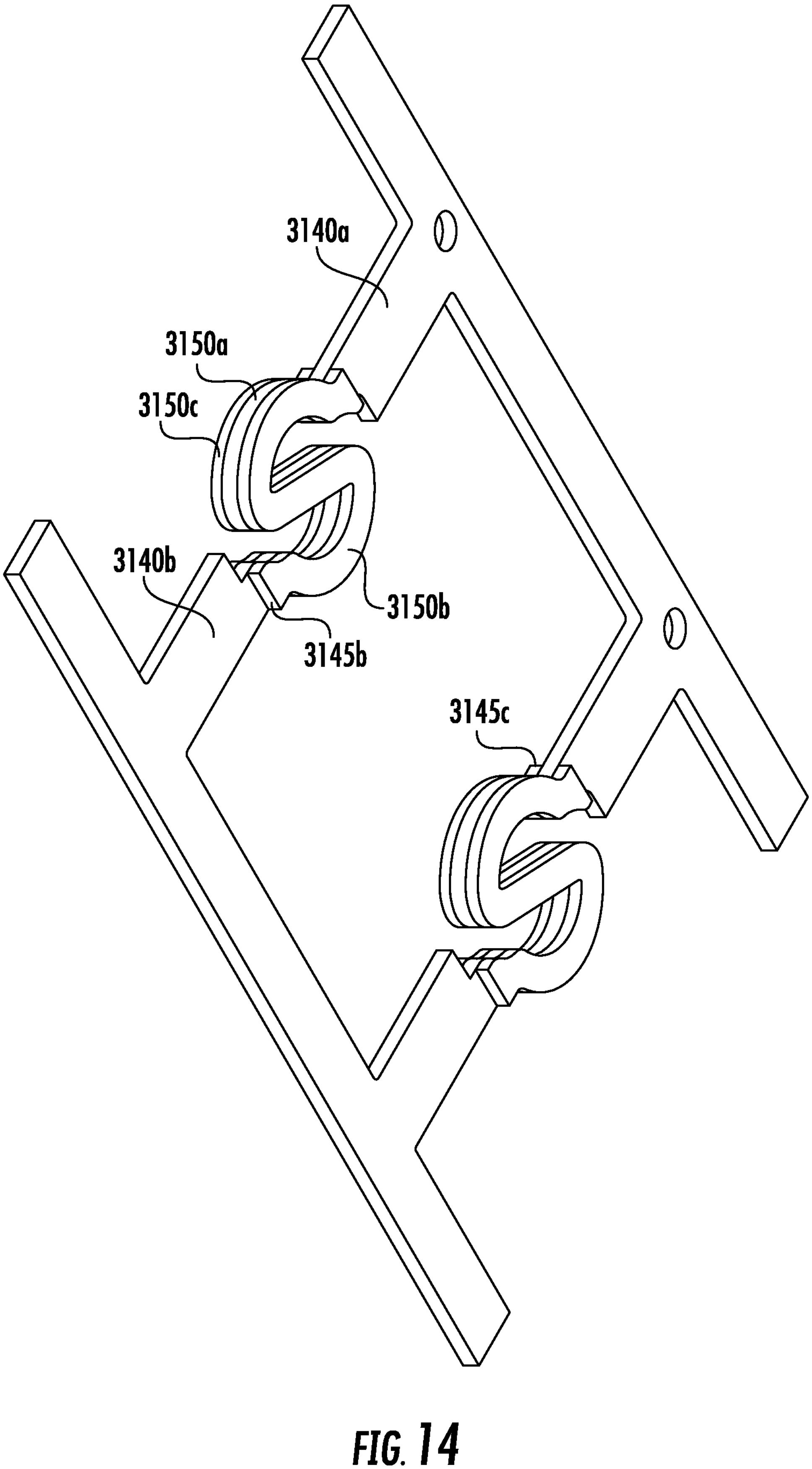
FIG. 14 illustrates a leadframe with embodiments of an inductor coil according to the invention.

In one embodiment, an inductor may have multiple stacked coils, as shown in the examples of FIGS. 12-14. FIG. 12 illustrates an isometric view of inductor 3100 with two coils. As depicted in FIG. 12 where coils are attached to a leadframe, a second coil 3150*b* is aligned and adhered to, such as laminated to, a first coil 3150*a*. In adhering the coils 3150*a*, 3150*b* together, solder may be used. This solder in addition to adhering and maintaining alignment provides an electrical connection between the first coil 3150*a* and the second coil 3150*b*. The multi-coil structure of FIG. 12 may be formed by aligning and attaching coils held by two leadframes, or by aligning and adhering a second coil that has already been separated by a leadframe and/or leads to a first coil. Once aligned and adhered, the leadframe for the second coil 3150*b* may be removed for subsequent processing steps exposing a singular lead 3140.

FIG. 13 illustrates a top view of the multi-coil, multi-layered embodiment of FIG. 12. From this view, only the second coil 3150*b* may be seen. The leadframe associated with the second coil 3150*b* has been removed exposing the lead 3140*a* from the first coil 3150*a* leadframe. If formed by aligning two leadframes, a boundary 3145*b* or edge may be formed where the leadframe of the second coil 3150*b* is removed. The coils may also be separated from each other within the body using insulation between each coil layer. This insulation may provide improved performance of the inductor in certain situations. The insulation may comprise Kapton™, Nylon™, or Teflon™, or other insulative materials as are known in the art. The coils may be connected on the ends using a method such as welding and/or soldering.

Figure 23:
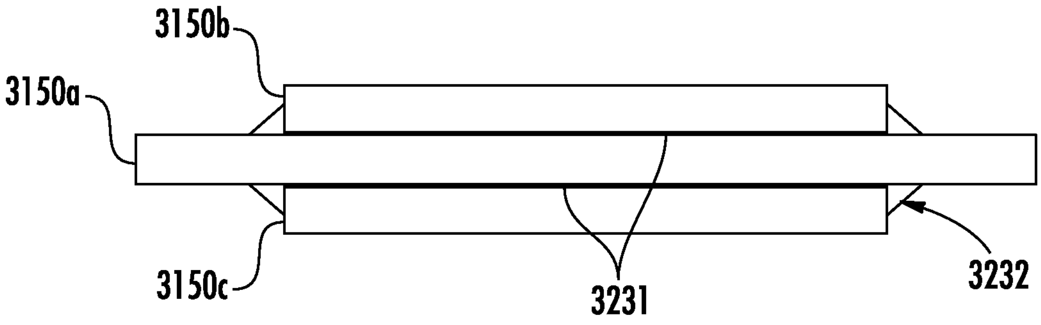
FIG. 23 illustrates connections of insulated coils via welding and/or soldering.

FIG. 14 illustrates an inductor 3100 with a plurality of coils, showing a three-coil design. As depicted a first coil 3150*a* is included in the leadframe and a second coil 3150*b* is aligned and adhered to a top of the first coil 3150*a* and a third coil 3150*c* is aligned and adhered to a bottom of the first coil 3150*a*. In adhering the coils 3150*a*, 3150*b* and 3150*a*, 3150*c*, a solder 3232 may be used as shown in FIG. 23. This solder in addition to adhering and maintaining alignment provides an electrical connection between the first coil 3150*a* and the second coil 3150*b*. Once aligned and adhered the leadframe for the second coil 3150*b* and the third coil 3150*c* may each be removed for subsequent processing steps exposing a singular lead 3140.

The leadframe associated with the second coil 3150*b* has been removed exposing the lead 3140*a* from the first coil 3150*a* leadframe. A boundary 3145*b* is formed from the removal of the leadframe of the second coil 3150*b*. The leadframe associated with the third coil 3150*c* has been removed exposing the lead 3140*a* from the first coil 3150*a* leadframe. A boundary 3145*c* is formed from the removal of the leadframe of the third coil 3150*c*. The first coil 3150*a*, second coil 3150*b* and third coil 3150*c* may or may not be separated by insulation 3231 as shown in FIG. 23.

Figure 15:
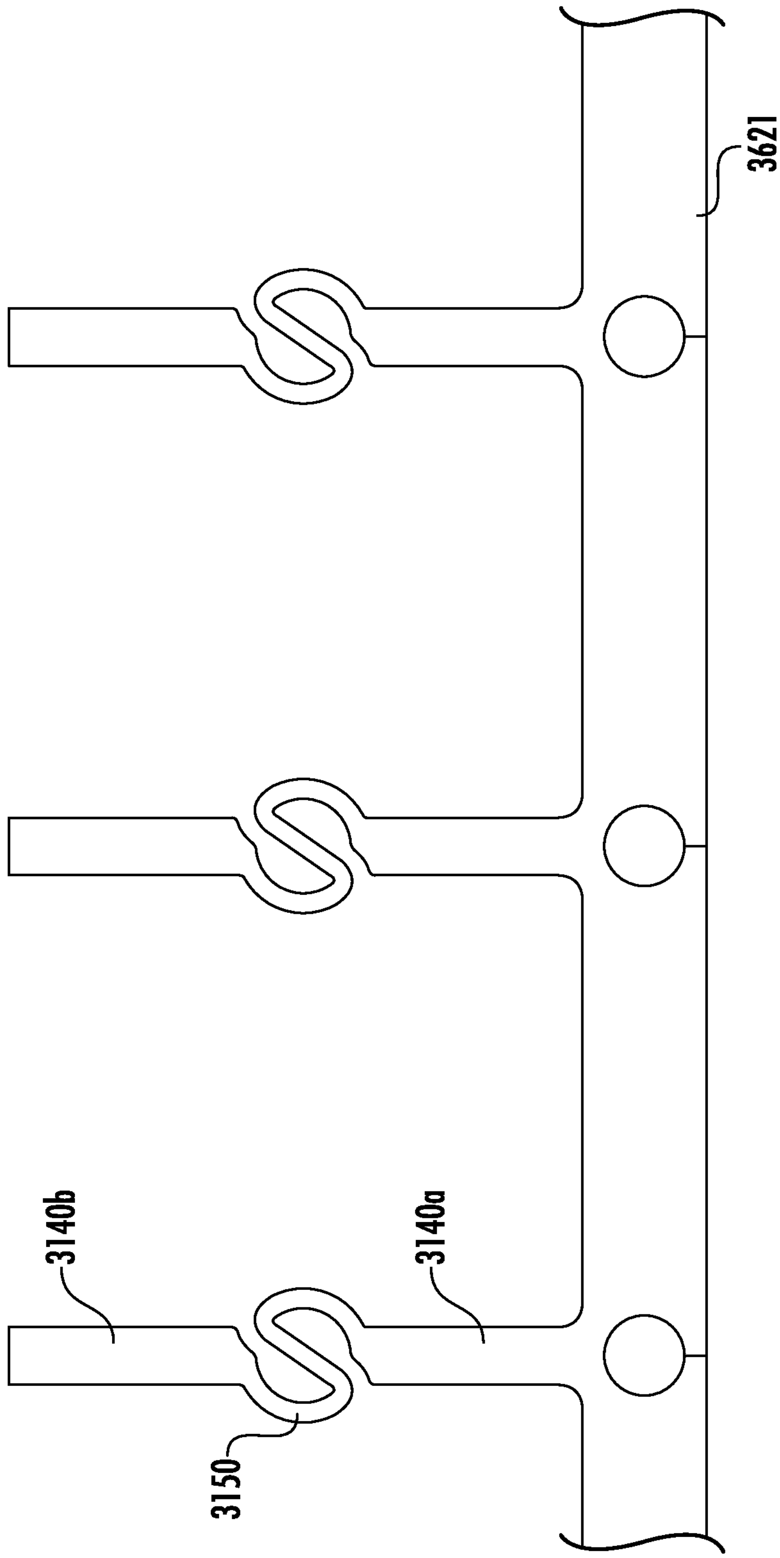
FIG. 15 illustrates a top view of a leadframe with embodiments of an inductor coil according to the invention.

FIG. 15 illustrates a formation of the coil with a reduced leadframe having only one carrier strip 3621. In FIG. 15, a stamped "S" shaped coil 3150 may have the same elements as described in FIG. 1. The "S" shaped coil 3150 includes a first lead 3140*a* connected to the carrier strip 3621, and a second lead 3140*b* extending from an opposite side of the coil 3150.

FIG. 16 illustrates an alternate shape for an inductor coil. In FIG. 16, an "N" shaped coil 3159 (where the "N" is standing up relative to the length of the carrier strip 3561), is provided. The "N" shaped coil 3159 includes a first portion N1 that connects with a second lead 3140*b*, and a second portion N1 that connects to a first lead 3140*a* that connects to the carrier strip 3621. The two portions N1 and N2 are connected by a central portion N3 of the coil 3159. The two portions N1 and N2 of FIG. 16 are generally straight compared to the curved portions C1 and C2 of FIG. 1. The outer corners of the portions N1 and N2, where the portions bend of meet the leads 3140*a*, 3140*b*, curved away from the central portion N3 of the coil.

Figure 17:
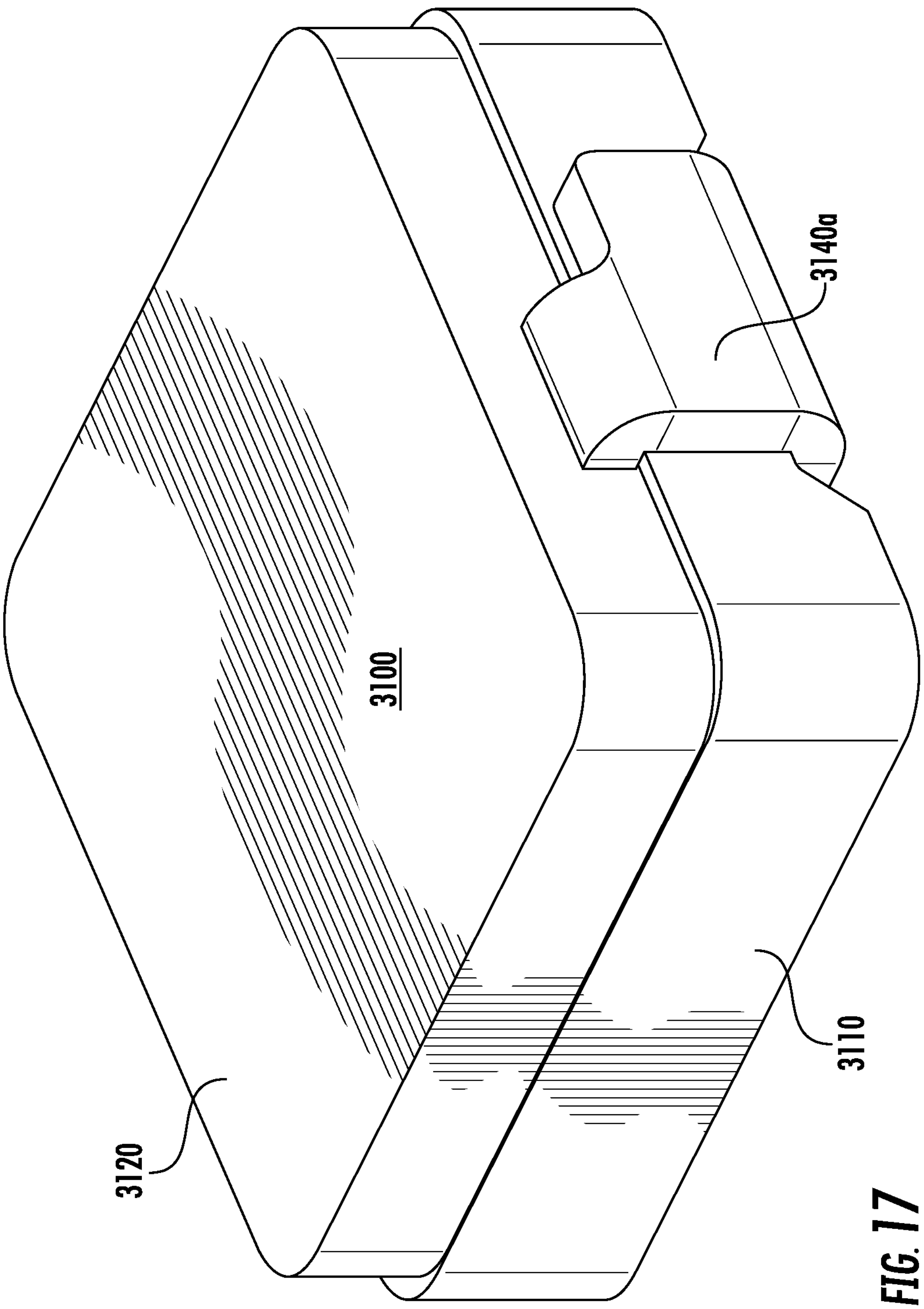
FIG. 17 illustrates a perspective view of an assembled inductor according to an embodiment of the present invention.

FIG. 17 illustrates a depiction of an assembled inductor 3100 according to the present invention. Inductor 3100 includes a first body 3110 and second body 3120. Also shown is lead 3140, including a step adjacent where the lead exits the body.

Figure 18A:
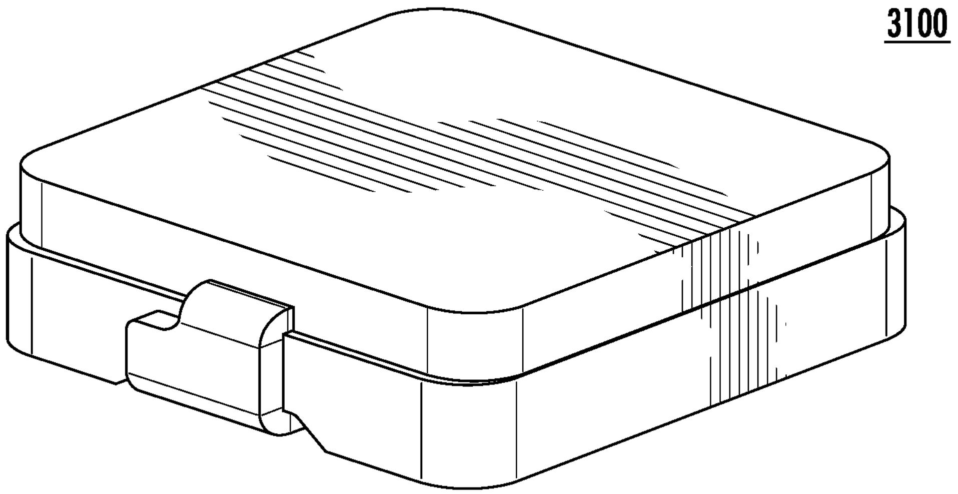
FIGS. 18A and B illustrate an assembled inductor according to the present invention.
Figure 18B:
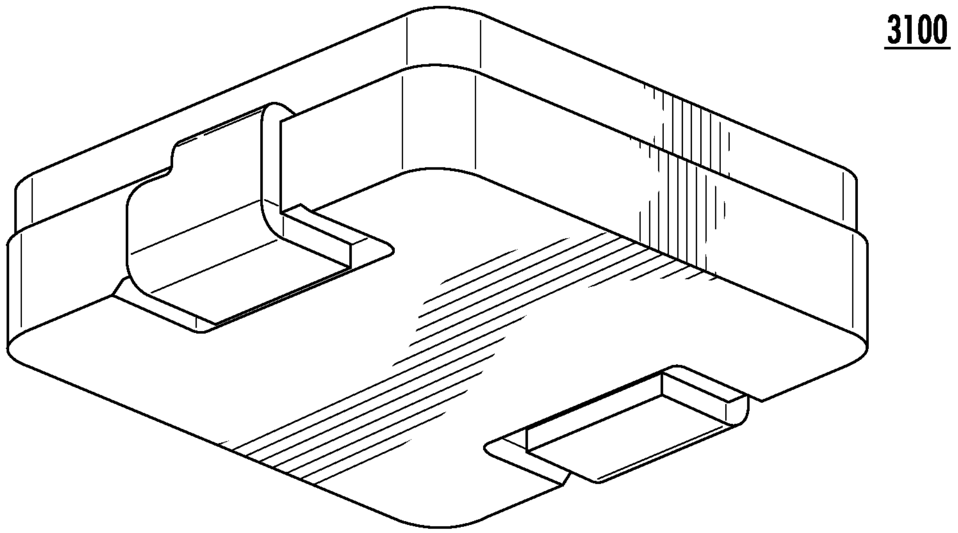

FIGS. 18A and B illustrate an assembled inductor 3100 according to the present invention.

Figure 19:
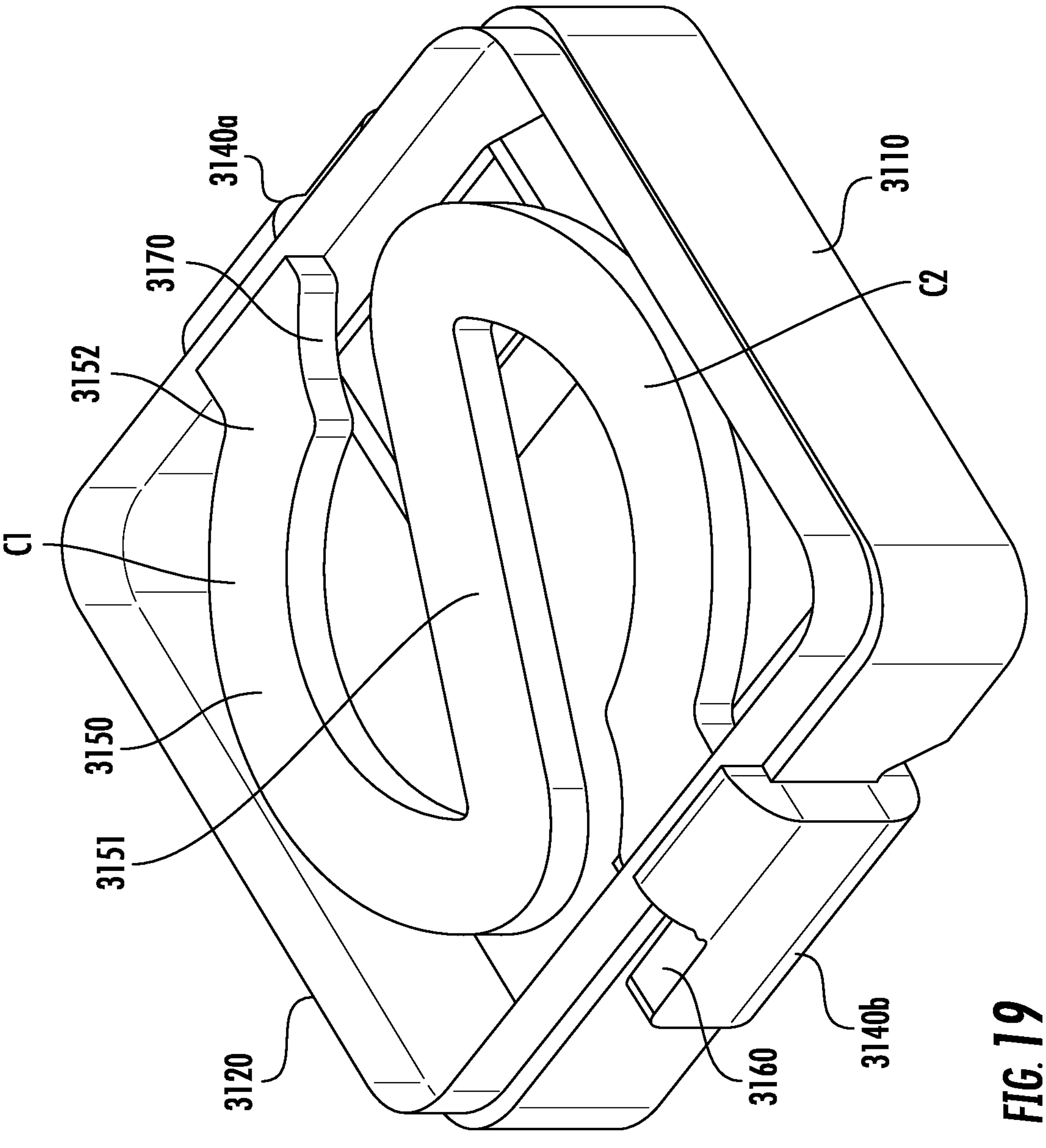
FIG. 19 illustrates inductor shown with second body in see-through and core and body removed.

FIG. 19 illustrates an inductor shown with the second body 3120 in partial transparency, and cut-away from the top. Coil 3150 is shown connecting leads 3140*a* and 3140*b*. Coil 3150 includes regions C1, C2 with a cross-member 3151.

Figure 20:
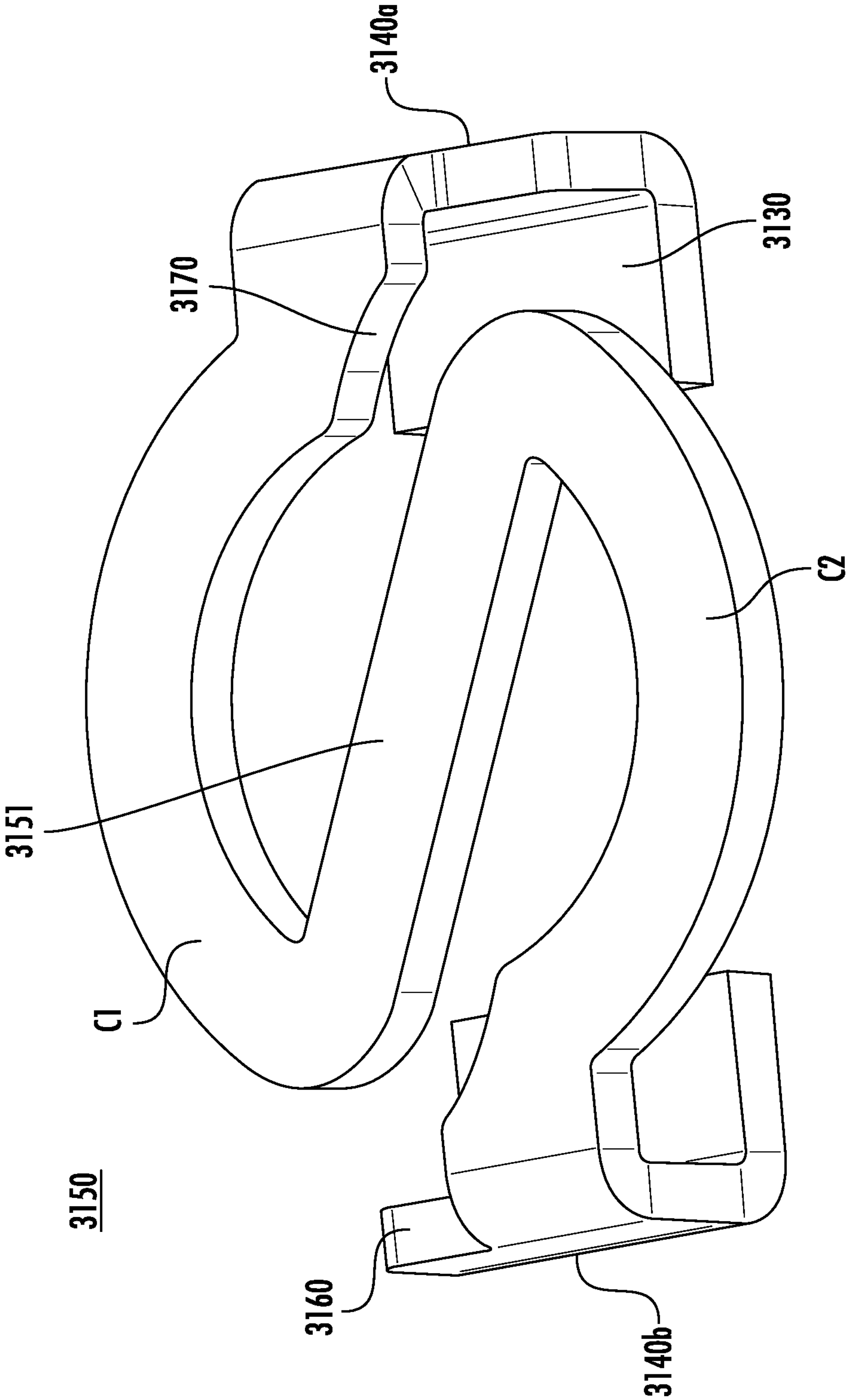
FIG. 20 illustrates a top view of a coil from an assembled inductor with other parts of the inductor 3100 removed.
Figure 21:
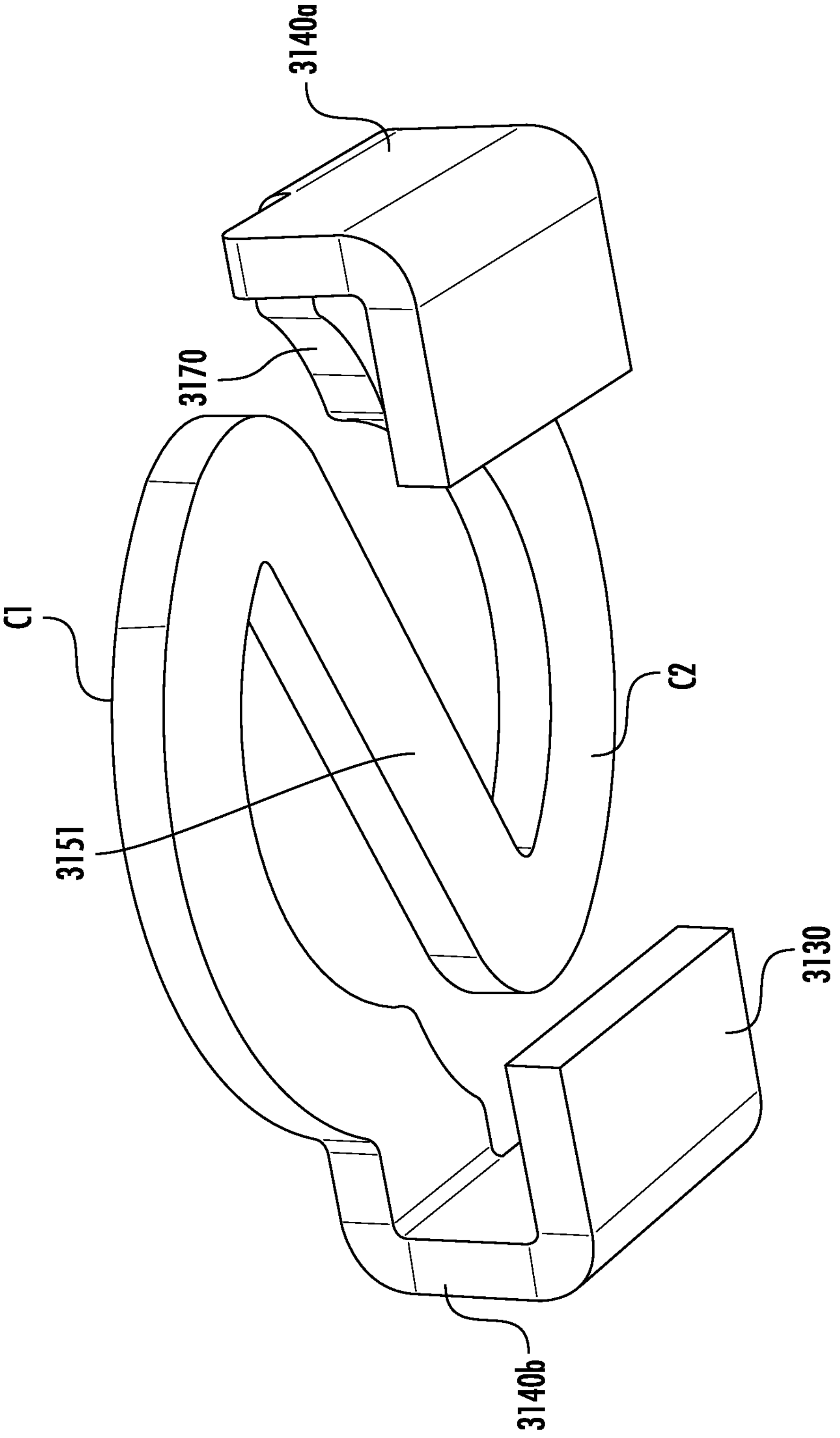
FIG. 21 illustrates a bottom view of a coil from an assembled inductor with other parts of the inductor 3100 removed.

FIG. 20-21 illustrate coil 3150 from an assembled inductor 3100 (e.g., with the leads bent) with other parts of the inductor 3100 removed. FIG. 20 depicts an isometric view of coil 3150 from above and FIG. 21 depicts an isometric view of coil 3150 from below. Coil 3150 is shown connecting leads 3140. Coil 3150 includes curved or arced regions or portions C1 and C2 with a cross-member or central portion 3151.

Figure 22A:
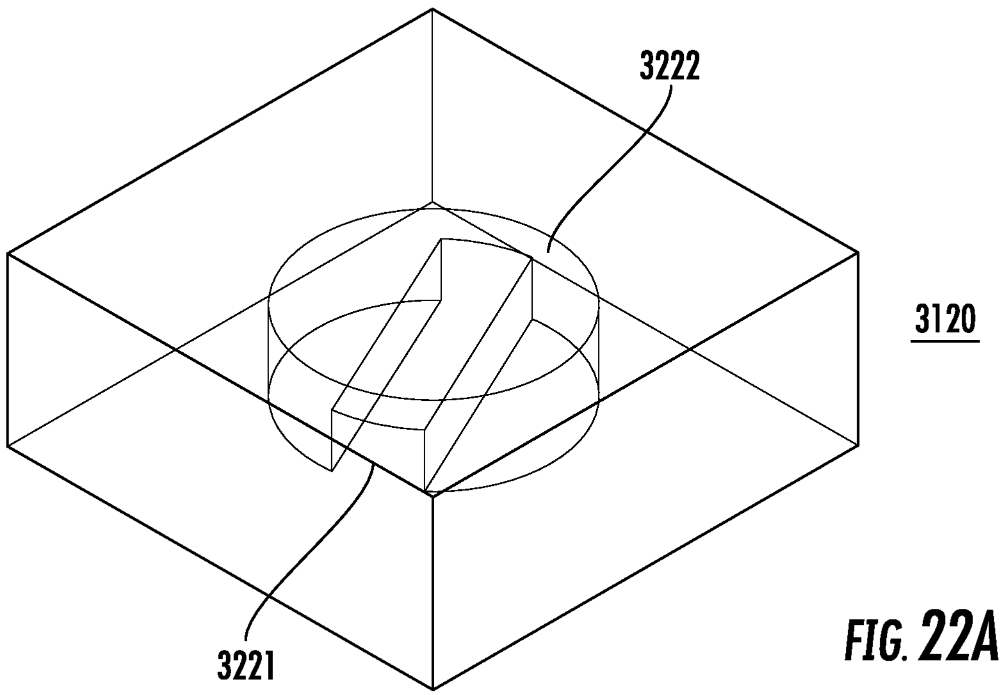
FIGS. 22A-B illustrates a body from an assembled inductor with other parts of the inductor removed.
Figure 22B:
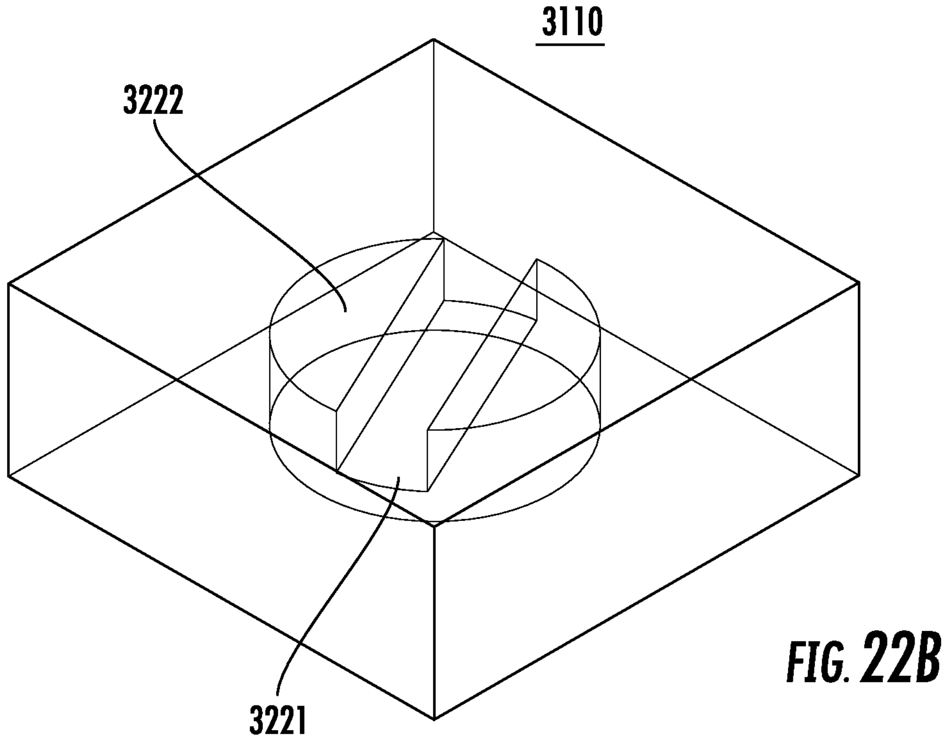

FIGS. 22A and B illustrate, in transparency, embodiments of a first body 3110 (FIG. 22B) and a second body 3120 (FIG. 22A) from an assembled inductor 3100 with other parts of the inductor 3100 removed. First body 3110 and second body 3120 includes an inner core recess 3221 and a channel recess 3222 for receiving or accommodating a separate inner core and a channel for the coil as described above. First body 3110 and second body 3120 could also form the inner core and include a channel for the coil as described above. In one example, the top of first body 3110 meets the bottom of second body 3120 to create the inner core 3221 recess and the channel recess 3222.

Figure 24:
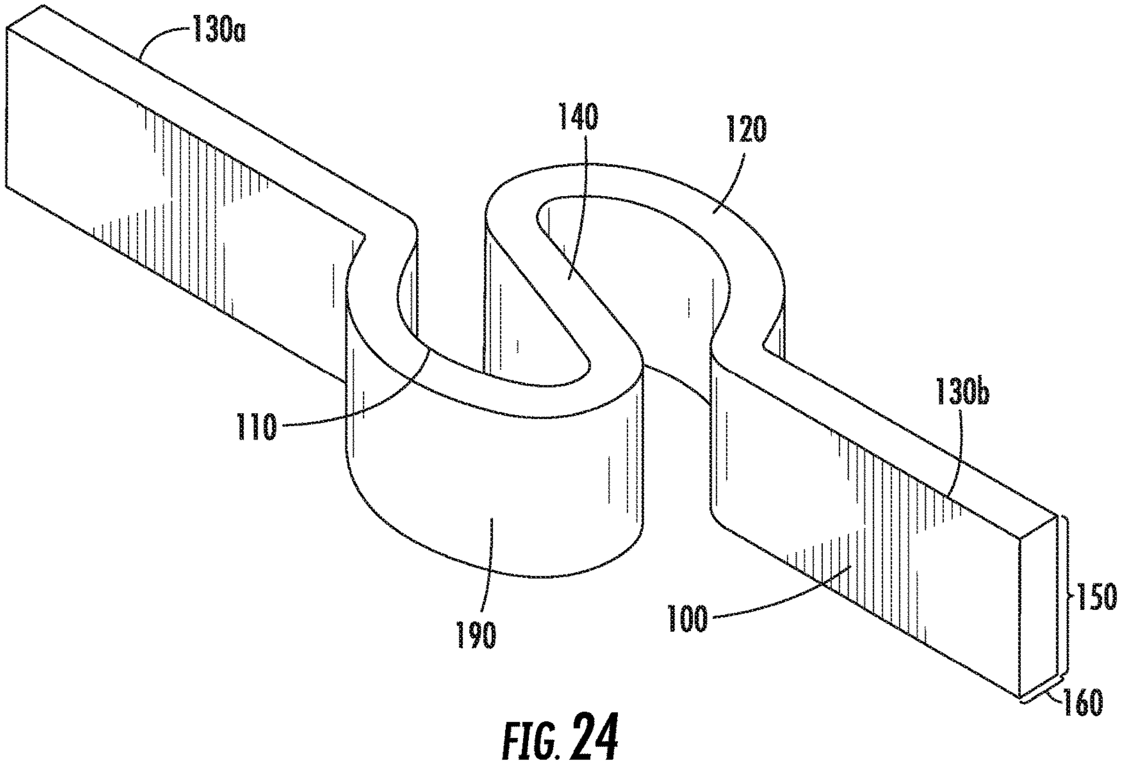
FIG. 24 shows an isometric view of an example coil of an inductor.

FIG. 24 shows an isometric view of another embodiment of a coil according to the invention. An illustrative coil 190 is shown, including leads 130*a*, 130*b* extending from opposite ends of the coil 190. The coil 190 may be formed from a conductor 100, having a width 150 and a height (or thickness) 160. The formed coil and leads 130*a*, 130*b* may be referred to as a "leadframe." The conductor 100 may be formed from a metal strip. Acceptable metals used for forming the coil may be copper, copper, aluminum, platinum, or other metals for use as inductor coils as are known in the art. Acceptable metals for the leads may be copper, aluminum, platinum, or other metals for use as inductor leads as are known in the art.

In a preferred example, the width 150 of the conductor 100 is greater than the height 160, as shown in FIG. 24. In one aspect of the invention, the width of the coil 190 is associated with the width of the conductor 100. In another orientation of the coil, the height of the conductor may be greater than the width, and the height of the coil may be associated with the height of the conductor. The conductor 100 may be a wire, a metal strip or a metal form stamped from a sheet of metal, or another conductive material as is known in the art. The conductive material preferably has a flat surface and flat edges. However, it is appreciated that the conductive material, either before or after formation into a coil of the invention, may have a rounded, oblong or oval surface, edges or shape. Thus, the coil and/or leads may have a rounded or curved surface or edges.

In a preferred embodiment, the coil 190 may comprise a first curved portion 110, and a second curved portion 120. The curved portions 110 and 120 preferably curve away from and/or around a central portion 140 of the coil 190, and thus may be considered "outwardly" curving relative to the central portion 140. Each curved portion 110 and 120 of the coil 190 may extend along a part of the circumference of a circular or arched path curving around the central portion 140 of the coil 190.

Figure 25:
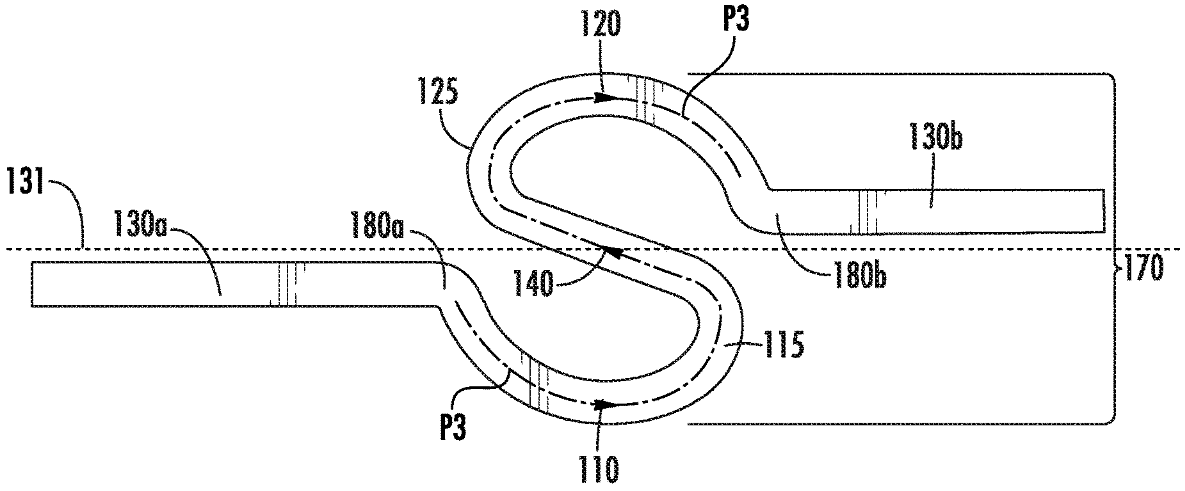
FIG. 25 shows a side view of an example coil of an inductor.

Referring to FIG. 25, the first curved portion 110 may have a first end 180*a* connecting with the first lead 130*a*, and a second end 115 that curves into the central portion 140. The second curved portion 120 may have a first end 180*b* connecting with the second lead 130*b*, and a second end 125 that curves into the central portion 140. The central portion 140 preferably crosses the center of the coil, and runs essentially diagonally or at a sloped angle from the second end 115 of the first curved portion 110 to the second end 125 of the second curved portion 120.

As shown in the view of FIG. 25, the leads 130*a*, 130*b* may be offset from a center line 131 running along the length of the coil, prior to the leads being bent or further shaped. In another embodiment, the leads 130*a*, 130*b* may be aligned along a center line running along a length of the coil.

An exemplary serpentine coil having an "S" shape, when viewed from the top as shown in the Figures, may be seen in FIGS. 24, 25, 27, 29, 31, and 32. Alternatively, the coil may be formed in any other appropriate shape, such as a "Z" or an "N." The length of the conductor may vary during production, as the conductor's length is subject to the number of inductors to be made, the number of coils formed from a length of conductor, or the raw materials used to produce the conductor. The coil 190 may have a vertical height 170 running from a top of the coil (when oriented as in FIGS. 25, 27 and 29) to the bottom of the coil. The vertical height 170 contributes to the space taken up by the coil when placed in an inductor core or body. The width 150 and/or height 160 of the conductor 100 may be less than the vertical height 170 of the formed coil. The coil 190 may be shaped in a unique configuration that provides for increased efficiency and performance for an inductor in a small volume. In a preferred embodiment, the shape may be an "S" shape when viewed from the side of the coil 190, as shown for example in the orientation of FIG. 25. The shape of the coil 190 is designed to optimize the path length of the conductor 100 to fit the space available within the core 260 of the inductor 200 while minimizing resistance and maximizing inductance. The shape may be designed to increase the ratio of the space used compared to the space available in the inductor body 200. In an embodiment, an inductor according to the invention may achieve and inductance of 0.135 μH at 0.21 mΩ.

In one embodiment the conductor may be square in its cross-section, as opposed to flat where the width would be greater than its height. The conductor may also take any shape in its cross-section such as rectangular, triangular, prism, circular, ovular, or the like. In any example, embodiment, or discussion of the conductor as disused herein, the conductor cross-section may take any of the shapes as discussed herein.

FIGS. 26-30 show an assembled inductor 200 with a core 260 formed around the coil 190. The inductor 200 may be oriented vertically, as illustrated in the Figures, where the core or body 260 is oriented in an upstanding manner, with leads 135*a*, 135*b* at the bottom for mounting to, for example, a circuit board.

Figure 26:
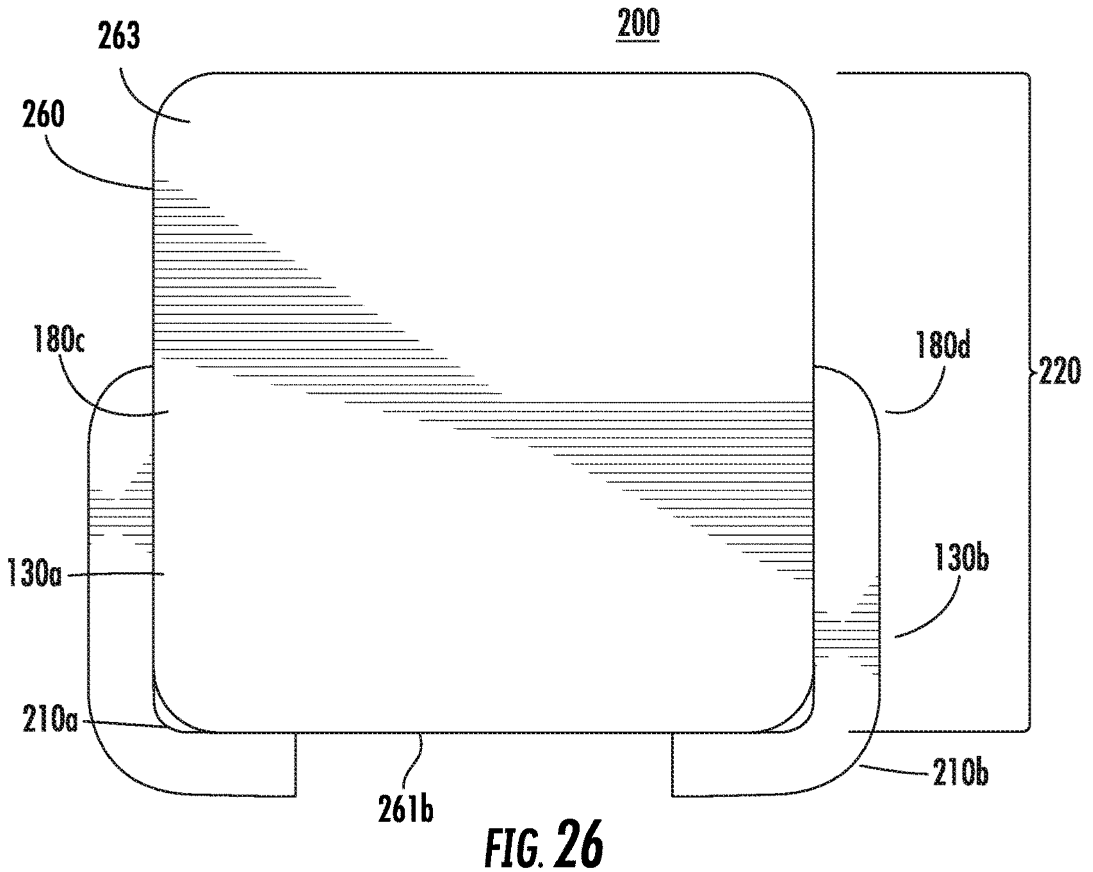
FIG. 26 shows a side view of an example body with inductor leads formed around the sides of the core.

FIG. 26 shows a view from a front side 263*a* of an inductor 200 with an illustrative core 260, with the inductor leads 130*a*, 130*b* formed around a lower surface 261*b* of the core 260. Portions of the leads 130*a*, 130*b* may curve at points 180*c*, 180*d*, respectively, upon exiting the core. The leads 130*a*, 130*b* and coil 190 may be formed as a unitary piece, without a weld. The core may be a square, rectangular, or another other shape that encompasses the dimensions of the core 260. The core 260 may have a height 220 from the top 261*a* to the bottom 261*b*, which, in one embodiment, is greater than the vertical height 170 of the coil 190.

Figure 27:
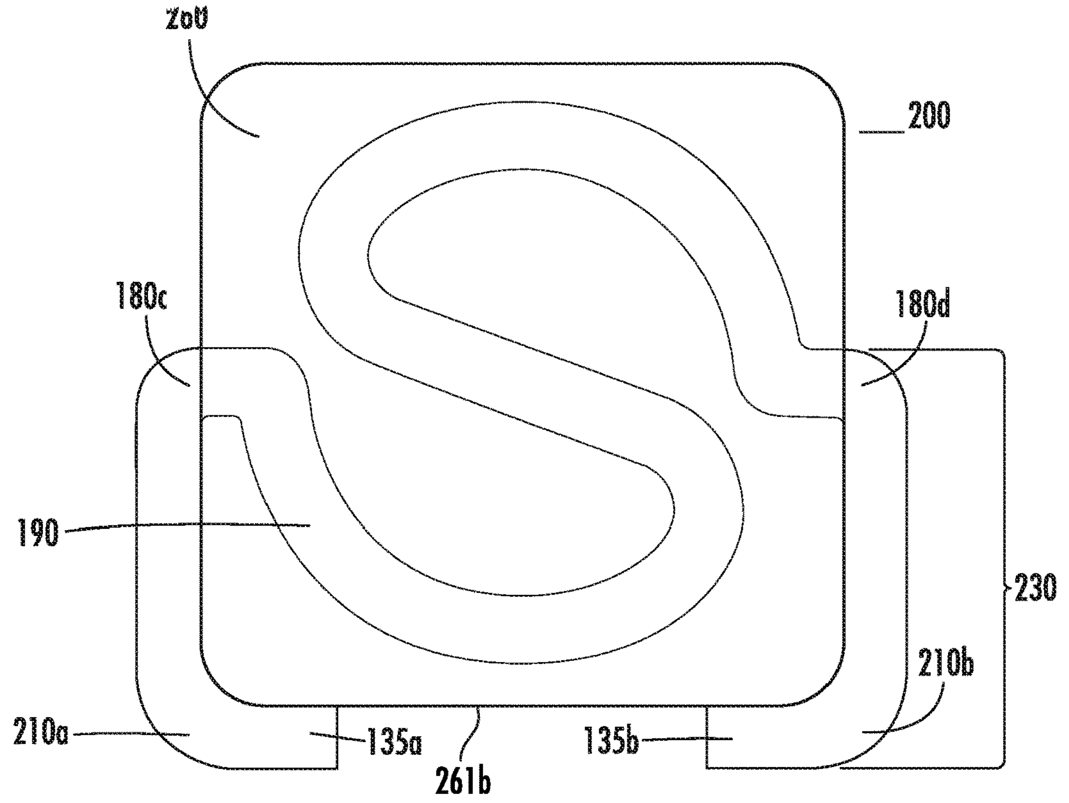
FIG. 27 shows a side view of an example core, where the body has been made transparent to see the coil inside, with inductor leads formed around the sides of the core.

FIG. 27 shows the front side view of an inductor 200, where the core 260 is partially transparent to view the interior. The leads 130*a*, 130*b* terminate at lead ends 135*a*, 135*b*, respectively, after wrapping around the core 260 at points 210*a*, 210*b* respectively for a distance 230 from their exit points 180*c*, 180*d*. Leads 130*a*, 130*b* may preferably curve around the bottom 261*b* of the core 260 at points 210*a*, 210*b*, respectively, thereby having the leads 130*a*. 130*b* "hug" or rest directly against the core 260 to create surface mount terminals along portions of the bottom surface 261*b* where the leads 135*a* and 135*b* extend. Each lead 130*a*, 130*b* may run along a portion of the bottom surface 261*b* of the core 260.

In an embodiment, magnetic material, such as iron, may be poured into a die and pressed into a core 260 that will encompass the coil 190. In other embodiments other materials beside iron may be used to form the core 260 or core portions. For example, a magnetic molding material may be used for the core 260, comprised of a powdered iron, a filler, a resin, and a lubricant, such as described in U.S. Pat. No. 6,198,375 ("Inductor coil structure") and U.S. Pat. No. 6,204,744 ("High current, low profile inductor").

In other embodiments, a core may be formed as multiple pieces formed together. For example, there may be a two-piece core, with a first portion and a second portion of the core; both portions may be formed in similar fashion and of the same materials, or the first portion and second portion may be formed using different processes and from distinct materials. The shape of the core may be similar to an IHLP™ inductor known in the art and may by of an appropriate size to encompass a coil 190. The core and leadframe may be combined after the coil has been formed.

Figure 28:
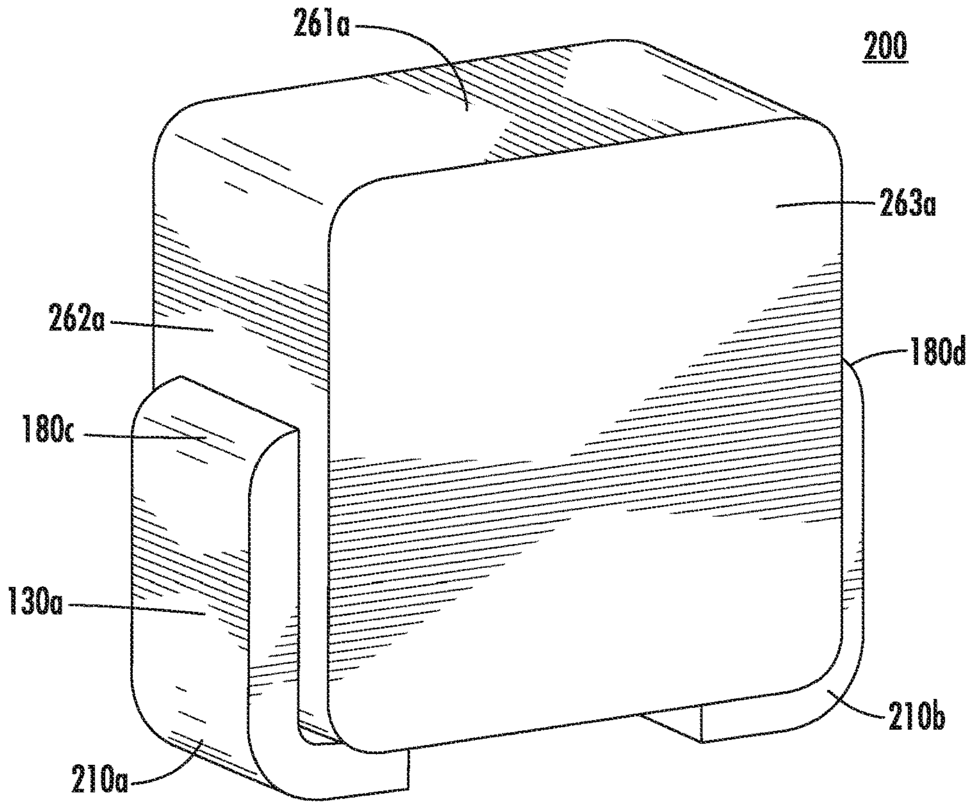
FIG. 28 shows an isometric view of an example body with inductor leads formed around the sides of the core.
Figure 29:
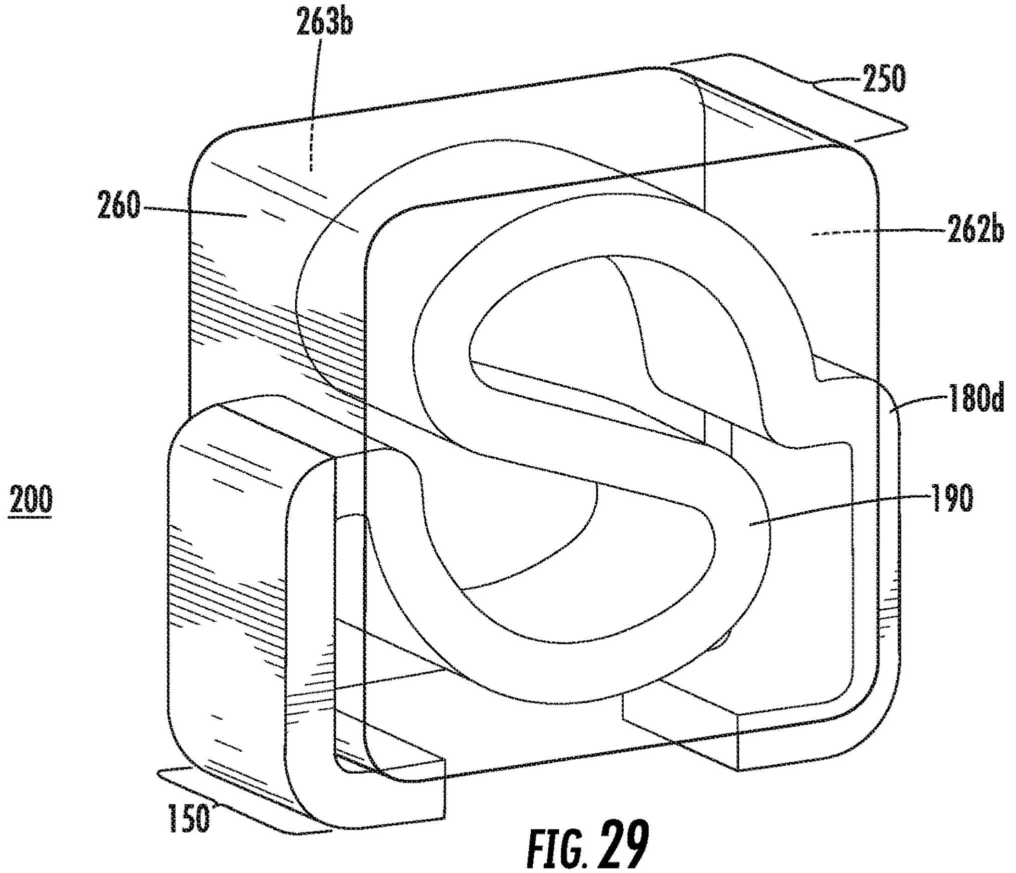
FIG. 29 shows an isometric view of an example body, where the core has been made transparent to see the coil inside, with inductor leads formed around the sides of the core.

FIGS. 28 and 29 show isometric views of the inductor as shown in FIGS. 26 and 27, respectively.

FIG. 28 shows the exit and curvature point 180*c* where the lead 130*a* exits the core 260 approximately at the mid-point of the first side 262*a*.

In the orientation as shown in FIG. 29, the coil 190 and leads 130*a*, 130*b* are visible through the transparent core 260 just for explanation purposes. In FIG. 29 the width 150 of the leads 130*a*, 130*b* extend between the front side 263*a* and a back side 263*b* of the core 260. On the second side 262*b* of the core 260, the lead 130*b* exits the core 260 at point 180*d*. In one embodiment, the width 150 of the leads 130*a*, 130*b* may be less than that of the depth 250 of the core 260 from front 263*a* to back 263*b*. In another embodiment, the width 150 of the leads 130*a*, 130*b* may be the same as that of the depth 250 of the core 260 from front 263*a* to back 263*b*. The core 260 may also include a back side 263*b*, top side 261*a*, and a bottom 261*b*.

A unique feature of the present invention is the positioning of the coil 190 and leads 130*a*, 130*b* with respect to the core 260. As shown in the orientation of FIG. 29, the coil 190 and leads 130*a*, 130*b* have a width 150 that runs along at least a portion of the depth 250 of the core 260.

Figure 30:
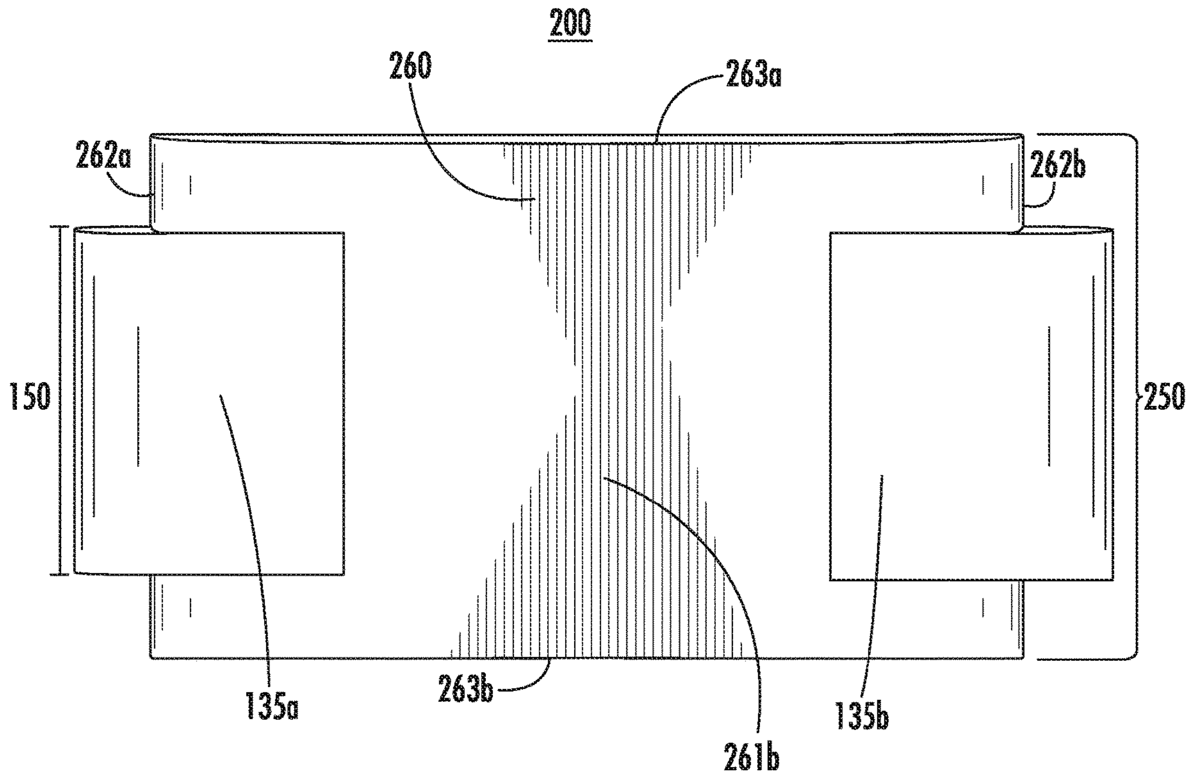
FIG. 30 shows the bottom perspective of an example body with leads formed.

FIG. 30 shows the bottom view of an illustrative inductor 200. The lead ends 135*a*, 135*b*, are shown wrapping around portions of the sides and portions of the bottom surface 261*b* of the core 260. These may form the electrical contact points for the inductor 200, such as surface mount leads. The bottom 261*b* is opposite to the top 261*a* of the core 260. The lead ends 135*a*, 135*b* may have a width 150 that may be less than the depth 250 of the core 260. In alternative embodiments the leads 130*a*, 130*b* may have a width similar to or the same as the depth 250 of the core 260.

Figure 31:
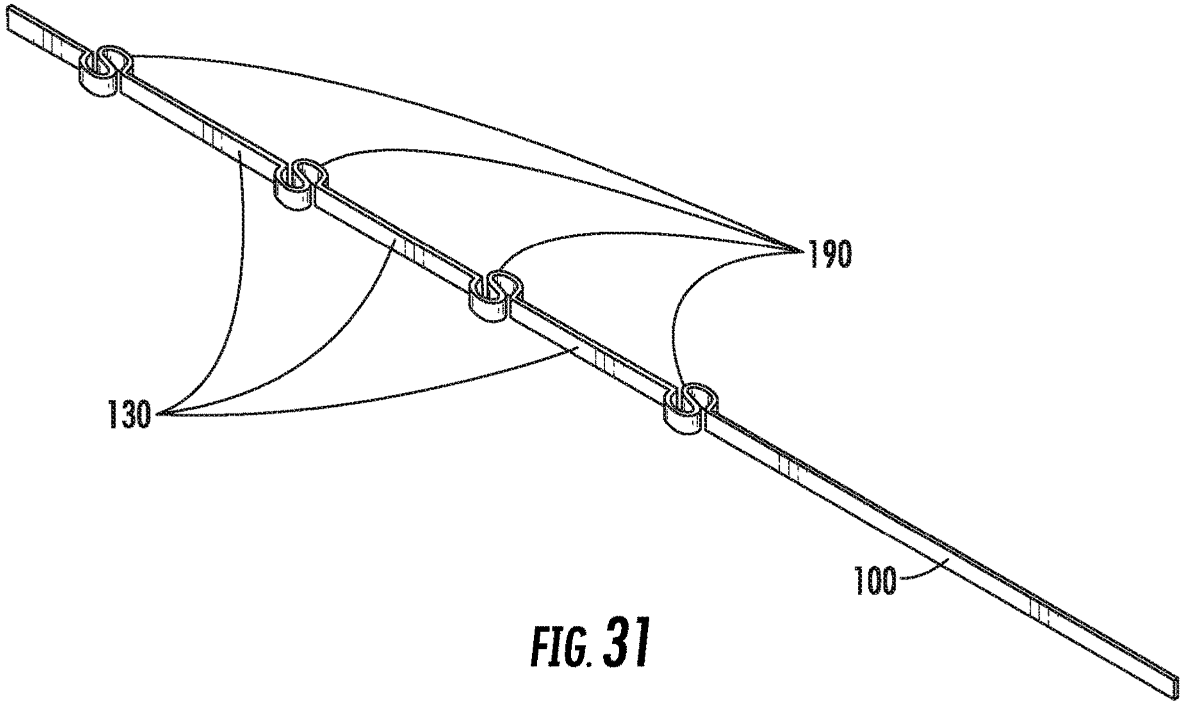
FIG. 31 shows an isometric view of an example conductor with multiple coils formed.

FIG. 31 shows an isometric view of example coil production with multiple coils 190 formed from a conductor 100. The coils 190 may be formed in the same shape and size for one coil production or may be formed in varying shapes and sizes. The lead portions 130 may be aligned along a generally straight path or line extending along the length of the conductor. Alternatively, the lead portions 130 may be in different planes (offset) relative to one another between each coil 190. In FIG. 24 there is a single illustrative coil 190, but it may appreciated that there may by multiple coils formed from a single piece of material as shown in the example of FIG. 31. The conductor 100 may be composed of a metal such as copper or any other suitable material appropriate to make an inductor coil. The conductor 100 may be plated, such as with nickel and/or tin.

Figure 32:
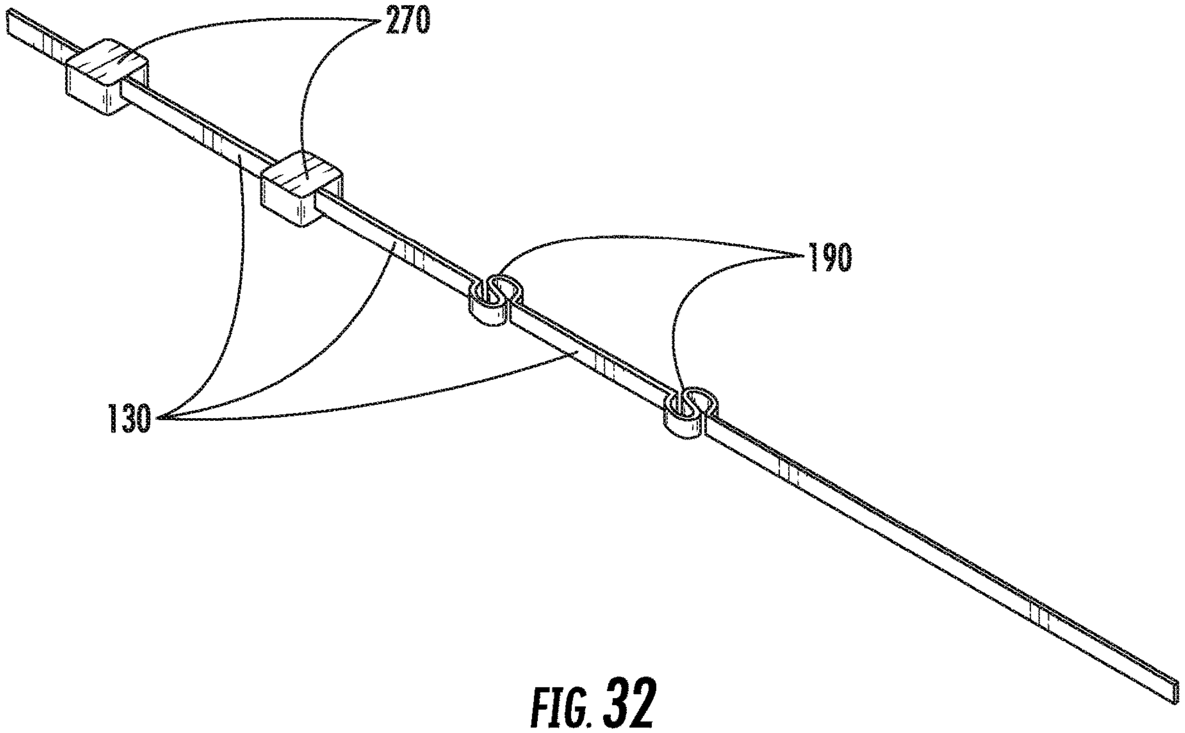
FIG. 32 shows an isometric view of an example conductor with coils and parts attached.

FIG. 32 shows an isometric view of an example parts production with coils 190 and parts 270 formed. In FIG. 32 a core 260 has been combined with a coil 190 that was previously formed with the conductor 100 to create parts 270. Parts 270 comprise an inductor 200 without the lead portions 130 separated or bent around the body of the core 260. The lead portion 130 of conductor 100 between the parts 270 may be separated to form the leads 130*a*, 130*b* each with lead ends 135*a*, 135*b*, respectively.

Figure 33:
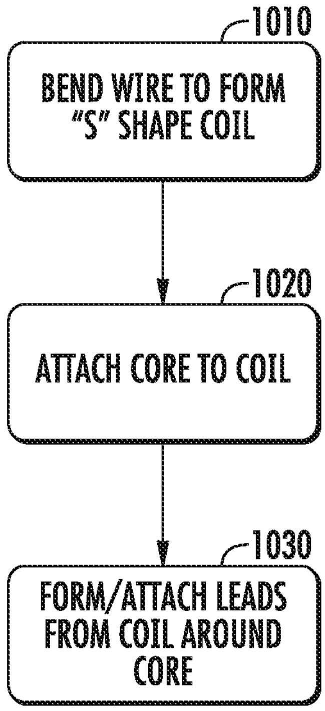
FIG. 33 shows an example process for manufacturing an inductor according to one embodiment.

FIG. 33 describes an example process of manufacturing an inductor. In one embodiment, at step 1010 a conductor, such as rectangular nickel (Ni) and tin (Sn) plated uninsulated copper wire, may be bent to form a plurality of "S" coils. At step 1020 cores made of iron may be created separately or may be created during the same process, and may be attached or pressed on to each coil. At step 1030 the parts may be cured in an oven to bind the coils and the cores together. Afterwards, the parts may be separated and the lead portions of the leadframe may be folded around each core to produce the inductor. The coils and leads of the present invention are preferably formed as a complete unitary piece; that is, no interruptions or breaks are formed in the coil from one lead to the next coil prior to the lead portions being separated/cut.

Figure 34A:
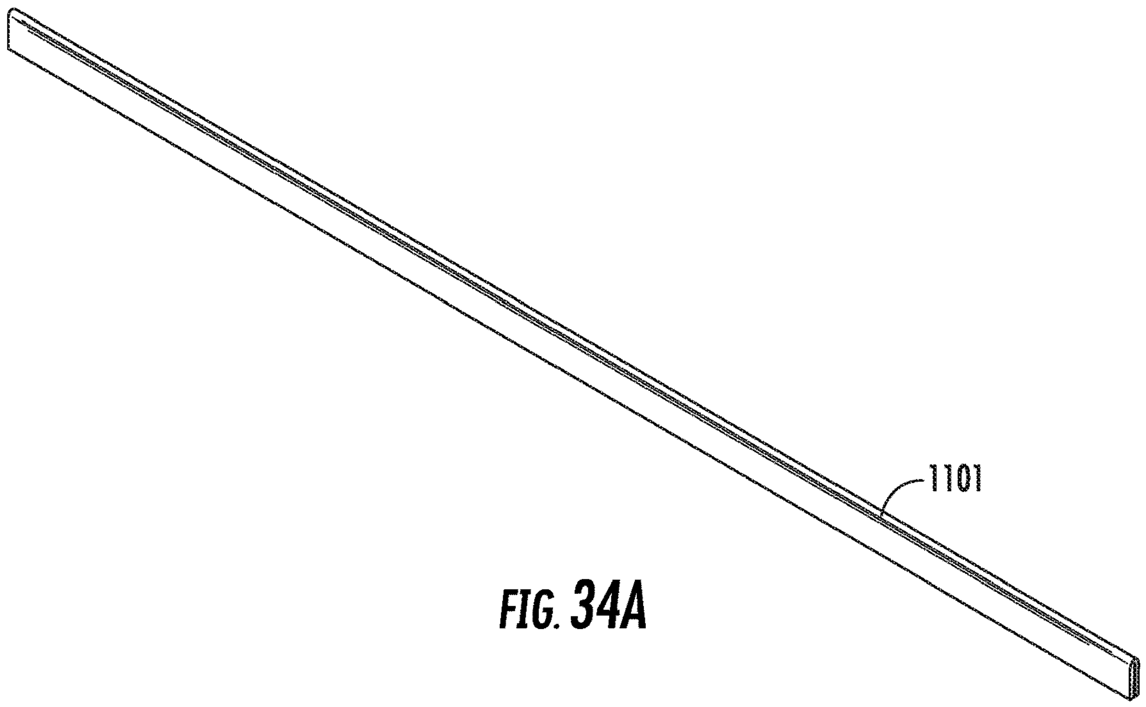
FIG. 34A shows an isometric view of an example folded conductor.
Figure 34B:
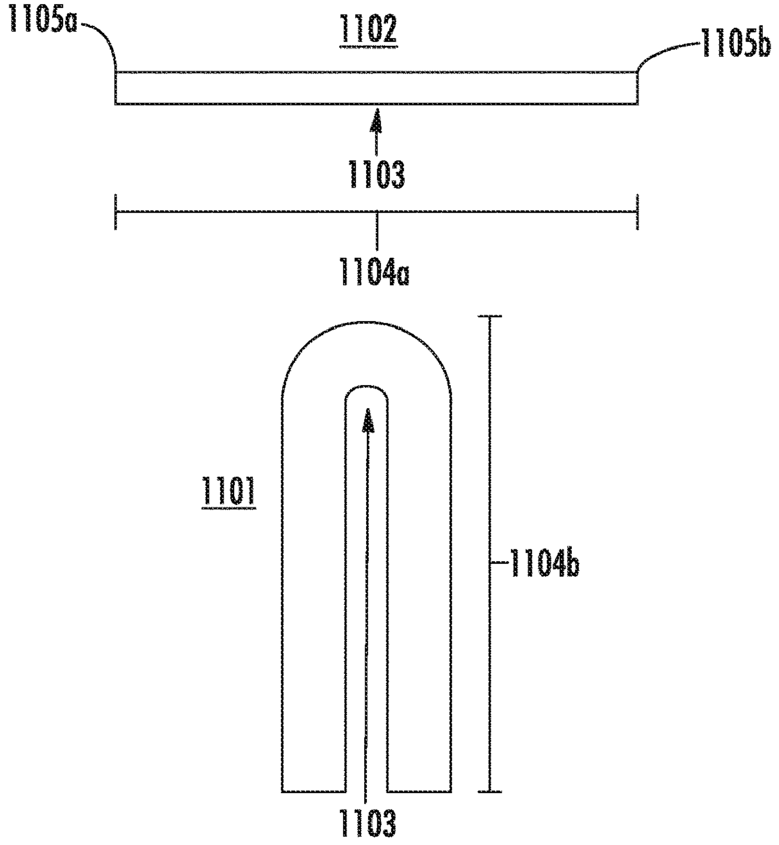
FIG. 34B shows an front perspective of an example folded conductor.
Figure 34C:
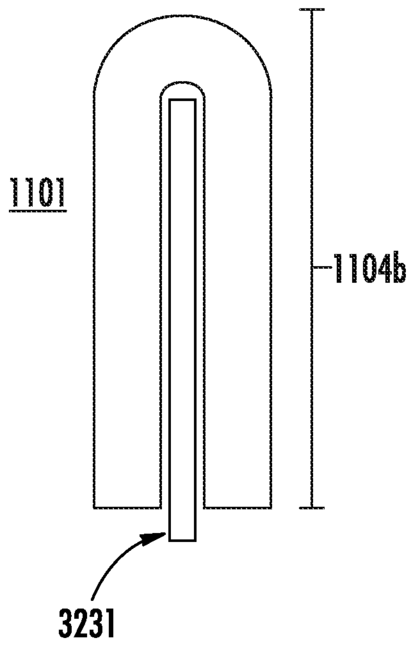
FIG. 34C shows an front perspective of an example folded conductor with insulation.

In another embodiment, an inductor may be made from a folded conductor, such as a metal strip, a wire or stamped piece of conductive metal. The metal strip, a wire or stamped piece of conductive metal may preferably be flat. A conductor may be folded and shaped to form the coil and leads. FIG. 34A shows an isometric view of an example of folded conductor 1101 to be used in the making of an inductor according to the invention. FIG. 34B shows the formation of a folded conductor 1101 from a front perspective of an illustrative conductor 1102. The folded conductor 1101 may be formed as a conductor that is folded over itself at the middle 1103 of the width of the conductor, in a general U-shape when viewed in cross-section. The folded conductor 1101 may be folded along its width such that the fold creates two sides or layers of equal width 1105*a* and 1105*b*, joined by a curved or bent portion 1103. In some embodiments the two layers may not be equal. The conductor may be folded to create more than two layers. FIG. 34C shows a folded conductor 1101 from a front perspective with insulation between the two folded layers. The insulation may be in each layer of folded material, or the insulation may be in selected layers.

In the folded conductor arrangement, several options are contemplated. A conductor may be folded to form the folded conductor 1101, and insulation may be added between the layers after the folding process. In another embodiment, the conductor may have a surface coated with insulation prior to folding. When folded, the folded conductor 1101 would bring the insulated surfaces of the layers into contact. In another embodiment, the conductor is folded to form a folded conductor 1101, and no insulation is provided between the layers. In another embodiment, the conductor may be folded so as to bring the layers into direct contact. In that case, the layers may be pressed into each other.

In one example of forming the conductor 1102, the conductor 1102 may have two edges 1105*a* and 1105*b* that are moved downward relative to the middle 1103 of the width 1104*a* of the conductor 1102 to form the folded conductor 1101. Note that the width 1104*b* of the folded conductor 1101 is approximately half that of the width 1104*a* of the conductor 1102. In one aspect, the folded conductor may have an insulating material sandwiched in between the two layers 1105*a* and 1105*b*. In a scenario where there is more than one fold, the insulating material may be present in between each layer so as to insulate the folded layers. The material may be made out of any material that has insulating properties (i.e., non-conductive) that one of ordinary skill in the art may use, such as but not limited to, ceramic, glass, gas, plastic, rubber, etc.

Figure 35:
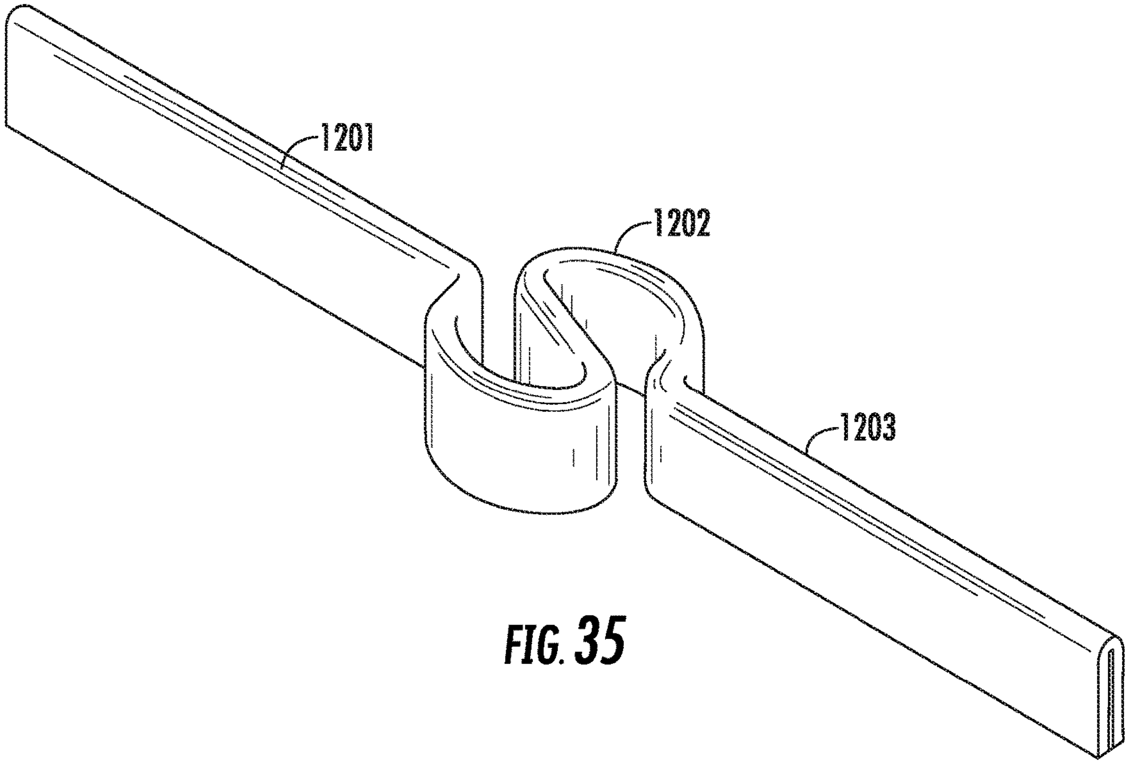
FIG. 35 shows an isometric view of an example inductor coil made from folded conductor.

FIG. 35 shows an example of an inductor coil 1202 made from a folded conductor in a serpentine shape with lead portions 1201 and 1203, similar to the arrangement of FIG. 24, but with the coil made from the folded conductor 1101 arrangement. The coil 1202 may take the shape and be formed similarly to the arrangements shown and described with respect to FIGS. 24-33 as to the serpentine shape. FIG. 35 shows an S-shaped coil, as viewed from the top. Alternatively, the coil 1202 may take a non "S" shape and be formed according to other shapes as discussed herein, such as an "N" a "Z" or some other form that generates an inductance.

Figure 36:
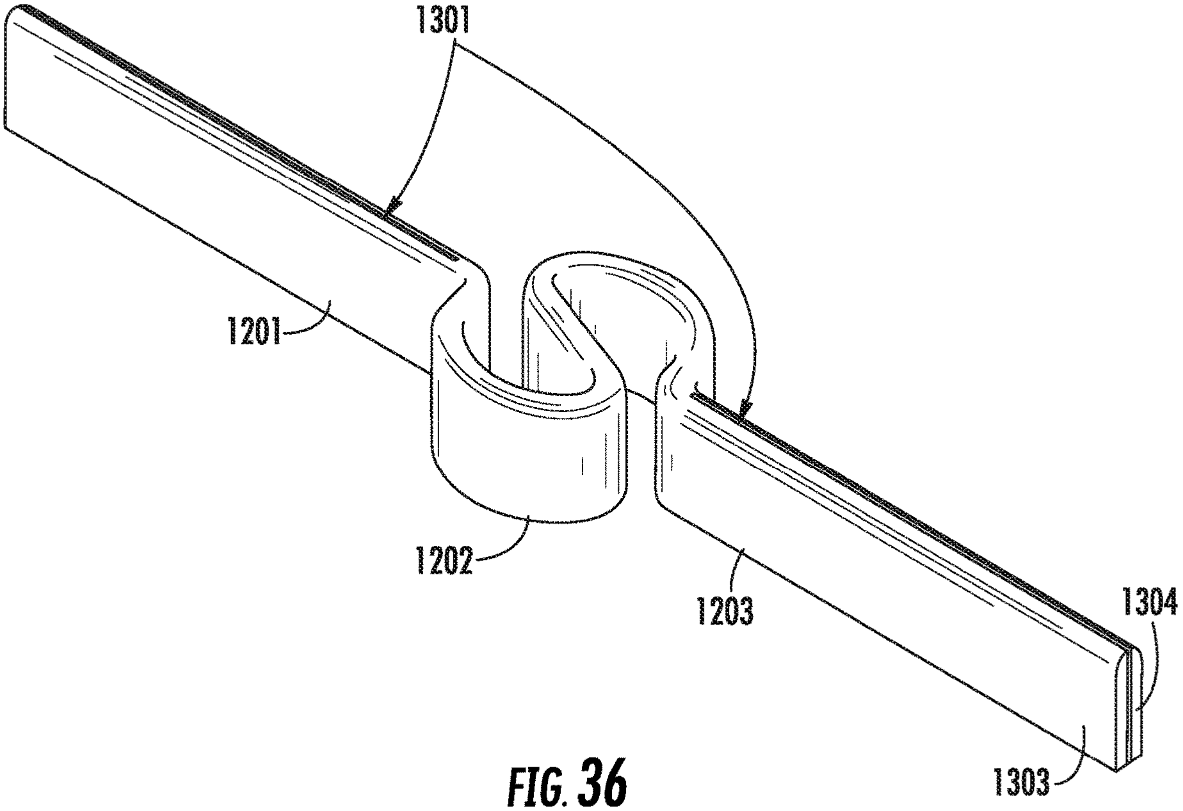
FIG. 36 is an isometric view of an example inductor coil made from splayed folded conductor.

In an alternative embodiment, FIG. 36 also shows an example of an inductor coil 1202, similar to the arrangement of FIG. 35, but the lead portions 1201 and 1203 extending from the coil are made from folded conductor 1101 that has been split or cut or separated along a general mid-point 1301 of the conductor 1101 to form a slit or seam. In FIG. 36, only the leads 1201 and 1203 have been separated into two halves 1303 and 1304 and the coil 1202 remains as a unitary two-sided, two-layer, two-walled or two-sided structure.

Figure 37:
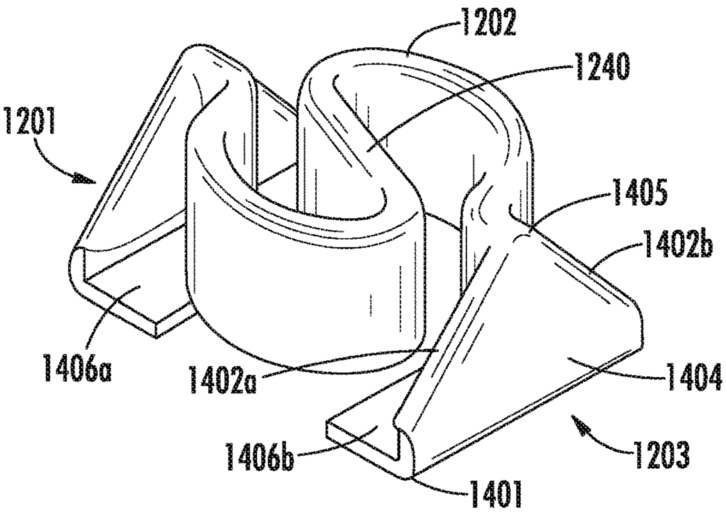
FIG. 37 is an isometric view of an example inductor coil made from folded conductor with formed leads.

FIG. 37 shows an isometric view of an illustrative inductor coil 1202 where the lead portions 1201 and 1203 have been formed into surface mount leads from a folded conductor 1101. The coil 1202 may have a central portion 1240. These leads are formed by splitting and/or splaying and flattening and/or unfolding lead portions 1201 and 1203 at opposite ends of the folded conductor 1101. For example, lead 1203 is unfolded from the folded conductor 1101 to a conductor 1102 creating a generally triangular side surface portion 1404. The lead 1203 may be further formed by bending the side surface portion 1404 at an edge 1401 creating a flat surface 1406*b*, such as for surface mounting, partially underneath and along part of a bottom surface of the inductor core body 1501. The side surface portion 1404 may begin at the end of the coil 1405 and may also have folded edges 1402*a* and 1402*b* due to the overlap of the folded conductor 1101 when it is formed to create the side surface portion 1404. The same process and formation may occur with the other lead 1201 on the opposite side such that the two leads 1201 and 1203 have a similar structure.

Figure 38:
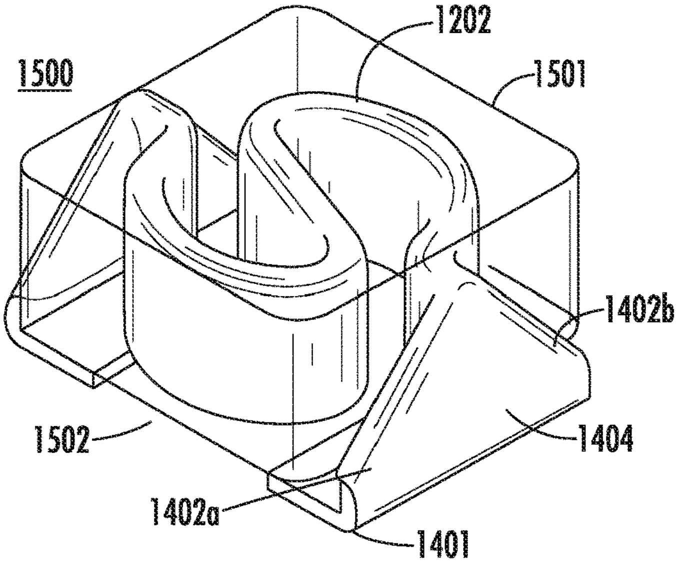
FIG. 38 is an isometric view of an example body, where the core has been made transparent to see the coil inside, with inductor leads formed around the sides of the core.

FIG. 38 shows an isometric view of an illustrative inductor 1500, with the coil 1202 of FIG. 37 encased in a core 1501. The core 1501 is shown in partial transparency so that the interior of the core 1501 may be viewed. The core 1501 may take the shape and be formed similarly to the shapes and methods described herein with reference to the core 260 shown in FIGS. 24-33. The lead 1203 may exit the core 1501 and wrap around the bottom 1502 of the core 1501 thereby creating electrical contact point, such as surface mount leads, for the inductor 1500. The same process and formation may occur with the other lead 1201 on the opposite side such that the two leads 1201 and 1203 have a mirrored structure relative to the coil 1202. The leads 1201 and 1203 may exit the core 1501 in the form of the flat folded conductor 1101 and then formed as discussed above.

Figure 39:
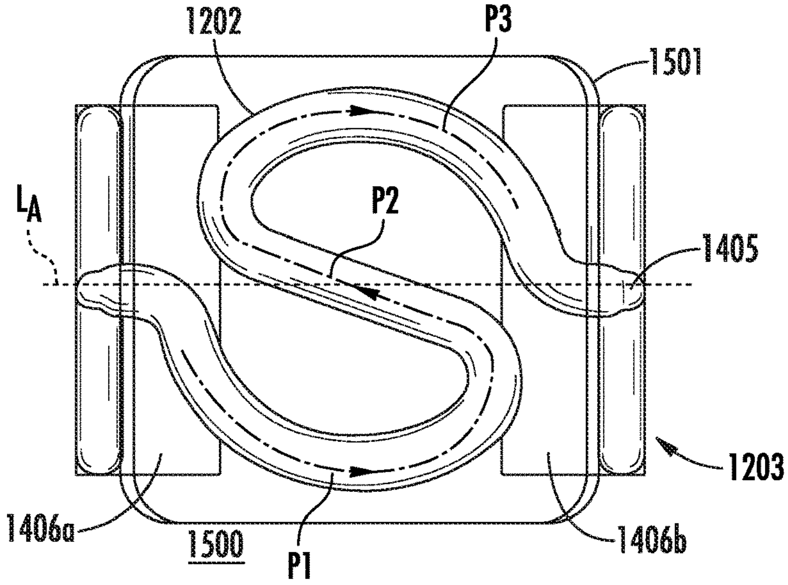
FIG. 39 is a top perspective of an example body, where the core has been made transparent to see the coil inside, with inductor leads formed around the sides of the core.

FIG. 39 shows a top view of the illustrative inductor 1500 of FIG. 38, with a partially transparent core 1501 to show the coil 1202, leads 1201, 1203 and mounting surfaces 1406*a*, 1406*b* in the interior.

Figure 40:
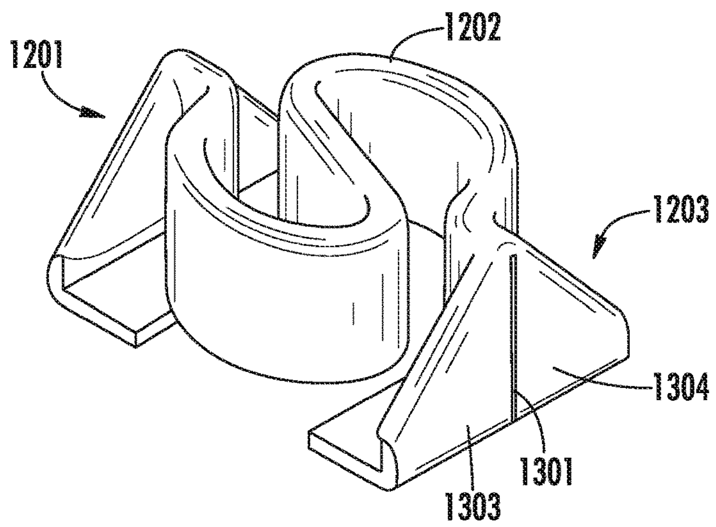
FIG. 40 is an isometric view of an example coil made from splayed folded conductor with formed leads.
Figure 41:
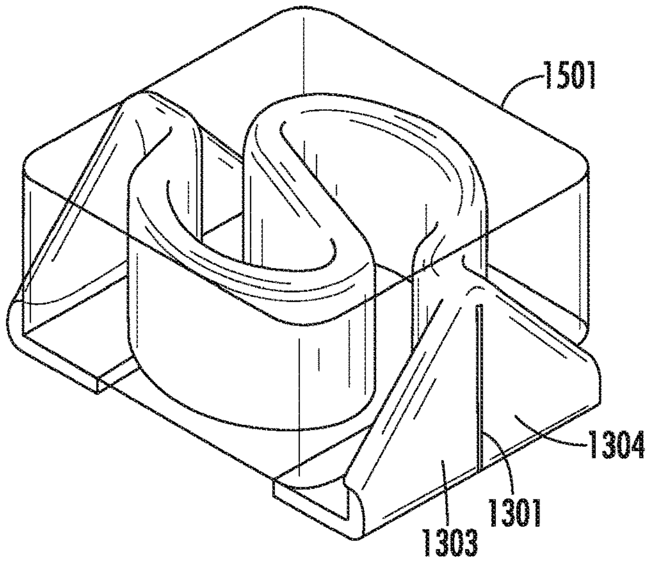
FIG. 41 is an isometric view of an example body, where the core has been made transparent to see the coil inside, with inductor leads formed around the sides of the core.
Figure 42:
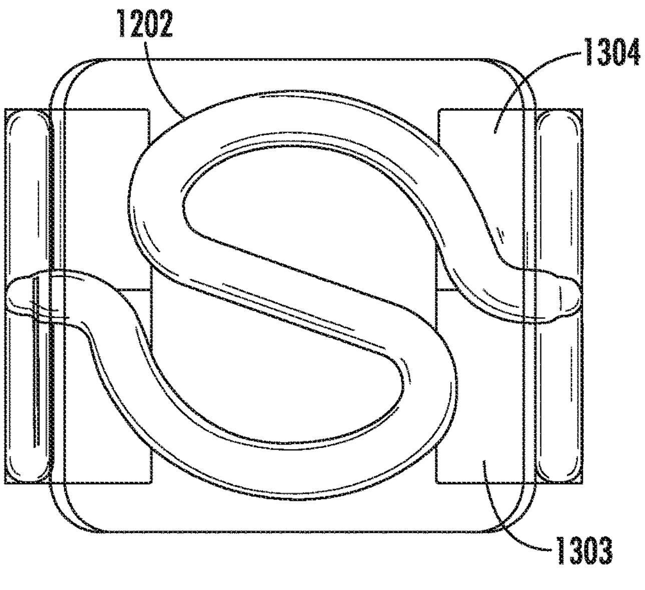
FIG. 42 is a top perspective of an example body, where the core has been made transparent to see the coil inside, with inductor leads formed around the sides of the core.

FIG. 40 shows another embodiment of an inductor coil 1202 formed from a folded conductor where the leads 1201 and 1203 are made from the partially separated folded conductor as shown in, for example, FIG. 36. The lead 1203 is separated into portions 1303 and 1304 and formed and shaped in a manner similar or the same to the reformation of lead 1203 as described with relation to FIG. 37. FIGS. 41 and FIG. 42 show a core 1501 in partial transparency positioned around the coil 1202 and leads, with leads 1303 and 1304 being separated at split 1301 into portions 1303 and 1304.

Figure 43:
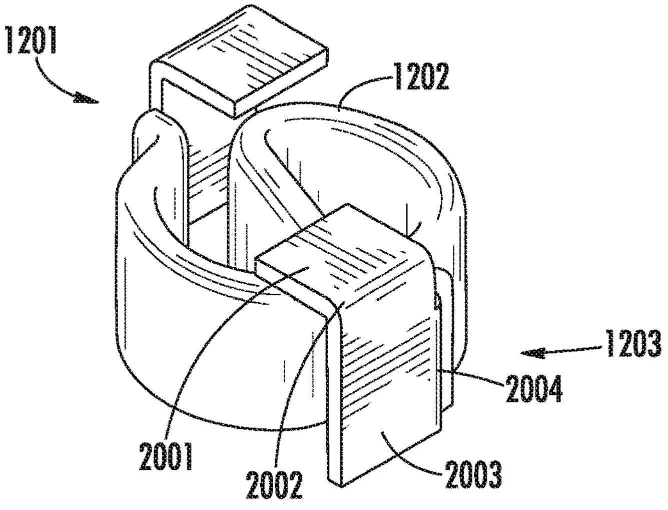
FIG. 43 is an isometric view of an example coil made from splayed folded conductor with formed leads.
Figure 44:
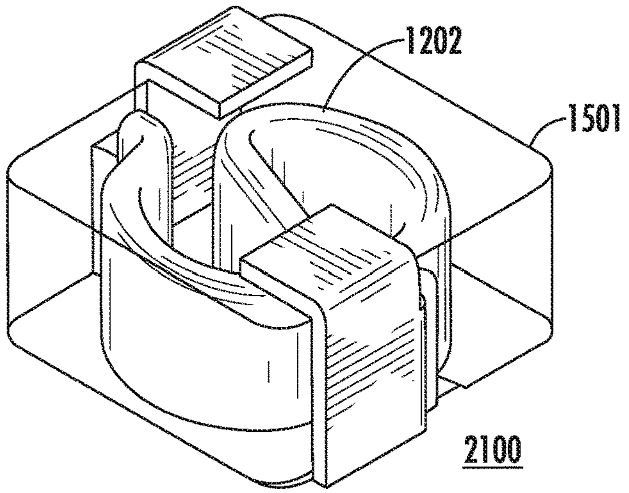
FIG. 44 is an isometric view of an example body, where the core has been made transparent to see the coil inside, with inductor leads formed around the sides of the core.
Figure 45:
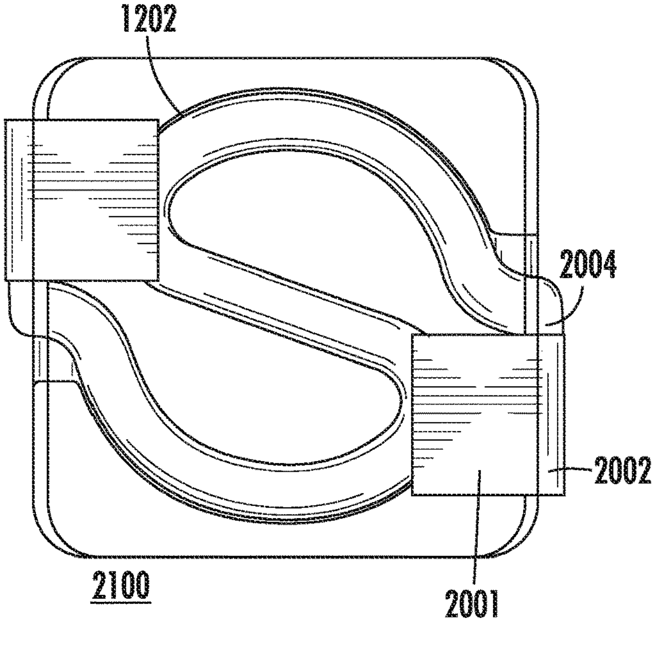
FIG. 45 is a top perspective of an example body, where the core has been made transparent to see the coil inside, with inductor leads formed around the sides of the core.

FIG. 43 shows an isometric view of another embodiment of a coil 1202 having cut and folded leads. The coil 1202 is formed from a folded conductor having split lead portions. In this embodiment, one side of the split portions of the leads are cut, unfolded and bent to conform to the surface of the core 1501, wherein one side of each of the lead portions remains as a surface mount lead. As can be seen in FIGS. 44 and 45, leads 1201 and 1203 are cut and folded in such a way to create contact points, such as surface mount leads, on the top side surface of an inductor. For example, mounting surface 2001 may be the contact surface of lead 1203. Lead 1203 also may have a flat side surface 2003 adjacent to and running along the side of the core 1501. The lead 1203 exiting the coil 1202 is bent at portion 2004. The lead 1203 is further bent at portion 2002. FIG. 44 is an isometric view showing a partially transparent core 1501 for visualization purposes around the coil 1202 shown in FIG. 43. FIG. 45 is the partially transparent top perspective of FIG. 44 showing the inductor 2100 with the cut and folded leads. Lead 1201 is formed in a similar manner.

Figure 46A:
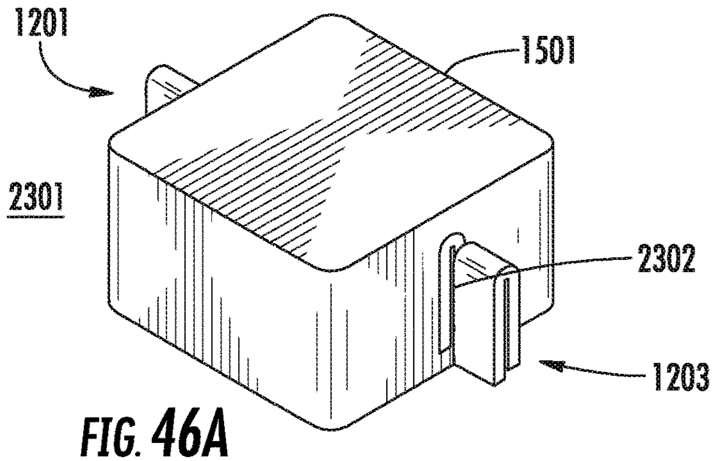
FIGS. 46A-D illustrate an example process of manufacturing an inductor according to one embodiment.
Figure 46B:
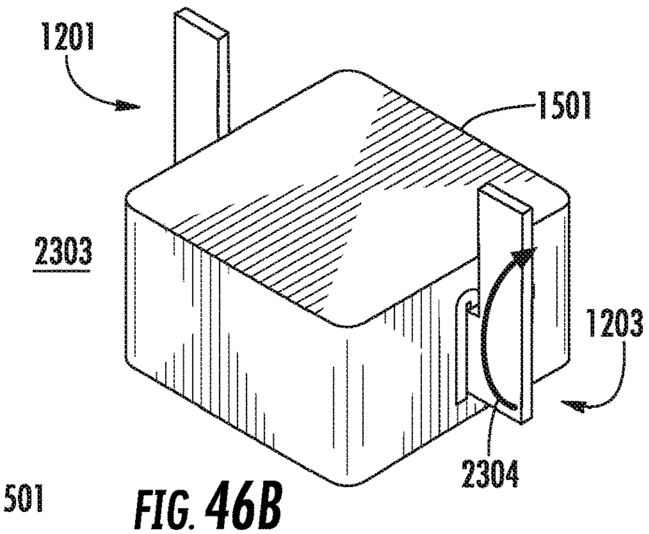
Figure 46C:
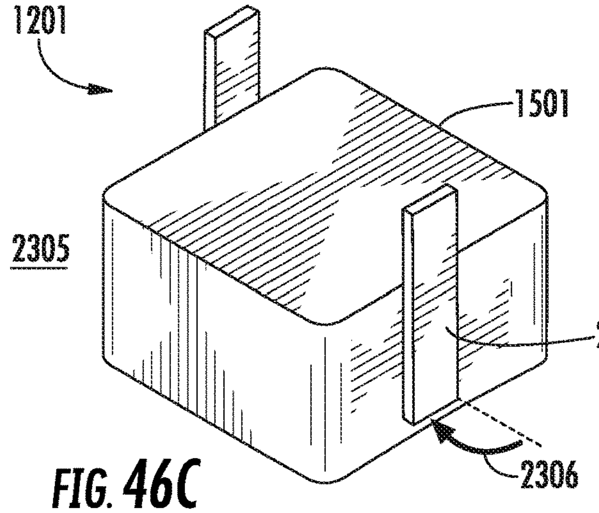
Figure 46D:
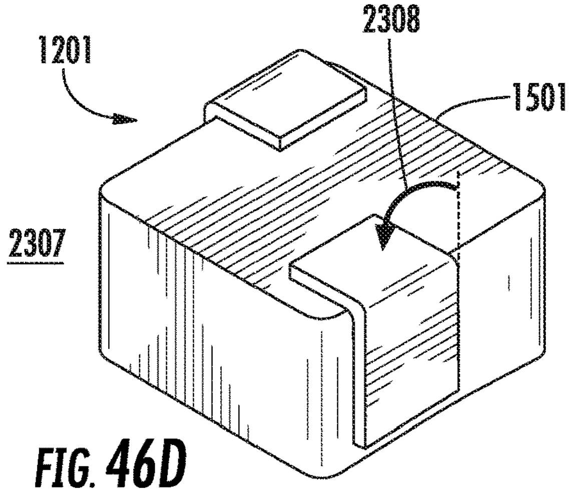

FIGS. 46A-D show an illustrative process in which the leads may be cut and folded to form the arrangement shown in FIGS. 43, 44 and 45. FIG. 46A shows step 2301, where leads 1201 and 1203 can be seen extending from the core 1501. The leads 1201 and 1203 are made of folded conductor that can be seen as a folded U-shape similar to FIGS. 34A and 34B except that the height/width of the two layers are not equal making it easier to grab the lead and un-fold it. A cut may be made at along cut-line 2302, and similarly along a cut-line in lead 1201. FIG. 46B shows step 2303, where lead 1203 is un-folded in direction 2304 to create an L-shape extending from the core 1501, with the same process applied to lead 1201. FIG. 46C shows step 2305, where leads 1201 and 1203 are flattened or pressed against the side surfaces of the core 1501 and bent at portion 2004 along motion line 2306. FIG. 46D shows step 2307, where the leads 1201 and 1203 are bent again to conform to the top surface portion of the core 1501 in a folding motion 2308 thereby creating contact or surface mount portions as shown in FIGS. 44, 45 and 46A-D.

Figure 47A:
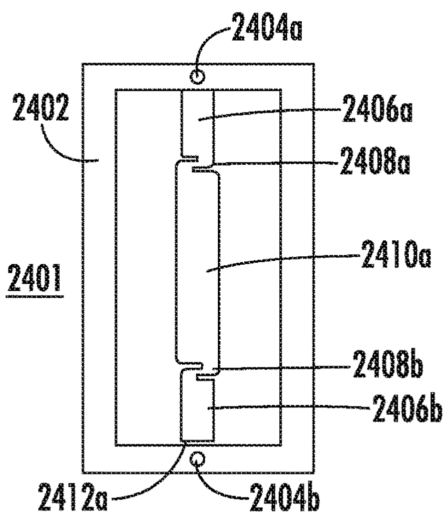
FIGS. 47A-D illustrate an example process of manufacturing a component for an inductor according to one embodiment.

FIGS. 47A-D shows an illustrative process of forming a leadframe of an inductor made by stamping and folding according to one embodiment. FIG. 47A shows a first step 2401 where a metal frame 2402 has been formed by stamping a piece of metal, with apertures at the top 2404*a* and bottom 2404*b* that may be used to secure the metal in place during the formation process. The metal may be any electrically conductive metal or combination of metals. For example, and not by way of limitation, the metal may be a Ni and Sn plated copper sheet. At the frame's 2402 inner topside a lead portion 2406*a* extends downward leading to a coil connection point 2408*a*, a piece of conductor 2410, and another coil connection point 2408*b* and another lead 2406*b*. Slots are formed adjacent the coil connection points 2408*a*, 2408*b*. A gap 2412*a* is formed where the stamp has separated the frame 2402 and the bottom lead 2406*b*.

Figure 47B:
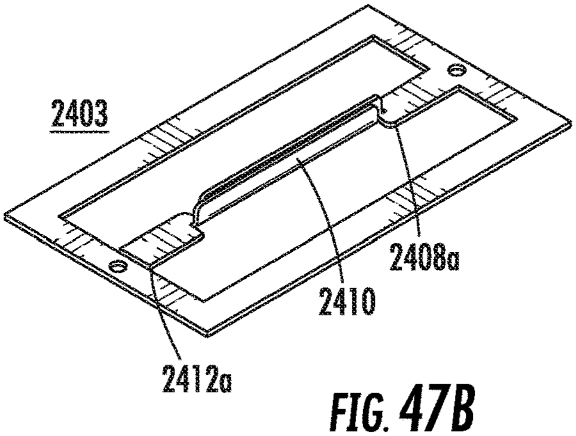
Figure 47C:
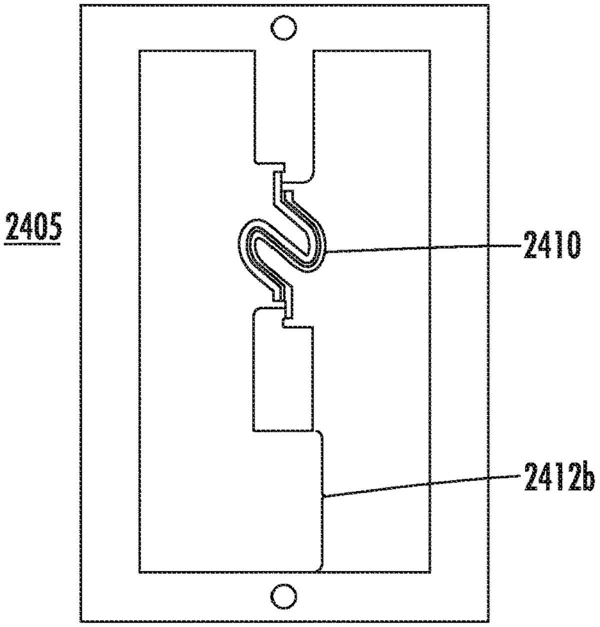
Figure 47D:
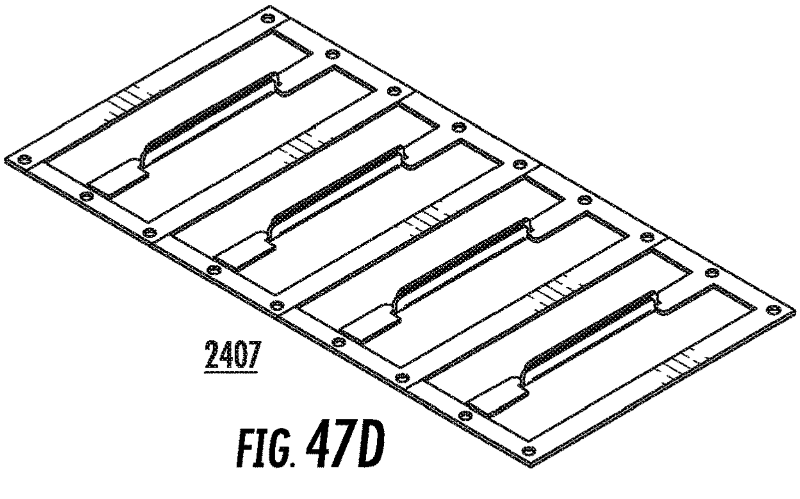

FIG. 47B shows step 2403 shows a central portion of the flat metal conductor 2410 being folded perpendicular to the plane of the frame 2402. FIG. 47C shows step 2405 with coil 2410 being formed, such as by bending, in an "S"-shape from the folded conductor 2410 causing the pervious gap 2412*a* to expand to the size of gap 2412*b*. Alternatively, the coil 2410 may be formed in any of the shapes as described herein. FIG. 47D shows an embodiment with a large sheet of metal where multiple frames have been stamped at the same time as shown at 2407.

Figure 48:
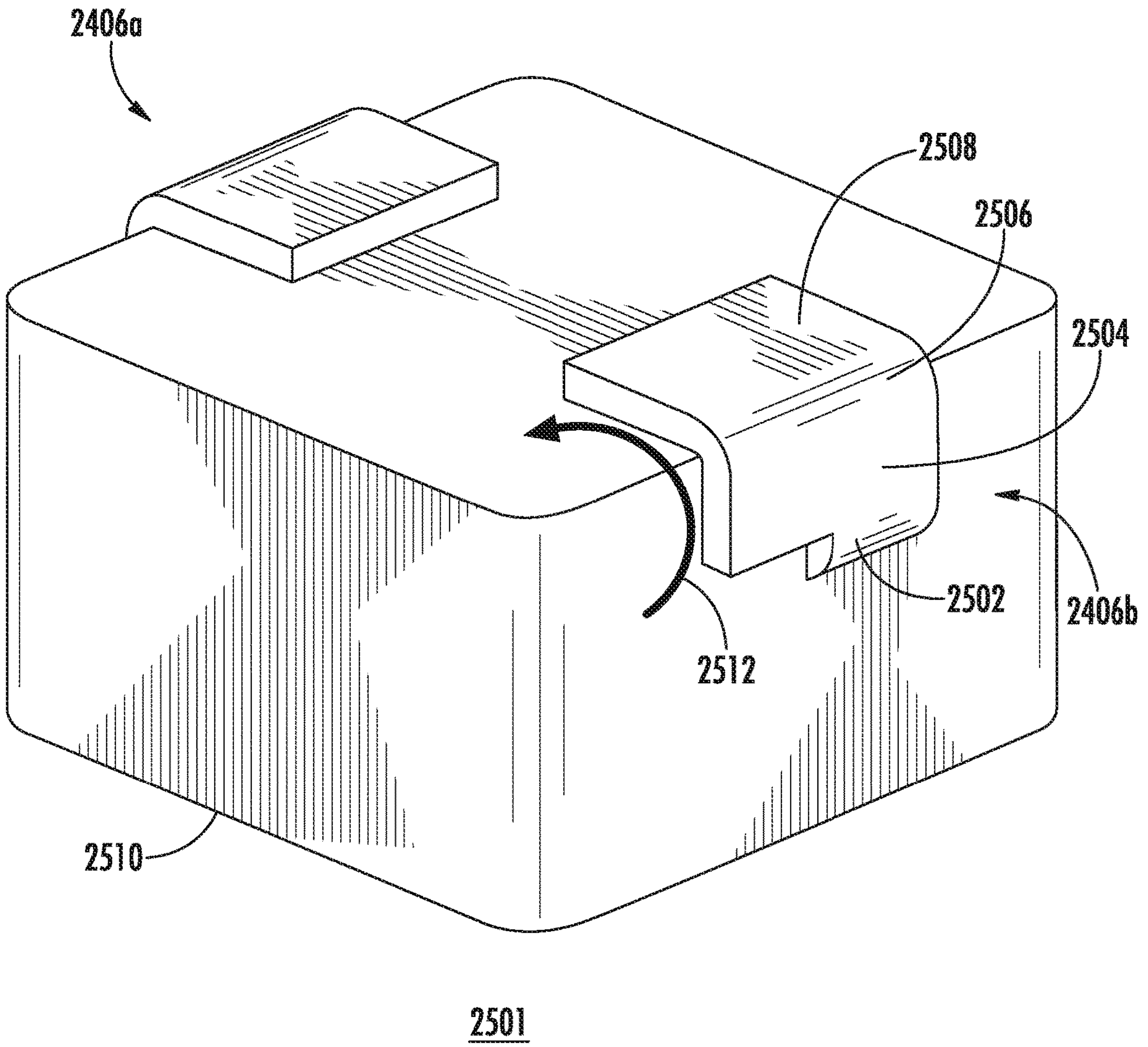
FIG. 48 illustrates an example process of manufacturing an inductor according to one embodiment.

FIG. 48 shows an example inductor using the stamped formation process from FIGS. 47A-47D. In step 2501 the coil 2410 (not visible) has been encased in a core 2510 and the lead 2406*b* has been folded in a motion 2512 bending at 2502 and 2506 to wrap around a surface of the core 2510 creating a surface portion 2504 and a contact point 2508 or surface mount terminal for the lead 2406*b*. A similar process and formation is performed with respect to lead 2406*a*.

Figure 49A:
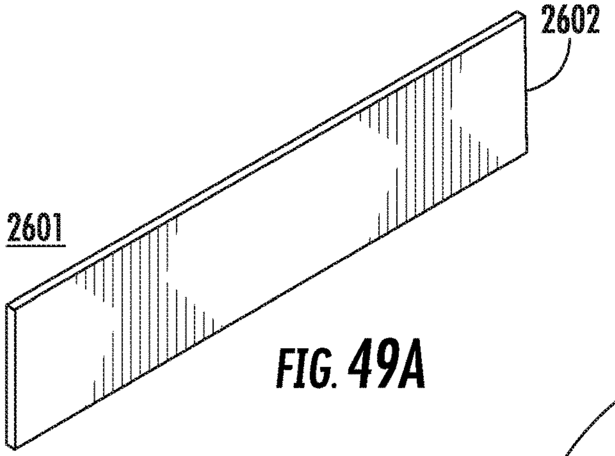
FIGS. 49A-D illustrate an example process of manufacturing a component for an inductor according to one embodiment.
Figure 49B:
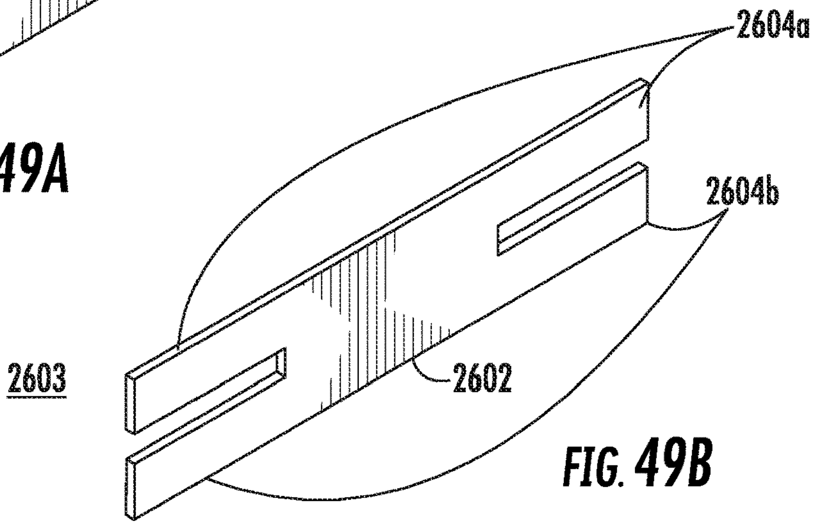
Figure 49C:
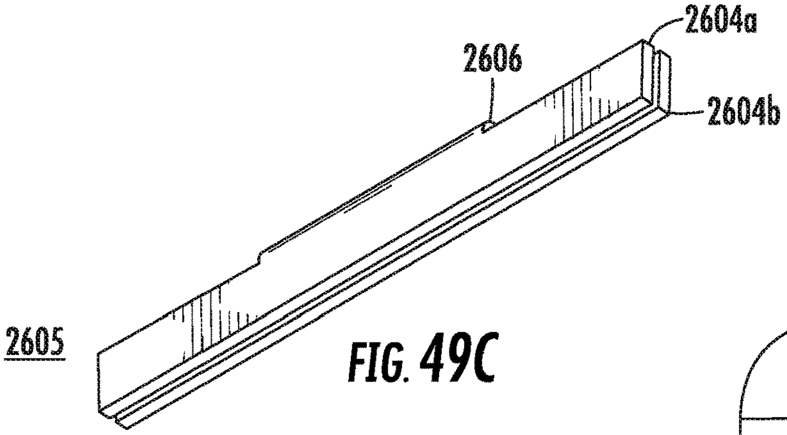
Figure 49D:
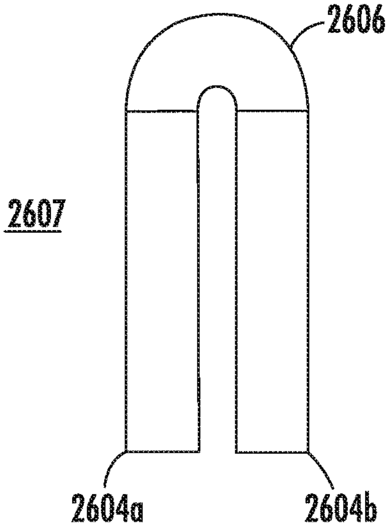

FIG. 49A-D show an embodiment for forming the splayed folded conductor discussed above in connection with various embodiments. The splayed conductor has an H-shape, with slots at opposite ends. FIG. 49A shows step 2601 with a flat piece of conductor 2602. FIG. 49B shows step 2603, where the conductor 2602 may be splayed, separated, cut or stamped to form an elongated H-shape having top extensions 2604*a* and bottom extensions 2604*b*, with slots in between. FIG. 49C shows step 2605, where the conductor 2602 is folded along portion 2606 such that the top extension 2604*a* and bottom extension 2604*b* are parallel with each other and brought into proximity. FIG. 49D shows step 2607, where the splayed folded conductor can be seen from a front perspective with the fold at portion 2606 and the extensions 2604*a* and 2604*b* parallel with each, and having a central U-shape.

Figure 50A:
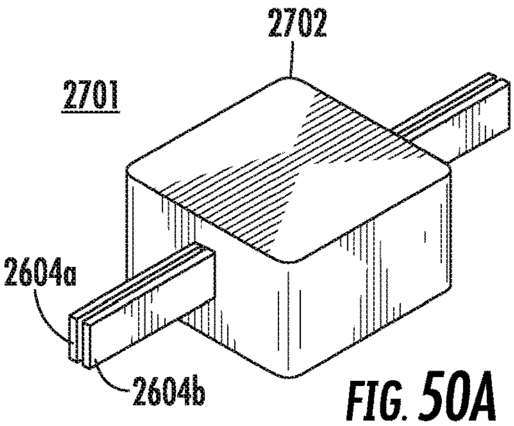
FIGS. 50A-F illustrate an example process of manufacturing an inductor according to one embodiment.
Figure 50B:
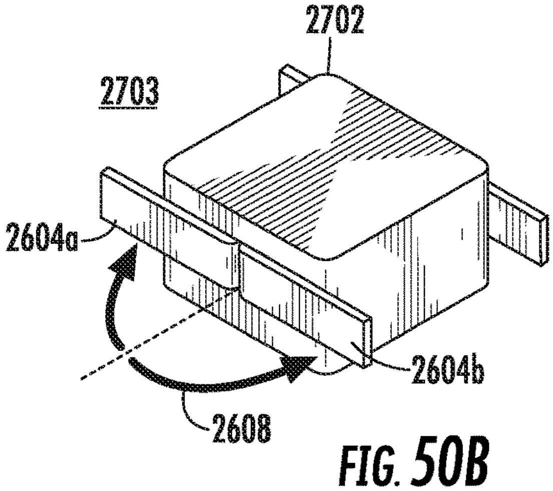
Figure 50C:
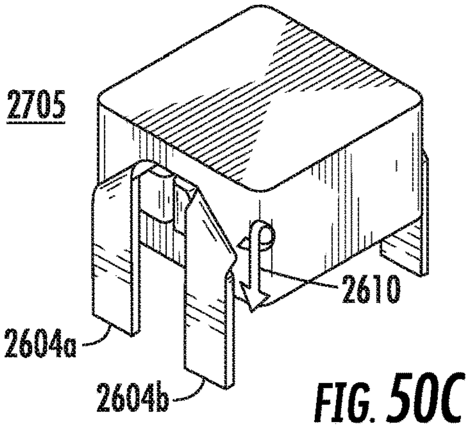
Figure 50D:
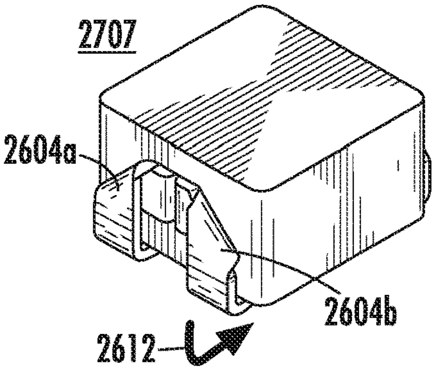
Figure 50E:
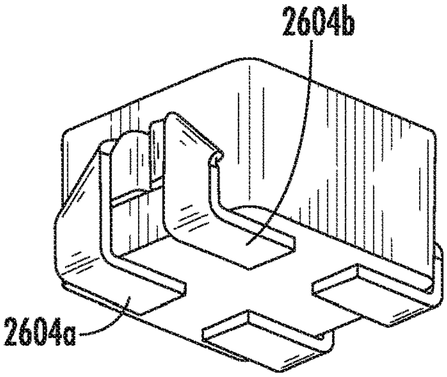
Figure 50F:
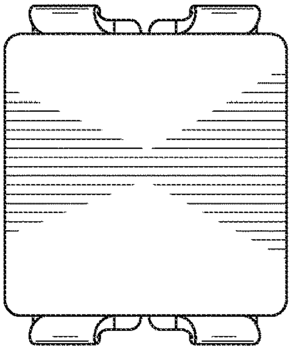

FIG. 50A-D show an example process for forming an inductor having a splayed folded conductor of FIG. 49 to create a coil, leads and/or inductor such as that shown in FIGS. 30, 31, and 32. FIG. 50A show step 2701, where the core 2702 is formed around the coil (internal to the core) while the leads extending outwardly from opposite sides of the core. FIG. 50B shows step 2703, where the leads 2604*a* and 2604*b* are bent away from each other in a direction designated as 2608. FIG. 50C shows step 2705, where the lead extensions 2604*a* and 2604*b* are bent in a downward motion 2610 over themselves, so that a folded portion partially lays over a non-folded portion. FIG. 50D show step 2707, where the lead extensions 2604*a* and 2604*b* are bent underneath the core 2702 in a direction indicated by arrows 2612. This can be seen from alternative perspectives in FIG. 50E and FIG. 50F.

Figure 51A:
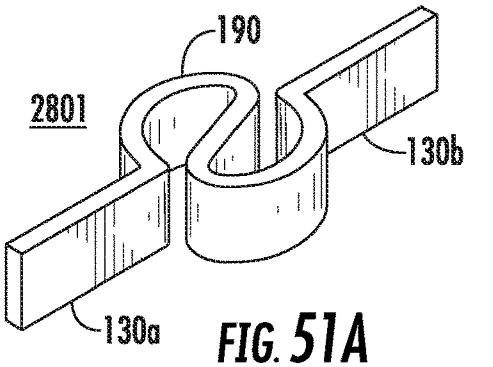
FIGS. 51A-H illustrate an example process of manufacturing an inductor according to one embodiment.
Figure 51B:
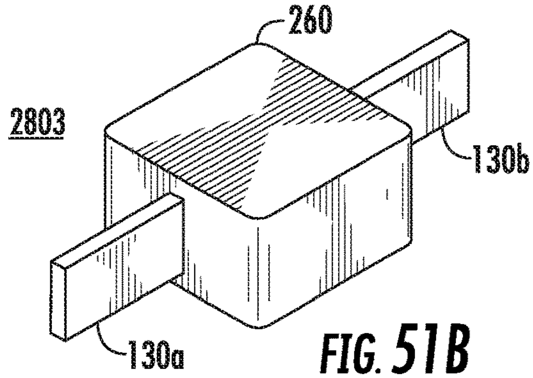
Figure 51C:
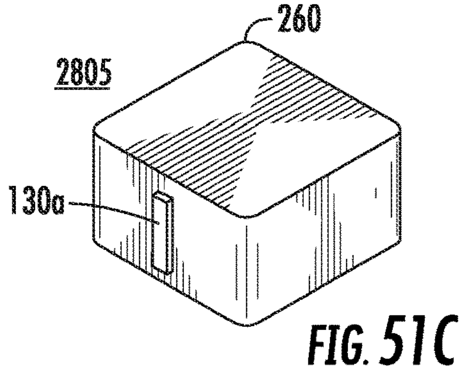
Figure 51D:
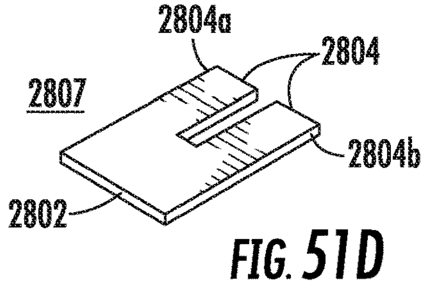
Figure 51E:
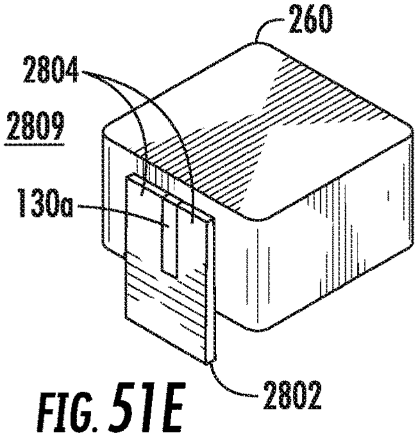
Figure 51F:
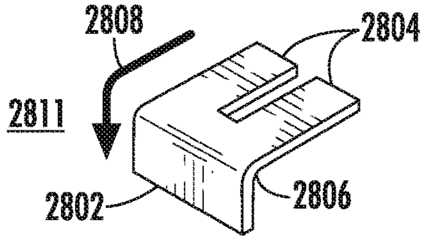
Figure 51G:
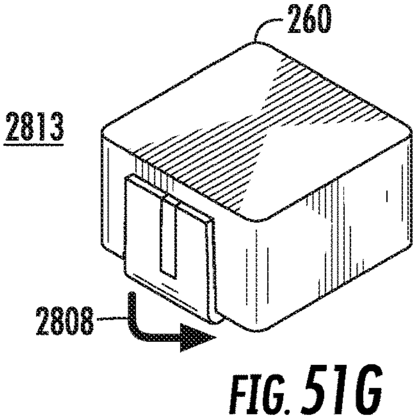
Figure 51H:
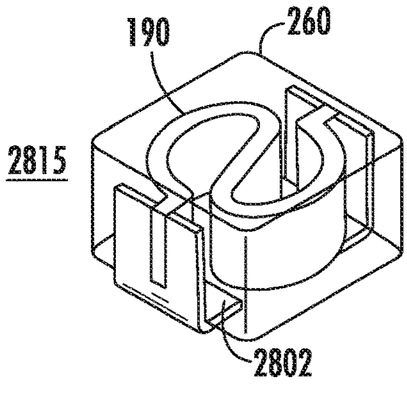

FIGS. 51A-H show an example process of an alternative embodiment for forming an inductor coil and an inductor with lead ends that are formed separately and then joined to the coil with lead portions extending from the inductor core body. FIG. 51A show step 2801, where a coil 190, such as that shown in FIG. 24, made from a conductor having lead portions 130*a* and 130*b*, is formed. FIG. 51B shows step 2803, where a core 260 is formed around the coil 190. The lead portions 130*a* and 130*b* extend outwardly from the core 260. FIG. 51C shows step 2805, where the lead portions 130*a* and 130*b* are clipped, trimmed, or cut so that they extend a distance from the core 260. The distance may be associated with a thickness, such as the thickness of a flat lead conductor shown in FIG. 51D. The flat lead conductor of FIG. 51D is introduced/created at step 2807 where one or more flat lead conductors are formed, each having a base 2802 and extensions 2804*a* and 2804*b* (a.k.a. 2804 collectively), with a slot between the extensions 2804*a* and 2804*b*, formed in a general U-shape. The extensions 2804 of each flat lead conductor extensions will surround each of the lead portions 130*a* and 130*b*. FIG. 51E shows step 2809, where the U-shaped flat lead conductors are connected to the lead portions 130*a* and 130*b* such that the slot in between the extensions 2804 is filled by the trimmed lead portions 130*a* and 130*b*; the flat lead conductors may be attached by soldering or the like. Also at step 2809, the base 2802 extends past the edge surface of the core 260 at the bottom surface of the core 260. FIG. 51F and FIG. 51G show steps 2811 and 2813, respectively, where the base 2802 is bent at a corner 2806 in a direction indicated by arrow 2808 such that it will wrap around the bottom of the core 260 and act as a contact point or surface mount terminal. FIG. 51H shows step 2815, where the inductor is shown with the core 260 in partial transparency to illustrate the base 2802 wrapping around the bottom surface of the core 260, and to show the coil 190 positioned inside the core 260.

An inductor according to any of the embodiments discussed herein may be utilized in electronics applications, such as DC/DC converters, to achieve one or more of the following: low direct current resistance; tight tolerances on inductance and or direct current resistance; inductance below 1 uH; low profiles and high current; efficiency in circuits and/or in situations where similar products cannot meet electric current requirements. In particular, an inductor may be useful in DC/DC converters operating at 1 Mhz and above.

The present invention provides for an inductor provided with a high current serpentine coil, such as an "S" shaped coil, with low direct current resistance (IHVR). The design simplifies manufacturing by eliminating a welding process. The design reduces direct current resistance by eliminating a high resistance weld between the coil and the leads. This allows for inductors with inductance ratings below 1 uH to be produced consistently. The "S" shape for the coil optimizes inductance and resistance values compared to a similar stamped coil configuration and other non-coil configurations.

The formed serpentine coil inductor, such as a coil in the S-shape described herein, provides a simple and cost-effective way to produce consistent inductors and to produce inductors with direct current resistance up to 80% lower than comparable known inductors such as IHLP inductors.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An electro-magnetic component comprising:

a coil formed from a flat conductive material, the conductive material having a width greater than a thickness of the conductive material, wherein the coil extends along an at least partially curving path that does not completely encircle a central area of the coil;

a first lead extending from a first end of the coil;

a second lead extending from a second end of the coil;

a body pressed around the coil and portions of the first lead and the second lead leaving an exposed portion of the first lead and an exposed portion of the second lead, the body comprising a front surface and an opposite back surface, a top surface and an opposite bottom surface, and a first side surface an opposite second side surface, wherein a depth of the body extends between the front surface and the back surface and a height of the body extends between the top surface and the bottom surface, the height being greater than the depth, and wherein the coil is positioned such that the width of the conductive material extends along the depth of body;

at least a portion of the exposed portion of the first lead positioned so as to extend along the bottom surface of the body; and at least a portion of the exposed portion of the second lead positioned so as to extend along the bottom surface of the body.

2. The electro-magnetic component of claim 1, wherein the coil comprises a portion curving toward the top surface of the body.

3. The electro-magnetic component of claim 2, wherein the portion of the coil curving toward the top surface of the body curves outwardly and away from a central area of the coil.

4. The electro-magnetic component of claim 1, wherein the coil and leads are formed from a unitary piece of conductive material.

5. The electro-magnetic component of claim 1, wherein the first lead has a width that is less than the depth of the body, and the second lead has a width that is less than the depth of the body.

6. The electro-magnetic component of claim 1, wherein a shape of the coil is configured to optimize a path length of the coil to fit a space available within the body of the electro-magnetic component while minimizing resistance and optimizing inductance.

7. The electro-magnetic component of claim 1, wherein the coil is formed by stamping, bending, cutting, folding or a combination thereof.

8. The electro-magnetic component of claim 1, wherein at least a portion of the coil curves inwardly toward a central vertical axis of the body running between the top surface and the bottom surface of the body.

9. The electro-magnetic component of claim 1, wherein the coil comprises a first area positioned adjacent to the first side surface of the body and a second area curving inwardly toward a central vertical axis of the body running from the top surface to the bottom surface of the body, and the coil comprises a third area positioned adjacent to the second side surface of the body and a fourth area curving inwardly toward the central vertical axis of the body.

10. The electro-magnetic component of claim 1, wherein the coil has a first flat surface facing the front surface of the body and a second flat surface facing the back surface of the body, and wherein no part of the coil is wound over or under another part of the coil along the depth of the body.

11. An electro-magnetic component comprising:

a coil formed from a flat conductive material, the conductive material having a width greater than a thickness of the conductive material;

a first lead extending from a first end of the coil;

a second lead extending from a second end of the coil;

a body pressed around the coil and portions of the first lead and the second lead leaving an exposed portion of the first lead and an exposed portion of the second lead, the body comprising a front surface and an opposite back surface, a top surface and an opposite bottom surface, and a first side surface an opposite second side surface, wherein a central vertical axis of the body runs from the top surface to the bottom surface of the body, and wherein a depth of the body extends between the front surface and the back surface and a height of the body extends between the top surface and the bottom surface, the height being greater than the depth;

the coil positioned within the body such that the width of the conductive material extends along the depth of body, wherein the coil has a first flat surface facing the front surface of the body and a second flat surface facing the back surface of the body, the coil following an at least partially curving path extending between the first end of the coil and the second end of the coil such that no part of the coil is wound over or under another part of the coil along the depth of the body, wherein a first portion of the coil curves inwardly from the first end of the coil toward the central vertical axis, and wherein a second portion of the coil curves inwardly from the second end of the coil toward the central vertical axis of the body;

at least a portion of the exposed portion of the first lead positioned so as to extend along the bottom surface of the body; and at least a portion of the exposed portion of the second lead positioned so as to extend along the bottom surface of the body.

12. The electro-magnetic component of claim 11, wherein the coil comprises a portion curving outwardly away from a central area of the body.

13. The electro-magnetic component of claim 11, wherein the coil and leads are formed from a unitary piece of conductive material.

14. The electro-magnetic component of claim 11, wherein the first lead has a width that is less than the depth of the body, and the second lead has a width that is less than the depth of the body.

* * * * *